(12) United States Patent
Kottur

(10) Patent No.: US 12,198,430 B1
(45) Date of Patent: Jan. 14, 2025

(54) MULTIMODAL STATE TRACKING VIA SCENE GRAPHS FOR ASSISTANT SYSTEMS

(71) Applicant: Meta Platforms, Inc., Menlo Park, CA (US)

(72) Inventor: Satwik Kottur, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 411 days.

(21) Appl. No.: 17/009,542

(22) Filed: Sep. 1, 2020

(51) Int. Cl.
  G06V 20/00 (2022.01)
  G06F 16/901 (2019.01)
  G06F 16/9536 (2019.01)
  G06V 20/20 (2022.01)

(52) U.S. Cl.
  CPC .......... *G06V 20/35* (2022.01); *G06F 16/9024* (2019.01); *G06F 16/9536* (2019.01); *G06V 20/20* (2022.01)

(58) Field of Classification Search
  CPC .... G06V 20/35; G06V 20/20; G06F 16/9024; G06F 16/9536
  See application file for complete search history.

(56) References Cited

U.S. PATENT DOCUMENTS

| | | |
|---|---|---|
| 7,124,123 B1 | 10/2006 | Roskind |
| 7,158,678 B2 | 1/2007 | Nagel |
| 7,397,912 B2 | 7/2008 | Aasman |
| 8,027,451 B2 | 9/2011 | Arendsen |
| 8,560,564 B1 | 10/2013 | Hoelzle |
| 8,677,377 B2 | 3/2014 | Cheyer |
| 8,935,192 B1 | 1/2015 | Ventilla |
| 8,983,383 B1 | 3/2015 | Haskin |
| 9,154,739 B1 | 10/2015 | Nicolaou |
| 9,299,059 B1 | 3/2016 | Marra |
| 9,304,736 B1 | 4/2016 | Whiteley |
| 9,338,242 B1 | 5/2016 | Suchland |
| 9,338,493 B2 | 5/2016 | Van Os |
| 9,390,724 B2 | 7/2016 | List |

(Continued)

FOREIGN PATENT DOCUMENTS

WO WO 2012/116241 8/2012

OTHER PUBLICATIONS

Niu, Yulei, et al. "Recursive visual attention in visual dialog." Proceedings of the IEEE/CVF Conference on Computer Vision and Pattern Recognition. 2019. (Year: 2019).*

(Continued)

*Primary Examiner* — Siamak Harandi
*Assistant Examiner* — Denise G Alfonso
(74) *Attorney, Agent, or Firm* — Jordan IP Law, LLC

(57) ABSTRACT

In one embodiment, a method includes receiving, from a client system associated with a user, a first user request that includes a reference to a target object and one or more of an attribute or a relationship of the target object. Visual data including one or more images portraying the target object may then be accessed, and the reference may be resolved to the target object portrayed in the one or more images. Object information of the target object that corresponds to the referenced attribute or relationship of the first user request may be determined based on a visual analysis of the one or more images. Finally, responsive to receiving the first user request, the object information of the target object may be stored in a multimodal dialog state.

21 Claims, 24 Drawing Sheets

(56) References Cited

U.S. PATENT DOCUMENTS

| | | |
|---|---|---|
| 9,418,658 B1 | 8/2016 | David |
| 9,472,206 B2 | 10/2016 | Ady |
| 9,479,931 B2 | 10/2016 | Ortiz |
| 9,576,574 B2 | 2/2017 | van Os |
| 9,659,577 B1 | 5/2017 | Langhammer |
| 9,720,955 B1 | 8/2017 | Cao |
| 9,747,895 B1 | 8/2017 | Jansche |
| 9,792,281 B2 | 10/2017 | Sarikaya |
| 9,858,925 B2 | 1/2018 | Gruber |
| 9,865,260 B1 | 1/2018 | Vuskovic |
| 9,875,233 B1 | 1/2018 | Tomkins |
| 9,875,741 B2 | 1/2018 | Gelfenbeyn |
| 9,881,077 B1 | 1/2018 | Alfonseca |
| 9,886,953 B2 | 2/2018 | Lemay |
| 9,990,591 B2 | 6/2018 | Gelfenbeyn |
| 10,042,032 B2 | 8/2018 | Scott |
| 10,127,220 B2 | 11/2018 | Bellegarda |
| 10,134,395 B2 | 11/2018 | Typrin |
| 10,199,051 B2 | 2/2019 | Binder |
| 10,241,752 B2 | 3/2019 | Lemay |
| 10,276,170 B2 | 4/2019 | Gruber |
| 10,462,422 B1 | 10/2019 | Harrison |
| 10,511,808 B2 | 10/2019 | Harrison |
| 10,719,786 B1 | 7/2020 | Treseler |
| 10,782,986 B2 | 9/2020 | Martin |
| 2008/0240379 A1 | 10/2008 | Maislos |
| 2008/0300884 A1 | 12/2008 | Smith |
| 2009/0282033 A1 | 11/2009 | Alshawi |
| 2011/0246383 A1 | 10/2011 | Gibson |
| 2012/0245944 A1 | 9/2012 | Gruber |
| 2012/0246191 A1 | 9/2012 | Xiong |
| 2012/0265528 A1 | 10/2012 | Gruber |
| 2012/0311126 A1 | 12/2012 | Jadallah |
| 2013/0035930 A1 | 2/2013 | Ferrucci |
| 2013/0268839 A1 | 10/2013 | Lefebvre |
| 2013/0275138 A1 | 10/2013 | Gruber |
| 2013/0275164 A1 | 10/2013 | Gruber |
| 2014/0074483 A1 | 3/2014 | van Os |
| 2014/0164506 A1 | 6/2014 | Tesch |
| 2014/0244712 A1 | 8/2014 | Walters |
| 2014/0280017 A1 | 9/2014 | Indarapu |
| 2014/0297284 A1 | 10/2014 | Gruber |
| 2015/0081674 A1 | 3/2015 | Ali |
| 2015/0142420 A1 | 5/2015 | Sarikaya |
| 2015/0142704 A1 | 5/2015 | London |
| 2015/0169284 A1 | 6/2015 | Quast |
| 2015/0169744 A1 | 6/2015 | Walkingshaw |
| 2015/0179168 A1 | 6/2015 | Hakkani-Tur |
| 2015/0186156 A1 | 7/2015 | Brown |
| 2015/0207765 A1 | 7/2015 | Brantingham |
| 2015/0347375 A1 | 12/2015 | Tremblay |
| 2016/0019290 A1 | 1/2016 | Ratnaparkhi |
| 2016/0037311 A1 | 2/2016 | Cho |
| 2016/0063118 A1 | 3/2016 | Campbell |
| 2016/0196491 A1 | 7/2016 | Chandrasekaran |
| 2016/0225370 A1 | 8/2016 | Kannan |
| 2016/0255082 A1 | 9/2016 | Rathod |
| 2016/0306505 A1 | 10/2016 | Vigneras |
| 2016/0308799 A1 | 10/2016 | Schubert |
| 2016/0328096 A1 | 11/2016 | Tran |
| 2016/0378849 A1 | 12/2016 | Myslinski |
| 2016/0378861 A1* | 12/2016 | Eledath .................. G06V 20/52 707/766 |
| 2017/0026318 A1 | 1/2017 | Daniel |
| 2017/0091168 A1 | 3/2017 | Bellegarda |
| 2017/0092264 A1 | 3/2017 | Hakkani-Tur |
| 2017/0132019 A1 | 5/2017 | Karashchuk |
| 2017/0193390 A1 | 7/2017 | Weston |
| 2017/0353469 A1 | 12/2017 | Selekman |
| 2017/0358304 A1 | 12/2017 | Castillo Sanchez |
| 2017/0359707 A1 | 12/2017 | Diaconu |
| 2018/0013699 A1 | 1/2018 | Sapoznik |
| 2018/0018562 A1 | 1/2018 | Jung |
| 2018/0018987 A1 | 1/2018 | Zass |
| 2018/0040020 A1 | 2/2018 | Kurian |
| 2018/0054523 A1 | 2/2018 | Zhang |
| 2018/0096071 A1 | 4/2018 | Green |
| 2018/0096072 A1 | 4/2018 | He |
| 2018/0107917 A1 | 4/2018 | Hewavitharana |
| 2018/0121508 A1 | 5/2018 | Halstvedt |
| 2018/0189629 A1 | 7/2018 | Yatziv |
| 2018/0210874 A1 | 7/2018 | Fuxman |
| 2018/0293484 A1 | 10/2018 | Wang |
| 2019/0080698 A1 | 3/2019 | Miller |
| 2019/0087491 A1 | 3/2019 | Bax |
| 2019/0139150 A1 | 5/2019 | Brownhill |
| 2019/0213490 A1 | 7/2019 | White |
| 2019/0324527 A1 | 10/2019 | Presant |
| 2019/0324553 A1 | 10/2019 | Liu |
| 2019/0324780 A1 | 10/2019 | Zhu |
| 2019/0325042 A1 | 10/2019 | Yu |
| 2019/0325080 A1 | 10/2019 | Natarajan |
| 2019/0325081 A1 | 10/2019 | Liu |
| 2019/0325084 A1 | 10/2019 | Peng |
| 2019/0327330 A1 | 10/2019 | Natarajan |
| 2019/0327331 A1 | 10/2019 | Natarajan |
| 2019/0348033 A1 | 11/2019 | Chen |
| 2019/0361408 A1 | 11/2019 | Tokuchi |
| 2021/0248375 A1* | 8/2021 | Geng .................. G06V 10/84 |

OTHER PUBLICATIONS

Kottur, Satwik, et al. "Clevr-dialog: A diagnostic dataset for multi-round reasoning in visual dialog." arXiv preprint arXiv:1903.03166 (2019). (Year: 2019).*

Guo, Dan, et al. "Iterative context-aware graph inference for visual dialog." Proceedings of the IEEE/CVF Conference on Computer Vision and Pattern Recognition. 2020. (Year: 2020).*

U.S. Appl. No. 15/953,957, filed Apr. 16, 2018, Kemal El Moujahid.
U.S. Appl. No. 15/967,193, filed Apr. 30, 2018, Davide Testuggine.
U.S. Appl. No. 15/967,279, filed Apr. 30, 2018, Fuchun Peng.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.

(56) References Cited

OTHER PUBLICATIONS

U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/434,010, filed Jun. 6, 2019, Sergiu Dogaru.
U.S. Appl. No. 16/552,559, filed Aug. 27, 2019, Seungwhan Moon.
U.S. Appl. No. 16/557,055, filed Aug. 30, 2019, Seungwhan Moon.
U.S. Appl. No. 16/659,070, filed Oct. 21, 2019, Lisa Xiaoyi Huang.
U.S. Appl. No. 16/659,203, filed Oct. 21, 2019, Lisa Xiaoyi Huang.
U.S. Appl. No. 16/659,363, filed Oct. 21, 2019, Lisa Xiaoyi Huang.
U.S. Appl. No. 16/659,419, filed Oct. 21, 2019, Lisa Xiaoyi Huang.
U.S. Appl. No. 16/703,700, filed Dec. 4, 2019, Ahmed Aly.
U.S. Appl. No. 16/733,044, filed Jan. 2, 2020, Francislav P. Penov.
U.S. Appl. No. 16/741,630, filed Jan. 13, 2020, Paul Anthony Crook.
U.S. Appl. No. 16/741,642, filed Jan. 13, 2020, Fuchun Peng.
U.S. Appl. No. 16/742,769, filed Jan. 14, 2020, Xiaohu Liu.
U.S. Appl. No. 16/742,668, filed Jan. 14, 2020, Xiaohu Liu.
U.S. Appl. No. 16/790,497, filed Feb. 13, 2020, Yang Gao.
U.S. Appl. No. 16/815,960, filed Mar. 11, 2020, Malik.
U.S. Appl. No. 16/815,990, filed Mar. 11, 2020, Malik.
U.S. Appl. No. 16/842,366, filed Apr. 7, 2020, Kamisetty.
U.S. Appl. No. 16/847,155, filed Apr. 13, 2020, Xiaohu Liu.
U.S. Appl. No. 16/914,966, filed Jun. 29, 2020, Noam Yakob Behar.
U.S. Appl. No. 16/917,664, filed Jun. 30, 2020, Xiaohu Liu.
U.S. Appl. No. 16/921,665, filed Jul. 6, 2020, Honglei Liu.
U.S. Appl. No. 16/998,423, filed Aug. 20, 2020, Armen Aghajanyan.
U.S. Appl. No. 17/006,377, filed Aug. 28, 2020, Shivani Poddar.
U.S. Appl. No. 17/006,339, filed Aug. 28, 2020, Shivani Poddar.
U.S. Appl. No. 17/006,260, filed Aug. 28, 2020, William Crosby Presant.
U.S. Appl. No. 17/035,253, filed Sep. 28, 2020, Piyush Khemka.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
U.S. Appl. No. 62/923,342, filed Oct. 18, 2019, Michael Robert Hanson.
Tepper, Naama, Anat Hashavit, Maya Barnea, Inbal Ronen, and Lior Leiba. "Collabot: Personalized Group Chat Summarization." In Proceedings of the Eleventh ACM International Conference on Web Search and Data Mining, pp. 771-774, Feb. 5, 2018.
Honglei Liu, et al.: Explore-Exploit: A Framework for Interactive and Online Learning, arXiv:1812.00116, Dec. 1, 2018.
Chat Extensions, https://developers.facebook.com/docs/messenger-platform/guides/chat-extensions, Apr. 18, 2017.
Kottur, Satwik, et al. "Visual coreference resolution in visual dialog using neural module networks." Proceedings of the European Conference on Computer Vision (ECCV). 2018, Sep. 8-14, 2018.
Kumar, Ankit, et al. "Ask me anything: Dynamic memory networks for natural language processing." International conference on machine learning. 2016, Jan. 6, 2016.
Moon, Seungwhan, Suyoun Kim, and Haohan Wang. "Multimodal transfer deep learning with applications in audio-visual recognition." arXiv preprint arXiv:1412.3121 (2014), Dec. 9, 2014.
Moon, Seungwhan, Leonardo Neves, and Vitor Carvalho. "Multimodal named entity recognition for short social media posts." arXiv preprint arXiv:1802.07862 (2018), Feb. 22, 2018.
Moon, Seungwhan, Leonardo Neves, and Vitor Carvalho. "Zeroshot Multimodal Named Entity Disambiguation for Noisy Social Media Posts." Proceedings of the 56th Annual Meeting of the Association for Computational Linguistics (vol. 1: Long Papers). 2018, Jul. 15-20, 2018.
Shah, Pararth, et al. "Bootstrapping a neural conversational agent with dialogue self-play, crowdsourcing and on-line reinforcement learning." Proceedings of the 2018 Conference of the North American Chapter of the Association for Computational Linguistics: Human Language Technologies, vol. 3 (Industry Papers). 2018, Jun. 1-6, 2018.
Dinan, Emily, et al. "Advances in Conversational AI" https://ai.facebook.com/blog/advances-in-conversational-ai/?_xts_%5b0%5d=68.ARDgZpslcbW2Y4dGWBF1BBfrsZkeNMXeTFXLveffyaOCR J0iNA80NQfAJ9Y6urka2DI6EQcbA0JoTxUuSGUFT-BkfYahB61LnX-UMQR5tBiRXkYbJ43fS6THchGawfWiM4ESBHe_Qk7V7IUT97zwgqpCzg6vrR0EQTvuELallEkfW1sb7BGN16RGo mEiQCRC38TiqG3U-3Vk0Mns4L-esrTNWyC3RoyMpYGOFkTw Mwb2q8yHbkVod9ZwDKi6XC01CIhVlwa_BAz3zlNQR-FV4z-1kOf7M-xGMuXDbTjDgf7nhCeQmiY4Afa-Dcf6OVbG2dKgFXztbN3Jgin0iVPBw_nVkQ&_tn_=-UK-R, Aug. 2, 2019.
Ott, Myle, et al. "New advances in natural language processing to better connect people" https://ai.facebook.com/blog/new-advances-in-natural-language-processing-to-better-connect-people/?_xts_%5b0%5d=68.ARBpsX-0s8sV0sN3kxbWpovzVrkSOpnfR5CANgCy VPB6BtolxwZPobEfGlXdGEOnfVPVTA3-LJPx6L1COHs5_Kqixd 4ZXIjEssji04CQGloA0SmwZeEDo2tSV4hCmYGlTKMotQzPWB 6QA9iS_e5_13t_m4jANArPOC6M9tzzXxfmixtWiYv-Zkvc2dJ-9MFVyXrv2vxijyqLOat3oKUvmwPQ5Gzny2yjqjE6JT8uuXmXvB JgxSJqrHZYvhoaP6sEWsMt6LQBtC_DzR7nIlbgSBAIdbh2EYVH RLJzdp7flnuepGacg7ZmKHJ4P235Qyi6fy06TFynBX7x8AErGZA qI5dbkg&_tn_=-UK-R, Aug. 14, 2019.
Das, Abhishek, Satwik Kottur, Khushi Gupta, Avi Singh, Deshraj Yadav, José MF Moura, Devi Parikh, and Dhruv Batra. "Visual dialog." In Proceedings of the IEEE Conference on Computer Vision and Pattern Recognition, pp. 326-335, Aug. 1, 2017.
Seo, Paul Hongsuck, Andreas Lehrmann, Bohyung Han, and Leonid Sigal. "Visual reference resolution using attention memory for visual dialog." In Advances in neural information processing systems, pp. 3719-3729, Aug. 6, 2018.
Kottur, Satwik, José MF Moura, Devi Parikh, Dhruv Batra, and Marcus Rohrbach. "Visual coreference resolution in visual dialog using neural module networks." In Proceedings of the European Conference on Computer Vision (ECCV), pp. 153-169, Sep. 6, 2018.
Lu, Jiasen, Anitha Kannan, Jianwei Yang, Devi Parikh, and Dhruv Batra. "Best of both worlds: Transferring knowledge from discriminative learning to a generative visual dialog model." In Advances in Neural Information Processing Systems, pp. 314-324, Oct. 27, 2017.
Das, Abhishek, Satwik Kottur, José MF Moura, Stefan Lee, and Dhruv Batra. "Learning cooperative visual dialog agents with deep reinforcement learning." In Proceedings of the IEEE international conference on computer vision, pp. 2951-2960, Mar. 21, 2017.
Kottur, Satwik, José MF Moura, Devi Parikh, Dhruv Batra, and Marcus Rohrbach. "Clevr-dialog: A diagnostic dataset for multi-round reasoning in visual dialog." arXiv preprint arXiv:1903.03166. pp. 1-13, Sep. 18, 2019.
Johnson, Justin, Bharath Hariharan, Laurens van der Maaten, Li Fei-Fei, C. Lawrence Zitnick, and Ross Girshick. "Clevr: A diagnostic dataset for compositional language and elementary visual reasoning." In Proceedings of the IEEE Conference on Computer Vision and Pattern Recognition, pp. 1-17, Dec. 20, 2016.
Niu, Yulei, Hanwang Zhang, Manli Zhang, Jianhong Zhang, Zhiwu Lu, and Ji-Rong Wen. "Recursive visual attention in visual dialog." In Proceedings of the IEEE Conference on Computer Vision and Pattern Recognition, pp. 6679-6688, Apr. 6, 2019.
Massiceti, Daniela, N. Siddharth, Puneet K. Dokania, and Philip HS Torr. "Flipdial: A generative model for two-way visual dialogue." In Proceedings of the IEEE Conference on Computer Vision and Pattern Recognition, pp. 6097-6105, Apr. 3, 2018.
Wu, Qi, Peng Wang, Chunhua Shen, Ian Reid, and Anton Van Den Hengel. "Are you talking to me? reasoned visual dialog generation through adversarial learning." In Proceedings of the IEEE Conference on Computer Vision and Pattern Recognition, pp. 6106-6115, Nov. 21, 2017.
Schwartz, Idan, Seunghak Yu, Tamir Hazan, and Alexander G. Schwing. "Factor graph attention." In Proceedings of the IEEE Conference on Computer Vision and Pattern Recognition, pp. 2039-2048, Mar. 7, 2020.

(56) References Cited

OTHER PUBLICATIONS

Yang, Jianwei, Jiasen Lu, Stefan Lee, Dhruv Batra, and Devi Parikh. "Graph r-cnn for scene graph generation." In *Proceedings of the European conference on computer vision (ECCV)*, pp. 670-685, Aug. 1, 2018.

Hudson, Drew A., and Christopher D. Manning. "Gqa: A new dataset for real-world visual reasoning and compositional question answering." In *Proceedings of the IEEE Conference on Computer Vision and Pattern Recognition*, pp. 6700-6709, May 10, 2019.

De Vries, Harm, Florian Strub, Sarath Chandar, Olivier Pietquin, Hugo Larochelle, and Aaron Courville. "Guesswhat?! visual object discovery through multi-modal dialogue." In *Proceedings of the IEEE Conference on Computer Vision and Pattern Recognition*, pp. 5503-5512, Feb. 6, 2017.

Strub, Florian, Harm De Vries, Jeremie Mary, Bilal Piot, Aaron Courville, and Olivier Pietquin. "End-to-end optimization of goal-driven and visually grounded dialogue systems." arXiv preprint arXiv:1703.05423. pp 1-7, Mar. 15, 2017.

Yang, Jianwei, Jiasen Lu, Stefan Lee, Dhruv Batra, and Devi Parikh. "Visual curiosity: Learning to ask questions to learn visual recognition." arXiv preprint arXiv:1810.00912. pp. 1-18, Oct. 1, 2018.

\* cited by examiner

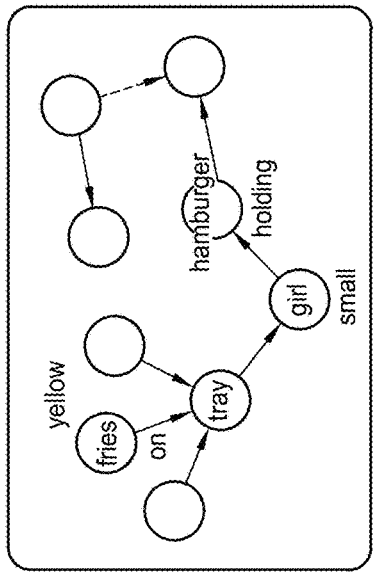

Pattern: What/Which <type> [do you think] <is> <dobject>, <attr> or <decoy>?
Program: Select: <dobject> --> Chose <type>; <attr> | <decoy>
Reference: The food on the red object left of the small girl that is holding a hamburger
Decoy: brown What color is the food on the red object left of the small girl that is holding a hamburger, yellow or brown?

Select: hamburger --> Relate: girl, holding --> Filter size: small --> Relate: object, left --> Filter color: red --> Relate: food, on --> Choose color: yellow | brown Dialog 700

| Round | Question | Answer |
|---|---|---|
| Caption | A girl holding a burger in her hand. | |
| 1 | What color dress is the girl wearing? | A yellow shirt with a red sweater |
| 2 | What is her facial expression? | She is smiling. |
| 3 | What does the burger contain? | Lettuce. |
| 4 | Is there anything else in the scene? | There is a tray full of food. |
| 5 | What kind? | Fries and some kind of salad |
| 6 | Is there anything else on the tray? | A smoothie |

*FIG. 7*

| | Question | Answer | |
|---|---|---|---|
| 1 | What is the price of this blue dress? | It is $50.00. | blue dress — N — price = $50 (A1) |
| 2 | What fabric is it made of? | It appears to be made of cotton. | fabric=cotton (A2) — blue dress — N — price = $50 (A1) |
| 3 | Where was it made? | It was made in France. | fabric=cotton (A2) — blue dress — N — price = $50 (A1), country of origin = France (A3) |

Dialog 850

*FIG. 8B*

| | Question | Answer | |
|---|---|---|---|
| 1 | About how old does the batter look? | 16. | N1 Batter — A1 Age = 16 |
| 2 | What is his facial expression? | I can't tell. | A2 Facial expression = unknown — N1 Batter — A1 Age = 16 |
| 3 | What color is his uniform? | Black with gold lettering. | N1 Batter — A1 Age = 16; A3 Uniform = black with gold lettering; A2 Facial expression = unknown |
| 4 | Can you see his number? | No. | A4 Number = unknown — N1 Batter — A1 Age = 16; A3 Uniform = black with gold lettering; A2 Facial expression = unknown |
| 5 | Who is behind him? | The catcher. | A4 Number = unknown; A1 Age = 16; N1 Batter — front of / behind — N2 Catcher; A3 Uniform = black with gold lettering; behind / front of; right of / left of; A2 Facial expression = unknown; Coach |

*FIG. 10B*

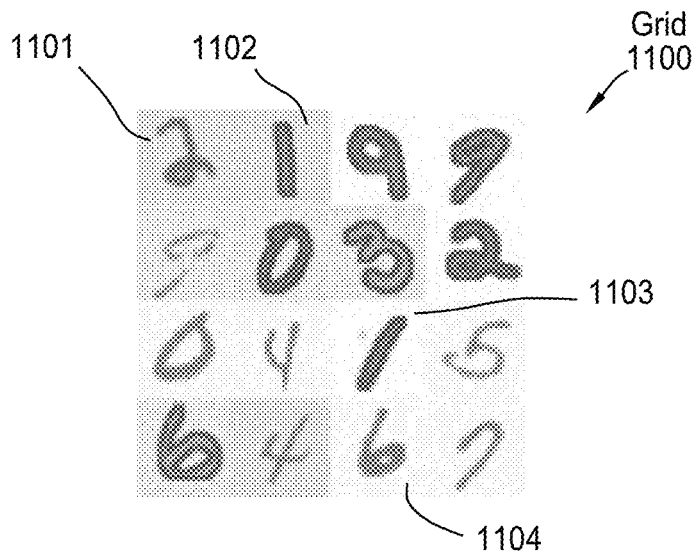

FIG. 11A

CV Module Output

<object> = box with digit "2"
<object> = box with digit "1"
<object> = box with digit "9"
<object> = box with digit "9"
<object> = box with digit "9"
<object> = box with digit "0"
<object> = box with digit "3"
<object> = box with digit "2"
<object> = box with digit "0"
<object> = box with digit "4"
<object> = box with digit "1"
<object> = box with digit "5"
<object> = box with digit "6"
<object> = box with digit "4"
<object> = box with digit "6"
<object> = box with digit "7"

Dialog 1110a

FIG. 11B

Dialog 1110b

| | Question | Answer | |
|---|---|---|---|
| 1 | Are there any digits in a salmon background? | Three. | <object> = box with digit "2", <color> = salmon<br><object> = box with digit "1", <color> = salmon<br><object> = box with digit "9", <color> = white<br><object> = box with digit "9", <color> = white<br><object> = box with digit "9", <color> = gray<br><object> = box with digit "0", <color> = cyan<br><object> = box with digit "3", <color> = gray<br><object> = box with digit "2", <color> = white<br><object> = box with digit "0", <color> = yellow<br><object> = box with digit "4", <color> = yellow<br><object> = box with digit "1", <color> = white<br><object> = box with digit "5", <color> = yellow<br><object> = box with digit "6", <color> = gray<br><object> = box with digit "4", <color> = salmon<br><object> = box with digit "6", <color> = yellow<br><object> = box with digit "7", <color> = yellow |
| 2 | How many fours are there among them? | One. | <object> = box with digit "2", <color> = salmon<br><object> = box with digit "1", <color> = salmon<br><object> = box with digit "4", <color> = salmon |
| 3 | What is the style of the four? | Flat. | [Graph: N1 "Box with digit '4'" connected to A2 "Digit-style = flat" and A1 "Color = salmon"] |
| 4 | What is the color of the digit? | Violet. | [Graph: N1 "Box with digit '4'" connected to A3 "Digit-color = violet", A1 "Color = salmon", and A2 "Digit-style = flat"] |
| 5 | What is the background color of the digit above it? | Yellow. | [Graph: N2 "Box with digit '4'" with Color = yellow, above N1 "Box with digit '4'"; N1 connected to "Box with digit '6'" (Color = gray) on left (right of), "Box with digit '6'" (Color = yellow) on right (left of); N1 has A1 Color = salmon, A2 Digit-style = flat, A3 Digit-color = violet] |

*FIG. 11C*

MULTIMODAL STATE TRACKING VIA SCENE GRAPHS FOR ASSISTANT SYSTEMS

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. As an example and not by way of limitation, the assistant system may support both audio (verbal) input and nonverbal input, such as vision, location, gesture, motion, or hybrid/multimodal input. The assistant system may create and store a user profile comprising both personal and contextual information associated with the user. In particular embodiments, the assistant system may analyze the user input using natural-language understanding. The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, an assistant-based method may provide multimodal dialog state tracking via scene graphs generated and stored based on user dialog rather than automatically from incoming data, such as visual data, from a scene surrounding a user. Storing all data received from a client system and continuously analyzing it to recognize and track objects/entities may often be undesirably resource intensive, and may further require an impractical amount of memory. Accordingly, the present assistant system may rely on the user to indicate objects of interest from this data so that such resources may be utilized more efficiently. Identified objects of interest may be stored, and a scene graph of relevant data to be stored may be incrementally generated based on the user's interactions with the assistant system concerning the objects of interest. Nodes representing the objects of interest that the user has referenced in a dialog may be added to this scene graph, connected by edges indicating attributes of and/or relationships between relevant objects. Initially, as data of a scene surrounding a user is first received, it may be lightly tagged with object identifiers of objects portrayed within the data, and a rough scene graph may be initialized and seeded with this tagged data if needed in order to allow the assistant system to understand and respond to user requests. Such creation and seeding of the scene graph may occur when the user asks an initial question about an entity in the data. Subsequently, data relevant to this user query may be added to the scene graph and stored in the multimodal dialog state.

In particular embodiments, the assistant system may receive, from a client system associated with a user, a first user request that includes a reference to a target object and one or more of an attribute or a relationship of the target object. The assistant system may then access visual data including one or more images portraying the target object, and may resolve the reference to the target object portrayed in the one or more images. The assistant system may then determine object information of the target object corresponding to the referenced attribute or relationship of the first user request based on a visual analysis of the one or more images. Finally, the assistant system may store, responsive to receiving the first user request, the object information of the target object in a multimodal dialog state.

Certain technical challenges exist for analyzing data received at an assistant system from a client system in order to determine and maintain information of objects of interest to a user. One such technical challenge may include the amount of resources and memory required to process all the incoming data. The solution presented by the embodiments disclosed herein to address this challenge may be to rely on the user to indicate objects of interest from within this data. Rather than analyzing all incoming data, the assistant system may simply begin analysis of the data in response to receiving an initial user request from the user about a surrounding scene. In response to this request, the assistant system may create an initial scene graph and seed it with data of the scene in order to determine a particular object of interest referenced by the user. Subsequently, the assistant system may further analyze the object of interest to determine the requested information of that object of interest. Additionally, rather than performing a complete analysis of the object of interest and determining as much information up-front as possible, the assistant system may further conserve resources by relying on the user to indicate attributes of interest of the object of interest, and may simply analyze the object of interest to the extent required to determine those specific attributes of interest.

Another technical challenge may include the amount of memory required to store all the incoming data from the client system. The solution presented by the embodiments disclosed herein to address this challenge may be to incrementally generate a scene graph including the objects and attributes of interest as indicated by the user, and simply store the resulting scene graph that has the incrementally added information, rather than storing all information detected in a scene. In addition to reducing the amount of required memory, storage of such targeted information may further enable the storage of more data relevant to the user for longer periods of time.

Certain embodiments disclosed herein may provide one or more technical advantages. A technical advantage of the embodiments may include enabling a longer-term storage of information relevant to the user of the client system. Another technical advantage of the embodiments may include greater conservation of processing resources and memory by analyzing and storing user-specific information rather than all incoming information, as users are often not interested in the majority of captured data of a scene. Yet another technical advantage of the embodiments may include enabling the assistant system to disambiguate an object of interest from other, similar objects, both at the time of capturing data of these objects and in future user references to the object of interest, due to the targeted storage of the object of interest rather than a more general storage of all similar objects appearing in the captured data. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 illustrates an example dialog concerning a training image with a caption.

FIGS. 8B-8C illustrate the incremental generation of a scene graph during dialog concerning the scene of FIG. 8A.

FIGS. 10B-10D illustrate the incremental generation of scene graphs concerning the scene of FIG. 10A over time.

FIG. 11A illustrates an example image of a colored grid.

FIGS. 11B-11D illustrate the incremental generation of a scene graph during a dialog concerning the colored grid of FIG. 11A.

DESCRIPTION OF EXAMPLE EMBODIMENTS

System Overview

Figure 1:
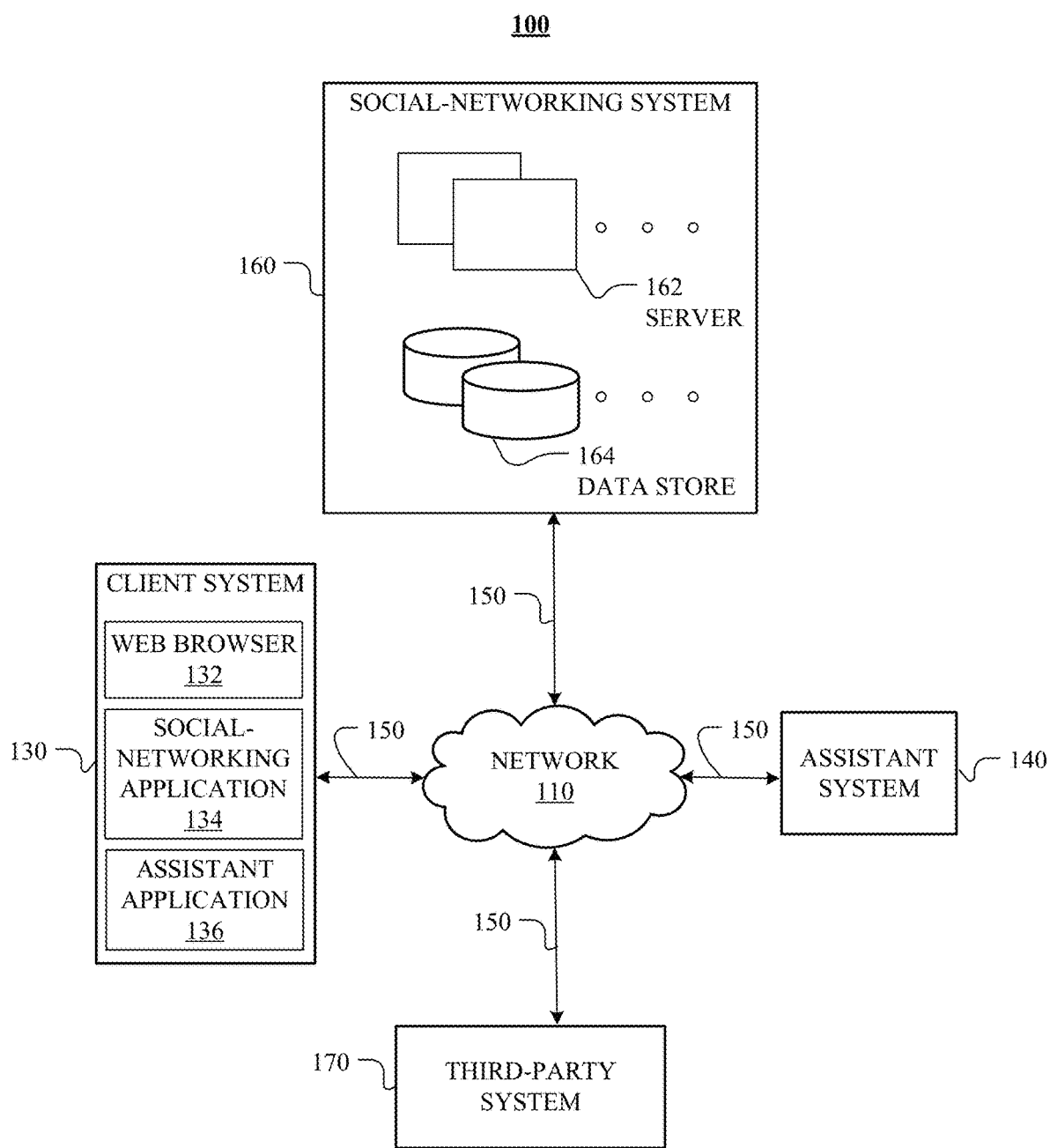
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application Ser. No. 29/631,910, filed 3 Jan. 2018, U.S. Design patent application Ser. No. 29/631,747, filed 2 Jan. 2018, U.S. Design patent application Ser. No. 29/631,913, filed 3 Jan. 2018, and U.S. Design patent application Ser. No. 29/631,914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality) by speaking into a microphone of the client system 130. The assistant application 136 may then communicate the request to the assistant system 140. The assistant system 140 may accordingly generate a response and send it back to the assistant application 136. The assistant application 136 may further present the response to the user in text and/or images on a display of the client system 130.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes-which may include multiple user nodes (each corresponding to a particular user) or multiple concept nodes (each corresponding to a particular concept) and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
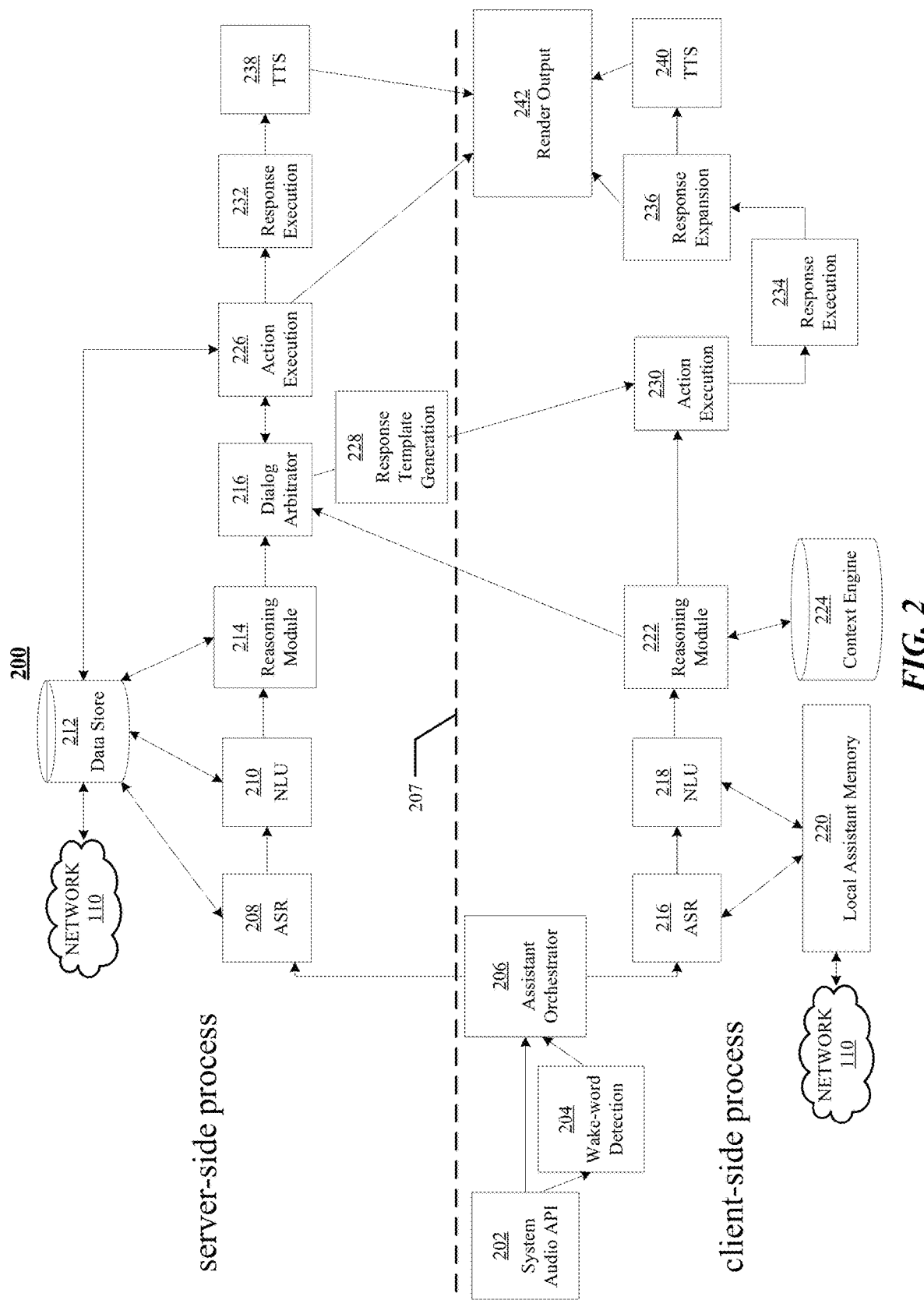
FIG. 2 illustrates an example architecture of the assistant system.

FIG. 2 illustrates an example architecture of an assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. As an example and not by way of limitation, the assistant system 140 may support both audio input (verbal) and nonverbal input, such as vision, location, gesture, motion, or hybrid/multi-modal input. The assistant system 140 may create and store a user profile comprising both personal and contextual information associated with the user. In particular embodiments, the assistant system 140 may analyze the user input using natural-language understanding. The analysis may be based on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist the user via a hybrid architecture built upon both client-side processes and server-side processes. The client-side processes and the server-side processes may be two parallel workflows for processing a user input and providing assistances to the user. In particular embodiments, the client-side processes may be performed locally on a client system 130 associated with a user. By contrast, the server-side processes may be performed remotely on one or more computing systems. In particular embodiments, an assistant orchestrator on the client system 130 may coordinate receiving user input (e.g., audio signal) and determine whether to use client-side processes, server-side processes, or both, to respond to the user input. A dialog arbitrator may analyze the processing results from each process. The dialog arbitrator may instruct agents on the client-side or server-side to execute tasks associated with the user input based on the aforementioned analyses. The execution results may be further rendered as output to the client system 130. By leveraging both client-side and server-side processes, the assistant system 140 can effectively assist a user with optimal usage of computing resources while at the same time protecting user privacy and enhancing security.

In particular embodiments, the assistant system 140 may receive a user input from a client system 130 associated with the user. In particular embodiments, the user input may be a user-generated input that is sent to the assistant system 140 in a single turn. The user input may be verbal, nonverbal, or a combination thereof. As an example and not by way of limitation, the nonverbal user input may be based on the user's voice, vision, location, activity, gesture, motion, or a combination thereof. If the user input is based on the user's voice (e.g., the user may speak to the client system 130), such user input may be first processed by a system audio API 202 (application programming interface). The system audio API 202 may conduct echo cancellation, noise removal, beam forming, and self-user voice activation, speaker identification, voice activity detection (VAD), and any other acoustic techniques to generate audio data that is readily processable by the assistant system 140. In particular embodiments, the system audio API 202 may perform wake-word detection 204 from the user input. As an example and not by way of limitation, a wake-word may be "hey assistant". If such wake-word is detected, the assistant system 140 may be activated accordingly. In alternative embodiments, the user may activate the assistant system 140 via a visual signal without a wake-word. The visual signal may be received at a low-power sensor (e.g., a camera) that can detect various visual signals. As an example and not by way of limitation, the visual signal may be a barcode, a QR code or a universal product code (UPC) detected by the client system 130. As another example and not by way of limitation, the visual signal may be the user's gaze at an object. As yet another example and not by way of limitation, the visual signal may be a user gesture, e.g., the user pointing at an object.

In particular embodiments, the audio data from the system audio API 202 may be sent to an assistant orchestrator 206. The assistant orchestrator 206 may be executing on the client system 130. In particular embodiments, the assistant orchestrator 206 may determine whether to respond to the user input by using client-side processes, server-side processes, or both. As indicated in FIG. 2, the client-side processes are illustrated below the dashed line 207 whereas the server-side processes are illustrated above the dashed line 207. The assistant orchestrator 206 may also determine to respond to the user input by using both the client-side processes and the server-side processes simultaneously. Although FIG. 2 illustrates the assistant orchestrator 206 as being a client-side process, the assistant orchestrator 206 may be a server-side process or may be a hybrid process split between client- and server-side processes.

In particular embodiments, the server-side processes may be as follows after audio data is generated from the system audio API 202. The assistant orchestrator 206 may send the audio data to a remote computing system that hosts different modules of the assistant system 140 to respond to the user input. In particular embodiments, the audio data may be received at a remote automatic speech recognition (ASR) module 208. The ASR module 208 may allow a user to dictate and have speech transcribed as written text, have a document synthesized as an audio stream, or issue commands that are recognized as such by the system. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise different components. The ASR module 208 may comprise one or more of a grapheme-to-phoneme (G2P) model, a pronunciation learning model, a personalized acoustic model, a personalized language model (PLM), or an end-pointing model. In particular embodiments, the G2P model may be used to determine a user's grapheme-to-phoneme style, e.g., what it may sound like when a particular user speaks a particular word. The personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may be also used to predict what words a user is most likely to say given a context. In particular embodiments, the end-pointing model may detect when the end of an utterance is reached.

In particular embodiments, the output of the ASR module 208 may be sent to a remote natural-language understanding (NLU) module 210. The NLU module 210 may perform named entity resolution (NER). The NLU module 210 may additionally consider contextual information when analyzing the user input. In particular embodiments, an intent and/or a slot may be an output of the NLU module 210. An intent may be an element in a pre-defined taxonomy of semantic intentions, which may indicate a purpose of a user interacting with the assistant system 140. The NLU module 210 may classify a user input into a member of the pre-defined taxonomy, e.g., for the input "Play Beethoven's 5th," the NLU module 210 may classify the input as having the intent [IN: play_music]. In particular embodiments, a domain may denote a social context of interaction, e.g., education, or a namespace for a set of intents, e.g., music. A slot may be a named sub-string corresponding to a character string within the user input, representing a basic semantic entity. For example, a slot for "pizza" may be [SL: dish]. In particular embodiments, a set of valid or expected named slots may be conditioned on the classified intent. As an example and not by way of limitation, for the intent [IN: play_music], a valid slot may be [SL: song_name]. In particular embodiments, the NLU module 210 may additionally extract information from one or more of a social graph, a knowledge graph, or a concept graph, and retrieve a user's profile from one or more remote data stores 212. The NLU module 210 may further process information from these different sources by determining what information to aggregate, annotating n-grams of the user input, ranking the n-grams with confidence scores based on the aggregated information, and formulating the ranked n-grams into features that can be used by the NLU module 210 for understanding the user input.

In particular embodiments, the NLU module 210 may identify one or more of a domain, an intent, or a slot from the user input in a personalized and context-aware manner. As an example and not by way of limitation, a user input may comprise "show me how to get to the coffee shop". The NLU module 210 may identify the particular coffee shop that the user wants to go based on the user's personal information and the associated contextual information. In particular embodiments, the NLU module 210 may comprise a lexicon of a particular language and a parser and grammar rules to partition sentences into an internal representation. The NLU module 210 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to a remote reasoning module 214. The reasoning module 214 may comprise a dialog manager and an entity resolution component. In particular embodiments, the dialog manager may have complex dialog logic and product-related business logic. The dialog manager may manage the dialog state and flow of the conversation between the user and the assistant system 140. The dialog manager may additionally store previous conversations between the user and the assistant system 140. In particular embodiments, the dialog manager may communicate with the entity resolution component to resolve entities associated with the one or more slots, which supports the dialog manager to advance the flow of the conversation between the user and the assistant system 140. In particular embodiments, the entity resolution component may access one or more of the social graph, the knowledge graph, or the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a book "Alice's Adventures", which includes information that has been extracted from multiple content sources (e.g., an online social network, online encyclopedias, book review sources, media databases, and entertainment content sources), and then deduped, resolved, and fused to generate the single unique record for the knowledge graph. The entity may be associated with a "fantasy" attribute value which indicates the genre of the book "Alice's Adventures". More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the entity resolution component may check the privacy constraints to guarantee that the resolving of the entities does not violate privacy policies. As an example and not by way of limitation, an entity to be resolved may be another user who specifies in his/her privacy settings that his/her identity should not be searchable on the online social network, and thus the entity resolution component may not return that user's identifier in response to a request. Based on the information obtained from the social graph, the knowledge graph, the concept graph, and the user profile, and subject to applicable privacy policies, the entity resolution component may therefore resolve the entities associated with the user input in a personalized, context-aware, and privacy-aware manner. In particular embodiments, each of the resolved entities may be associated with one or more identifiers hosted by the social-networking system 160. As an example and not by way of limitation, an identifier may comprise a unique user identifier (ID) corresponding to a particular user (e.g., a unique username or user ID number). In particular embodiments, each of the resolved entities may be also associated with a confidence score. More information on resolving entities may be found in U.S. patent application Ser. No. 16/048, 049, filed 27 Jul. 2018, and U.S. patent application Ser. No. 16/048,072, filed 27 Jul. 2018, each of which is incorporated by reference.

In particular embodiments, the dialog manager may conduct dialog optimization and assistant state tracking. Dialog optimization is the problem of using data to understand what the most likely branching in a dialog should be. As an example and not by way of limitation, with dialog optimization the assistant system 140 may not need to confirm who a user wants to call because the assistant system 140 has high confidence that a person inferred based on dialog optimization would be very likely whom the user wants to call. In particular embodiments, the dialog manager may use reinforcement learning for dialog optimization. Assistant state tracking aims to keep track of a state that changes over time as a user interacts with the world and the assistant system 140 interacts with the user. As an example and not by way of limitation, assistant state tracking may track what a user is talking about, whom the user is with, where the user is, what tasks are currently in progress, and where the user's gaze is at, etc., subject to applicable privacy policies. In particular embodiments, the dialog manager may use a set of operators to track the dialog state. The operators may comprise the necessary data and logic to update the dialog state. Each operator may act as delta of the dialog state after processing an incoming request. In particular embodiments, the dialog manager may further comprise a dialog state tracker and an action selector. In alternative embodiments, the dialog state tracker may replace the entity resolution component and resolve the references/mentions and keep track of the state.

In particular embodiments, the reasoning module 214 may further conduct false trigger mitigation. The goal of false trigger mitigation is to detect false triggers (e.g., wake-word) of assistance requests and to avoid generating false records when a user actually does not intend to invoke the assistant system 140. As an example and not by way of limitation, the reasoning module 214 may achieve false trigger mitigation based on a nonsense detector. If the nonsense detector determines that a wake-word makes no sense at this point in the interaction with the user, the reasoning module 214 may determine that inferring the user intended to invoke the assistant system 140 may be incorrect. In particular embodiments, the output of the reasoning module 214 may be sent a remote dialog arbitrator 216.

In particular embodiments, each of the ASR module 208, NLU module 210, and reasoning module 214 may access the remote data store 212, which comprises user episodic memories to determine how to assist a user more effectively. More information on episodic memories may be found in U.S. patent application Ser. No. 16/552,559, filed 27 Aug. 2019, which is incorporated by reference. The data store 212 may additionally store the user profile of the user. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference.

In particular embodiments, parallel to the aforementioned server-side process involving the ASR module 208, NLU module 210, and reasoning module 214, the client-side process may be as follows. In particular embodiments, the output of the assistant orchestrator 206 may be sent to a local ASR module 216 on the client system 130. The ASR module 216 may comprise a personalized language model (PLM), a G2P model, and an end-pointing model. Because of the limited computing power of the client system 130, the assistant system 140 may optimize the personalized language model at run time during the client-side process. As an example and not by way of limitation, the assistant system 140 may pre-compute a plurality of personalized language models for a plurality of possible subjects a user may talk about. When a user requests assistance, the assistant system 140 may then swap these pre-computed language models quickly so that the personalized language model may be optimized locally by the assistant system 140 at run time based on user activities. As a result, the assistant system 140 may have a technical advantage of saving computational resources while efficiently determining what the user may be talking about. In particular embodiments, the assistant system 140 may also re-learn user pronunciations quickly at run time.

In particular embodiments, the output of the ASR module 216 may be sent to a local NLU module 218. In particular embodiments, the NLU module 218 herein may be more compact compared to the remote NLU module 210 supported on the server-side. When the ASR module 216 and NLU module 218 process the user input, they may access a local assistant memory 220. The local assistant memory 220 may be different from the user memories stored on the data store 212 for the purpose of protecting user privacy. In particular embodiments, the local assistant memory 220 may be syncing with the user memories stored on the data store 212 via the network 110. As an example and not by way of limitation, the local assistant memory 220 may sync a calendar on a user's client system 130 with a server-side calendar associate with the user. In particular embodiments, any secured data in the local assistant memory 220 may be only accessible to the modules of the assistant system 140 that are locally executing on the client system 130.

In particular embodiments, the output of the NLU module 218 may be sent to a local reasoning module 222. The reasoning module 222 may comprise a dialog manager and an entity resolution component. Due to the limited computing power, the reasoning module 222 may conduct on-device learning that is based on learning algorithms particularly tailored for client systems 130. As an example and not by way of limitation, federated learning may be used by the reasoning module 222. Federated learning is a specific category of distributed machine learning approaches which trains machine learning models using decentralized data residing on end devices such as mobile phones. In particular embodiments, the reasoning module 222 may use a particular federated learning model, namely federated user representation learning, to extend existing neural-network personalization techniques to federated learning. Federated user representation learning can personalize models in federated learning by learning task-specific user representations (i.e., embeddings) or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged on a remote server. Federated parameters, by contrast, may be trained remotely on the server. In particular embodiments, the reasoning module 222 may use another particular federated learning model, namely active federated learning to transmit a global model trained on the remote server to client systems 130 and calculate gradients locally on these client systems 130. Active federated learning may enable the reasoning module to minimize the transmission costs associated with downloading models and uploading gradients. For active federated learning, in each round client systems are selected not uniformly at random, but with a probability conditioned on the current model and the data on the client systems to maximize efficiency. In particular embodiments, the reasoning module 222 may use another particular federated learning model, namely federated Adam. Conventional federated learning model may use stochastic gradient descent (SGD) optimizers. By contrast, the federated Adam model may use moment-based optimizers. Instead of using the averaged model directly as what conventional work does, federated Adam model may use the averaged model to compute approximate gradients. These gradients may be then fed into the federated Adam model, which may de-noise stochastic gradients and use a per-parameter adaptive learning rate. Gradients produced by federated learning may be even noisier than stochastic gradient descent (because data may be not independent and identically distributed), so federated Adam model may help even more deal with the noise. The federated Adam model may use the gradients to take smarter steps towards minimizing the objective function. The experiments show that conventional federated learning on a benchmark has 1.6% drop in ROC (Receiver Operating Characteristics) curve whereas federated Adam model has only 0.4% drop. In addition, federated Adam model has no increase in communication or on-device computation. In particular embodiments, the reasoning module 222 may also perform false trigger mitigation. This false trigger mitigation may help detect false activation requests, e.g., wake-word, on the client system 130 when the user's speech input comprises data that is subject to privacy constraints. As an example and not by way of limitation, when a user is in a voice call, the user's conversation is private and the false trigger detection based on such conversation can only occur locally on the user's client system 130.

In particular embodiments, the assistant system 140 may comprise a local context engine 224. The context engine 224 may process all the other available signals to provide more informative cues to the reasoning module 222. As an example and not by way of limitation, the context engine 224 may have information related to people, sensory data from client system 130 sensors (e.g., microphone, camera) that are further analyzed by computer vision technologies, geometry constructions, activity data, inertial data (e.g., collected by a VR headset), location, etc. In particular embodiments, the computer vision technologies may comprise human skeleton reconstruction, face detection, facial recognition, hand tracking, eye tracking, etc. In particular embodiments, geometry constructions may comprise constructing objects surrounding a user using data collected by a client system 130. As an example and not by way of limitation, the user may be wearing AR glasses and geometry construction may aim to determine where the floor is, where the wall is, where the user's hands are, etc. In particular embodiments, inertial data may be data associated with linear and angular motions. As an example and not by way of limitation, inertial data may be captured by AR glasses which measures how a user's body parts move.

In particular embodiments, the output of the local reasoning module 222 may be sent to the dialog arbitrator 216. The dialog arbitrator 216 may function differently in three scenarios. In the first scenario, the assistant orchestrator 206 determines to use server-side process, for which the dialog arbitrator 216 may transmit the output of the reasoning module 214 to a remote action execution module 226. In the second scenario, the assistant orchestrator 206 determines to use both server-side processes and client-side processes, for which the dialog arbitrator 216 may aggregate output from both reasoning modules (i.e., remote reasoning module 214 and local reasoning module 222) of both processes and analyze them. As an example and not by way of limitation, the dialog arbitrator 216 may perform ranking and select the best reasoning result for responding to the user input. In particular embodiments, the dialog arbitrator 216 may further determine whether to use agents on the server-side or on the client-side to execute relevant tasks based on the analysis. In the third scenario, the assistant orchestrator 206 determines to use client-side processes and the dialog arbitrator 216 needs to evaluate the output of the local reasoning module 222 to determine if the client-side processes can complete the task of handling the user input. In alternative embodiments, the output of the reasoning module 222 may be not sent to the dialog arbitrator 216 if the assistant orchestrator 206 determines to use client-side processes and that client-side processes are fully capable of processing the user input.

In particular embodiments, for the first and second scenarios mentioned above, the dialog arbitrator 216 may determine that the agents on the server-side are necessary to execute tasks responsive to the user input. Accordingly, the dialog arbitrator 216 may send necessary information regarding the user input to the action execution module 226. The action execution module 226 may call one or more agents to execute the tasks. In alternative embodiments, the action selector of the dialog manager may determine actions to execute and instruct the action execution module 226 accordingly. In particular embodiments, an agent may be an implementation that serves as a broker across a plurality of content providers for one domain. A content provider may be an entity responsible for carrying out an action associated with an intent or completing a task associated with the intent. In particular embodiments, the agents may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, work, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, for the second and third scenarios mentioned above, the dialog arbitrator 216 may determine that the agents on the client-side are capable of executing tasks responsive to the user input but additional information is needed (e.g., response templates) or that the tasks can be only handled by the agents on the server-side. If the dialog arbitrator 216 determines that the tasks can be only handled by the agents on the server-side, the dialog arbitrator 216 may send necessary information regarding the user input to the action execution module 226. If the dialog arbitrator 216 determines that the agents on the client-side are capable of executing tasks but response templates are needed, the dialog arbitrator 216 may send necessary information regarding the user input to a remote response template generation module 228. The output of the response template generation module 228 may be further sent to a local action execution module 230 executing on the client system 130. In particular embodiments, if the assistant orchestrator 206 determines to use client-side processes and that client-side processes are fully capable of processing the user input, the output of the reasoning module 222 may be directly sent to the action execution module 230.

In particular embodiments, the action execution module 230 may call local agents to execute tasks. A local agent on the client system 130 may be able to execute simpler tasks compared to an agent on the server-side. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the action execution module 230 may additionally perform a set of general executable dialog actions. The set of executable dialog actions may interact with agents, users and the assistant system 140 itself. These dialog actions may comprise dialog actions for slot request, confirmation, disambiguation, agent execution, etc. The dialog actions may be independent of the underlying implementation of the action selector or dialog policy. Both tree-based policy and model-based policy may generate the same basic dialog actions, with a callback function hiding any action selector specific implementation details.

In particular embodiments, the output from the remote action execution module 226 on the server-side may be sent to a remote response execution module 232. In particular embodiments, the action execution module 226 may communicate back to the dialog arbitrator 216 for more information. The response execution module 232 may be based on a remote conversational understanding (CU) composer. In particular embodiments, the output from the action execution module 226 may be formulated as a <k, c, u, d> tuple, in which k indicates a knowledge source, c indicates a communicative goal, u indicates a user model, and d indicates a discourse model. In particular embodiments, the CU composer may comprise a natural-language generation (NLG) module and a user interface (UI) payload generator. The natural-language generator may generate a communication content based on the output of the action execution module 226 using different language models and/or language templates. In particular embodiments, the generation of the communication content may be application specific and also personalized for each user. The CU composer may also determine a modality of the generated communication content using the UI payload generator. In particular embodiments, the NLG module may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the natural-language generator may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator. The sentence planner may determine the organization of the communication content to make it human understandable. The surface realization component may determine specific words to use, the sequence of the sentences, and the style of the communication content. The UI payload generator may determine a preferred modality of the communication content to be presented to the user. In particular embodiments, the CU composer may check privacy constraints associated with the user to make sure the generation of the communication content follows the privacy policies. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the output from the local action execution module 230 on the client system 130 may be sent to a local response execution module 234. The response execution module 234 may be based on a local conversational understanding (CU) composer. The CU composer may comprise a natural-language generation (NLG) module. As the computing power of a client system 130 may be limited, the NLG module may be simple for the consideration of computational efficiency. Because the NLG module may be simple, the output of the response execution module 234 may be sent to a local response expansion module 236. The response expansion module 236 may further expand the result of the response execution module 234 to make a response more natural and contain richer semantic information.

In particular embodiments, if the user input is based on audio signals, the output of the response execution module 232 on the server-side may be sent to a remote text-to-speech (TTS) module 238. Similarly, the output of the response expansion module 236 on the client-side may be sent to a local TTS module 240. Both TTS modules may convert a response to audio signals. In particular embodiments, the output from the response execution module 232, the response expansion module 236, or the TTS modules on both sides, may be finally sent to a local render output module 242. The render output module 242 may generate a response that is suitable for the client system 130. As an example and not by way of limitation, the output of the response execution module 232 or the response expansion module 236 may comprise one or more of natural-language strings, speech, actions with parameters, or rendered images or videos that can be displayed in a VR headset or AR smart glasses. As a result, the render output module 242 may determine what tasks to perform based on the output of CU composer to render the response appropriately for displaying on the VR headset or AR smart glasses. For example, the response may be visual-based modality (e.g., an image or a video clip) that can be displayed via the VR headset or AR smart glasses. As another example, the response may be audio signals that can be played by the user via VR headset or AR smart glasses. As yet another example, the response may be augmented-reality data that can be rendered VR headset or AR smart glasses for enhancing user experience.

In particular embodiments, the assistant system 140 may have a variety of capabilities including audio cognition, visual cognition, signals intelligence, reasoning, and memories. In particular embodiments, the capability of audio recognition may enable the assistant system 140 to understand a user's input associated with various domains in different languages, understand a conversation and be able to summarize it, perform on-device audio cognition for complex commands, identify a user by voice, extract topics from a conversation and auto-tag sections of the conversation, enable audio interaction without a wake-word, filter and amplify user voice from ambient noise and conversations, understand which client system 130 (if multiple client systems 130 are in vicinity) a user is talking to.

In particular embodiments, the capability of visual cognition may enable the assistant system 140 to perform face detection and tracking, recognize a user, recognize most people of interest in major metropolitan areas at varying angles, recognize majority of interesting objects in the world through a combination of existing machine-learning models and one-shot learning, recognize an interesting moment and auto-capture it, achieve semantic understanding over multiple visual frames across different episodes of time, provide platform support for additional capabilities in people, places, objects recognition, recognize full set of settings and micro-locations including personalized locations, recognize complex activities, recognize complex gestures to control a client system 130, handle images/videos from egocentric cameras (e.g., with motion, capture angles, resolution, etc.), accomplish similar level of accuracy and speed regarding images with lower resolution, conduct one-shot registration and recognition of people, places, and objects, and perform visual recognition on a client system 130.

In particular embodiments, the assistant system 140 may leverage computer vision techniques to achieve visual cognition. Besides computer vision techniques, the assistant system 140 may explore options that can supplement these techniques to scale up the recognition of objects. In particular embodiments, the assistant system 140 may use supplemental signals such as optical character recognition (OCR) of an object's labels, GPS signals for places recognition, signals from a user's client system 130 to identify the user. In particular embodiments, the assistant system 140 may perform general scene recognition (home, work, public space, etc.) to set context for the user and reduce the computer-vision search space to identify top likely objects or people. In particular embodiments, the assistant system 140 may guide users to train the assistant system 140. For example, crowdsourcing may be used to get users to tag and help the assistant system 140 recognize more objects over time. As another example, users can register their personal objects as part of initial setup when using the assistant system 140. The assistant system 140 may further allow users to provide positive/negative signals for objects they interact with to train and improve personalized models for them.

In particular embodiments, the capability of signals intelligence may enable the assistant system 140 to determine user location, understand date/time, determine family locations, understand users' calendars and future desired locations, integrate richer sound understanding to identify setting/context through sound alone, build signals intelligence models at run time which may be personalized to a user's individual routines.

In particular embodiments, the capability of reasoning may enable the assistant system 140 to have the ability to pick up any previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, understand the changes in a scene and how that may impact the user's desired content.

In particular embodiments, the capabilities of memories may enable the assistant system 140 to remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and write to memory in structured form to form rich short, episodic and long-term memories.

Figure 3:
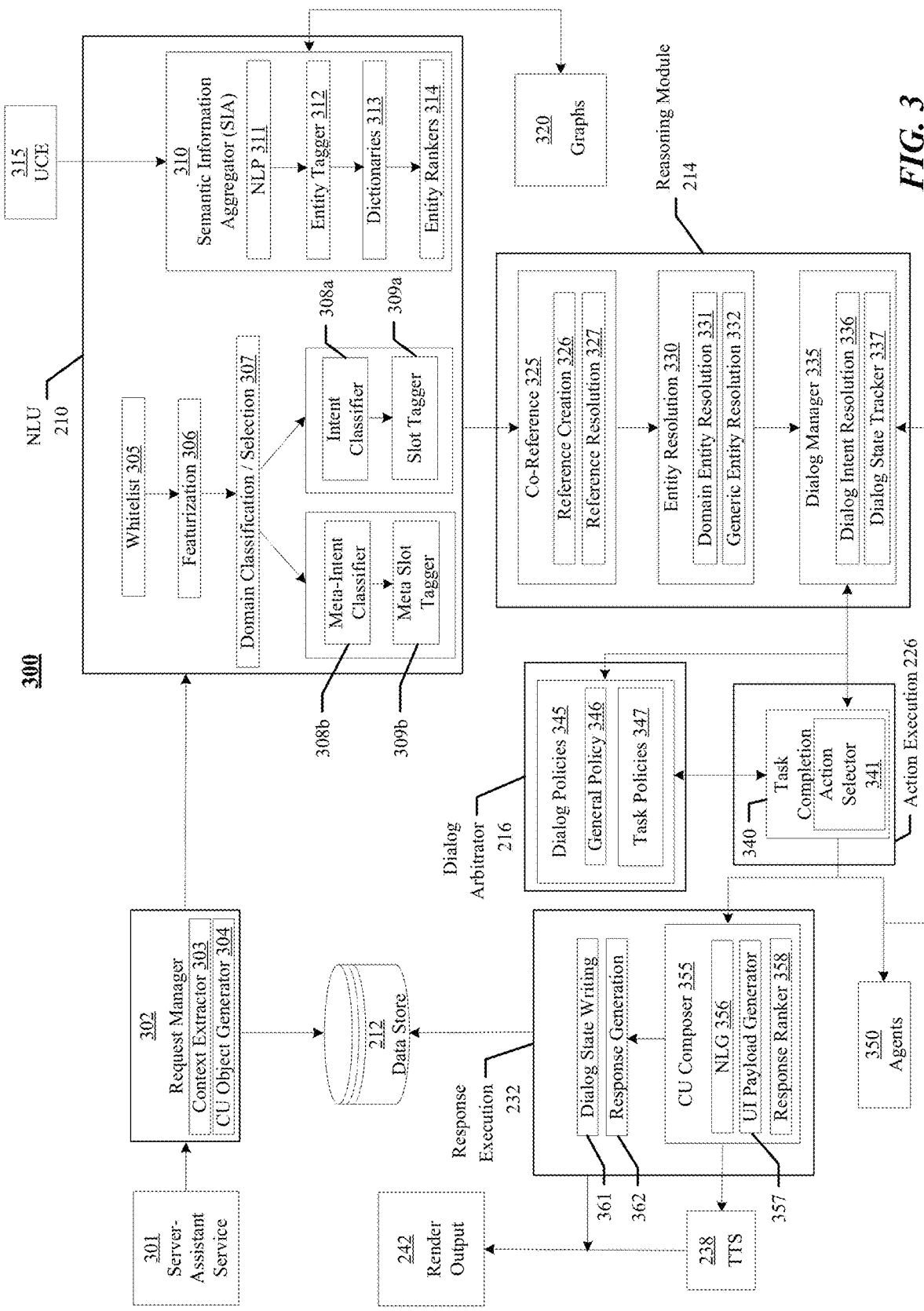
FIG. 3 illustrates an example flow diagram of server-side processes of the assistant system.

FIG. 3 illustrates an example flow diagram of server-side processes of the assistant system 140. In particular embodiments, a server-assistant service module 301 may access a request manager 302 upon receiving a user request. In alternative embodiments, the user request may be first processed by the remote ASR module 208 if the user request is based on audio signals. In particular embodiments, the request manager 302 may comprise a context extractor 303 and a conversational understanding object generator (CU object generator) 304. The context extractor 303 may extract contextual information associated with the user request. The context extractor 303 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 304 may generate particular content objects relevant to the user request. The content objects may comprise dialog-session data and features associated with the user request, which may be shared with all the modules of the assistant system 140. In particular embodiments, the request manager 302 may store the contextual information and the generated content objects in data store 212 which is a particular data store implemented in the assistant system 140.

In particular embodiments, the request manger 302 may send the generated content objects to the remote NLU module 210. The NLU module 210 may perform a plurality of steps to process the content objects. At step 305, the NLU module 210 may generate a whitelist for the content objects. In particular embodiments, the whitelist may comprise interpretation data matching the user request. At step 306, the NLU module 210 may perform a featurization based on the whitelist. At step 307, the NLU module 210 may perform domain classification/selection on user request based on the features resulted from the featurization to classify the user request into predefined domains. The domain classification/selection results may be further processed based on two related procedures. At step 308a, the NLU module 210 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 308b, the NLU module 210 may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 309a, the NLU module 210 may use a slot tagger to annotate one or more slots associated with the user request. In particular embodiments, the slot tagger may annotate the one or more slots for the n-grams of the user request. At step 309b, the NLU module 210 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 210 may comprise a semantic information aggregator 310. The semantic information aggregator 310 may help the NLU module 210 improve the domain classification/selection of the content objects by providing semantic information. In particular embodiments, the semantic information aggregator 310 may aggregate semantic information in the following way. The semantic information aggregator 310 may first retrieve information from a user context engine 315. In particular embodiments, the user context engine 315 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the user context engine 315 as part of the user profile. The online inference service may analyze the conversational data associated with the user that are received by the assistant system 140 at a current time. The analysis result may be stored in the user context engine 315 also as part of the user profile. In particular embodiments, both the offline aggregators and online inference service may extract personalization features from the plurality of data. The extracted personalization features may be used by other modules of the assistant system 140 to better understand user input. In particular embodiments, the semantic information aggregator 310 may then process the retrieved information, i.e., a user profile, from the user context engine 315 in the following steps. At step 311, the semantic information aggregator 310 may process the retrieved information from the user context engine 315 based on natural-language processing (NLP). In particular embodiments, the semantic information aggregator 310 may tokenize text by text normalization, extract syntax features from text, and extract semantic features from text based on NLP. The semantic information aggregator 310 may additionally extract features from contextual information, which is accessed from dialog history between a user and the assistant system 140. The semantic information aggregator 310 may further conduct global word embedding, domain-specific embedding, and/or dynamic embedding based on the contextual information. At step 312, the processing result may be annotated with entities by an entity tagger. Based on the annotations, the semantic information aggregator 310 may generate dictionaries for the retrieved information at step 313. In particular embodiments, the dictionaries may comprise global dictionary features which can be updated dynamically offline. At step 314, the semantic information aggregator 310 may rank the entities tagged by the entity tagger. In particular embodiments, the semantic information aggregator 310 may communicate with different graphs 320 including one or more of the social graph, the knowledge graph, or the concept graph to extract ontology data that is relevant to the retrieved information from the user context engine 315. In particular embodiments, the semantic information aggregator 310 may aggregate the user profile, the ranked entities, and the information from the graphs 320. The semantic information aggregator 310 may then provide the aggregated information to the NLU module 210 to facilitate the domain classification/selection.

In particular embodiments, the output of the NLU module 210 may be sent to the remote reasoning module 214. The reasoning module 214 may comprise a co-reference component 325, an entity resolution component 330, and a dialog manager 335. The output of the NLU module 210 may be first received at the co-reference component 325 to interpret references of the content objects associated with the user request. In particular embodiments, the co-reference component 325 may be used to identify an item to which the user request refers. The co-reference component 325 may comprise reference creation 326 and reference resolution 327. In particular embodiments, the reference creation 326 may create references for entities determined by the NLU module 210. The reference resolution 327 may resolve these references accurately. As an example and not by way of limitation, a user request may comprise "find me the nearest grocery store and direct me there". The co-reference component 325 may interpret "there" as "the nearest grocery store". In particular embodiments, the co-reference component 325 may access the user context engine 315 and the dialog manager 335 when necessary to interpret references with improved accuracy.

In particular embodiments, the identified domains, intents, meta-intents, slots, and meta slots, along with the resolved references may be sent to the entity resolution component 330 to resolve relevant entities. The entities may include one or more of a real world entity (from general knowledge base), a user entity (from user memory), a contextual entity (device context/dialog context), or a value resolution (numbers, datetime, etc.). The entity resolution component 330 may execute generic and domain-specific entity resolution. In particular embodiments, the entity resolution component 330 may comprise domain entity resolution 331 and generic entity resolution 332. The domain entity resolution 331 may resolve the entities by categorizing the slots and meta slots into different domains. In particular embodiments, entities may be resolved based on the ontology data extracted from the graphs 320. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 332 may resolve the entities by categorizing the slots and meta slots into different generic topics. In particular embodiments, the resolving may be also based on the ontology data extracted from the graphs 320. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular brand of electric car, the generic entity resolution 332 may resolve the referenced brand of electric car as vehicle and the domain entity resolution 331 may resolve the referenced brand of electric car as electric car.

In particular embodiments, the entity resolution component 330 may use different techniques to resolve different types of entities. For real world entities, the entity resolution component 330 may use the knowledge graph to resolve the span to the entities, such as "music track", "movie", etc. For user entities, the entity resolution component 330 may use user memory or some agents to resolve the span to user-specific entities, such as "contact", "reminders", "relationship", etc. For contextual entities, the entity resolution component 330 may use the co-reference module 325 to resolve the references to entities in the context, such as "him", "her", "the first one", "the last one", etc. In addition, the entity resolution component 330 may resolve an entity under the context (device context or dialog context), such as the entity shown on the screen, entity from the last conversation history, etc. For value resolutions, the entity resolution component 330 may resolve the mention to exact value in standardized form, such as numerical value, date time, address, etc.

In particular embodiments, the entity resolution component 330 may work on par with the ASR module 208 or the ASR module 216 to perform entity resolution. Taking resolving names as an example, the entity resolution component 330 may work as follows. The entity resolution component 330 may first expand names associated with a user into their normalized text form as well a phonetic consonant representation using a double metaphone algorithm. The entity resolution component 330 may then determine a complete n-best set of candidate transcriptions and run a comprehension process on all transcriptions in parallel. In particular embodiments, each transcription that resolves to the same intent may be collapsed into a single intent. The intent may get a score corresponding to the highest scoring candidate transcription. During the collapse, the entity resolution component 330 may identify various possible text transcriptions associated with each slot, correlated by boundary timing offsets associated with the slot's transcription. The entity resolution component 330 may extract slot text possibilities from a plurality of (e.g., 1000) candidate transcriptions, regardless of whether they are classified to the same intent. The slots in intents may be thus scored lists of phrases. In particular embodiments, a new or running task which can handle the intent may be identified and deliver the intent. The task may trigger the entity resolution component 330 providing the scored lists of phrases associated with one of its slots and the categories against which it should be resolved.

In particular embodiments, when the friend category is specified, the entity resolution component 330 may run every candidate list of terms through the same expansion run at matcher compilation time. Each candidate expansion of the terms may be matched in the precompiled trie matching structure. Matches may be scored using a function that takes the transcribed input, matched form, and friend name. In particular embodiments, when the celebrity/notable person category is specified, the entity resolution component 330 may run parallel searches against the knowledge graph for each candidate set of terms for the slot from the ASR module 208 or ASR module 216. The entity resolution component 330 may score matches based on matched person popularity and ASR-provided score signal. In particular embodiments, when the memory category is specified, the entity resolution component 330 may perform the same search against user memory. The entity resolution component 330 may crawl backward through user memory and attempt to match each memory (e.g., person recently mentioned in conversation, or seen and recognized via visual signals, etc.) For each person, the entity resolution component 330 may employ matching similarly to how friends are matched (i.e., phoenetic). In particular embodiments, scoring may comprise a temporal decay factor related to how recently the name was mentioned. The entity resolution component 330 may further combine, sort, and dedupe all matches. In particular embodiments, the task may receive the set of candidates. When multiple high scoring candidates are present, the entity resolution component 330 may perform user facilitated disambiguation.

In particular embodiments, the entity resolution component 330 may be driven by the task (corresponding to an agent 350). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution component 330 may resolve "John" against everything. As another example and not by way of limitation, for the utterance "send a message to John", the entity resolution component 330 may easily determine "John" refers to a person that one can message. As a result, the entity resolution component 330 may bias the resolution to a friend. As another example and not by way of limitation, for the utterance "what is John's most famous album?" To resolve "John", the entity resolution component 330 may first determine the task corresponding to the utterance, which is finding a music album. The entity resolution component 330 may determine that entities related to music albums include singers, producers, and recording studios. Therefore, the entity resolution component 330 may search among these types of entities in a music domain to resolve "John."

In particular embodiments, the output of the entity resolution component 330 may be sent to the dialog manager 335 to advance the flow of the conversation with the user. The dialog manager 335 may be an asynchronous state machine that repeatedly updates the state and selects actions based on the new state. The dialog manager 335 may comprise dialog intent resolution 336 and dialog state tracker 337. In particular embodiments, the dialog manager 335 may execute the selected actions and then call the dialog state tracker 337 again until the action selected requires a user response, or there are no more actions to execute. Each action selected may depend on the execution result from previous actions. In particular embodiments, the dialog intent resolution 336 may resolve the user intent associated with the current dialog session based on dialog history between the user and the assistant system 140. The dialog intent resolution 336 may map intents determined by the NLU module 210 to different dialog intents. The dialog intent resolution 336 may further rank dialog intents based on signals from the NLU module 210, the entity resolution component 330, and dialog history between the user and the assistant system 140. In particular embodiments, instead of directly altering the dialog state, the dialog state tracker 337 may be a side-effect free component and generate n-best candidates of dialog state update operators that propose updates to the dialog state. The dialog state tracker 337 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 337 may update/rank the dialog state of the current dialog session. As an example and not by way of limitation, the dialog state tracker 337 may update the dialog state as "completed" if the dialog session is over. As another example and not by way of limitation, the dialog state tracker 337 may rank the dialog state based on a priority associated with it.

In particular embodiments, the reasoning module 214 may communicate with the remote action execution module 226 and the dialog arbitrator 216, respectively. In particular embodiments, the dialog manager 335 of the reasoning module 214 may communicate with a task completion component 340 of the action execution module 226 about the dialog intent and associated content objects. In particular embodiments, the task completion module 340 may rank different dialog hypotheses for different dialog intents. The task completion module 340 may comprise an action selector 341. In alternative embodiments, the action selector 341 may be comprised in the dialog manager 335. In particular embodiments, the dialog manager 335 may additionally check against dialog policies 345 comprised in the dialog arbitrator 216 regarding the dialog state. In particular embodiments, a dialog policy 345 may comprise a data structure that describes an execution plan of an action by an agent 350. The dialog policy 345 may comprise a general policy 346 and task policies 347. In particular embodiments, the general policy 346 may be used for actions that are not specific to individual tasks. The general policy 346 may comprise handling low confidence intents, internal errors, unacceptable user response with retries, skipping or inserting confirmation based on ASR or NLU confidence scores, etc. The general policy 346 may also comprise the logic of ranking dialog state update candidates from the dialog state tracker 337 output and pick the one to update (such as picking the top ranked task intent). In particular embodiments, the assistant system 140 may have a particular interface for the general policy 346, which allows for consolidating scattered cross-domain policy/business-rules, especial those found in the dialog state tracker 337, into a function of the action selector 341. The interface for the general policy 346 may also allow for authoring of self-contained sub-policy units that may be tied to specific situations or clients, e.g., policy functions that may be easily switched on or off based on clients, situation, etc. The interface for the general policy 346 may also allow for providing a layering of policies with back-off, i.e. multiple policy units, with highly specialized policy units that deal with specific situations being backed up by more general policies 346 that apply in wider circumstances. In this context the general policy 346 may alternatively comprise intent or task specific policy. In particular embodiments, a task policy 347 may comprise the logic for action selector 341 based on the task and current state. In particular embodiments, the types of task policies 347 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 347 with machine-learning models. In particular embodiments, a dialog policy 345 may a tree-based policy, which is a pre-constructed dialog plan. Based on the current dialog state, a dialog policy 345 may choose a node to execute and generate the corresponding actions. As an example and not by way of limitation, the tree-based policy may comprise topic grouping nodes and dialog action (leaf) nodes.

In particular embodiments, the action selector 341 may take candidate operators of dialog state and consult the dialog policy 345 to decide what action should be executed. The assistant system 140 may use a hierarchical dialog policy with general policy 346 handling the cross-domain business logic and task policies 347 handles the task/domain specific logic. In particular embodiments, the general policy 346 may pick one operator from the candidate operators to update the dialog state, followed by the selection of a user facing action by a task policy 347. Once a task is active in the dialog state, the corresponding task policy 347 may be consulted to select right actions. In particular embodiments, both the dialog state tracker 337 and the action selector 341 may not change the dialog state until the selected action is executed. This may allow the assistant system 140 to execute the dialog state tracker 337 and the action selector 341 for processing speculative ASR results and to do n-best ranking with dry runs. In particular embodiments, the action selector 341 may take the dialog state update operators as part of the input to select the dialog action. The execution of the dialog action may generate a set of expectation to instruct the dialog state tracker 337 to handler future turns. In particular embodiments, an expectation may be used to provide context to the dialog state tracker 337 when handling the user input from next turn. As an example and not by way of limitation, slot request dialog action may have the expectation of proving a value for the requested slot.

In particular embodiments, the dialog manager 335 may support multi-turn compositional resolution of slot mentions. For a compositional parse from the NLU 210, the resolver may recursively resolve the nested slots. The dialog manager 335 may additionally support disambiguation for the nested slots. As an example and not by way of limitation, the user request may be "remind me to call Alex". The resolver may need to know which Alex to call before creating an actionable reminder to-do entity. The resolver may halt the resolution and set the resolution state when further user clarification is necessary for a particular slot. The general policy 346 may examine the resolution state and create corresponding dialog action for user clarification. In dialog state tracker 337, based on the user request and the last dialog action, the dialog manager may update the nested slot. This capability may allow the assistant system 140 to interact with the user not only to collect missing slot values but also to reduce ambiguity of more complex/ambiguous utterances to complete the task. In particular embodiments, the dialog manager may further support requesting missing slots in a nested intent and multi-intent user requests (e.g., "take this photo and send it to Dad"). In particular embodiments, the dialog manager 335 may support machine-learning models for more robust dialog experience. As an example and not by way of limitation, the dialog state tracker 337 may use neural network based models (or any other suitable machine-learning models) to model belief over task hypotheses. As another example and not by way of limitation, for action selector 341, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user request.

In particular embodiments, the action execution module 226 may call different agents 350 for task execution. An agent 350 may select among registered content providers to complete the action. The data structure may be constructed by the dialog manager 335 based on an intent and one or more slots associated with the intent. A dialog policy 345 may further comprise multiple goals related to each other through logical operators. In particular embodiments, a goal may be an outcome of a portion of the dialog policy and it may be constructed by the dialog manager 335. A goal may be represented by an identifier (e.g., string) with one or more named arguments, which parameterize the goal. As an example and not by way of limitation, a goal with its associated goal argument may be represented as {confirm_artist, args: {artist: "Madonna"}}. In particular embodiments, a dialog policy may be based on a tree-structured representation, in which goals are mapped to leaves of the tree. In particular embodiments, the dialog manager 335 may execute a dialog policy 345 to determine the next action to carry out. The dialog policies 345 may comprise generic policy 346 and domain specific policies 347, both of which may guide how to select the next system action based on the dialog state. In particular embodiments, the task completion component 340 of the action execution module 226 may communicate with dialog policies 345 comprised in the dialog arbitrator 216 to obtain the guidance of the next system action. In particular embodiments, the action selection component 341 may therefore select an action based on the dialog intent, the associated content objects, and the guidance from dialog policies 345.

In particular embodiments, the output of the action execution module 226 may be sent to the remote response execution module 232. Specifically, the output of the task completion component 340 of the action execution module 226 may be sent to the CU composer 355 of the response execution module 226. In alternative embodiments, the selected action may require one or more agents 350 to be involved. As a result, the task completion module 340 may inform the agents 350 about the selected action. Meanwhile, the dialog manager 335 may receive an instruction to update the dialog state. As an example and not by way of limitation, the update may comprise awaiting agents' 350 response. In particular embodiments, the CU composer 355 may generate a communication content for the user using a natural-language generation (NLG) module 356 based on the output of the task completion module 340. In particular embodiments, the NLG module 356 may use different language models and/or language templates to generate natural language outputs. The generation of natural language outputs may be application specific. The generation of natural language outputs may be also personalized for each user. The CU composer 355 may also determine a modality of the generated communication content using the UI payload generator 357. Since the generated communication content may be considered as a response to the user request, the CU composer 355 may additionally rank the generated communication content using a response ranker 358. As an example and not by way of limitation, the ranking may indicate the priority of the response. In particular embodiments, the CU composer 355 may comprise a natural-language synthesis (NLS) module that may be separate from the NLG module 356. The NLS module may specify attributes of the synthesized speech generated by the CU composer 355, including gender, volume, pace, style, or register, in order to customize the response for a particular user, task, or agent. The NLS module may tune language synthesis without engaging the implementation of associated tasks. More information on customizing natural-language generation may be found in U.S. patent application Ser. No. 15/966,455, filed 30 Apr. 2018, which is incorporated by reference.

In particular embodiments, the response execution module 232 may perform different tasks based on the output of the CU composer 355. These tasks may include writing (i.e., storing/updating) the dialog state 361 retrieved from data store 212 and generating responses 362. In particular embodiments, the output of CU composer 355 may comprise one or more of natural-language strings, speech, actions with parameters, or rendered images or videos that can be displayed in a VR headset or AR smart glass. As a result, the response execution module 232 may determine what tasks to perform based on the output of CU composer 355. In particular embodiments, the generated response and the communication content may be sent to the local render output module 242 by the response execution module 232. In alternative embodiments, the output of the CU composer 355 may be additionally sent to the remote TTS module 238 if the determined modality of the communication content is audio. The speech generated by the TTS module 238 and the response generated by the response execution module 232 may be then sent to the render output module 242.

Figure 4:
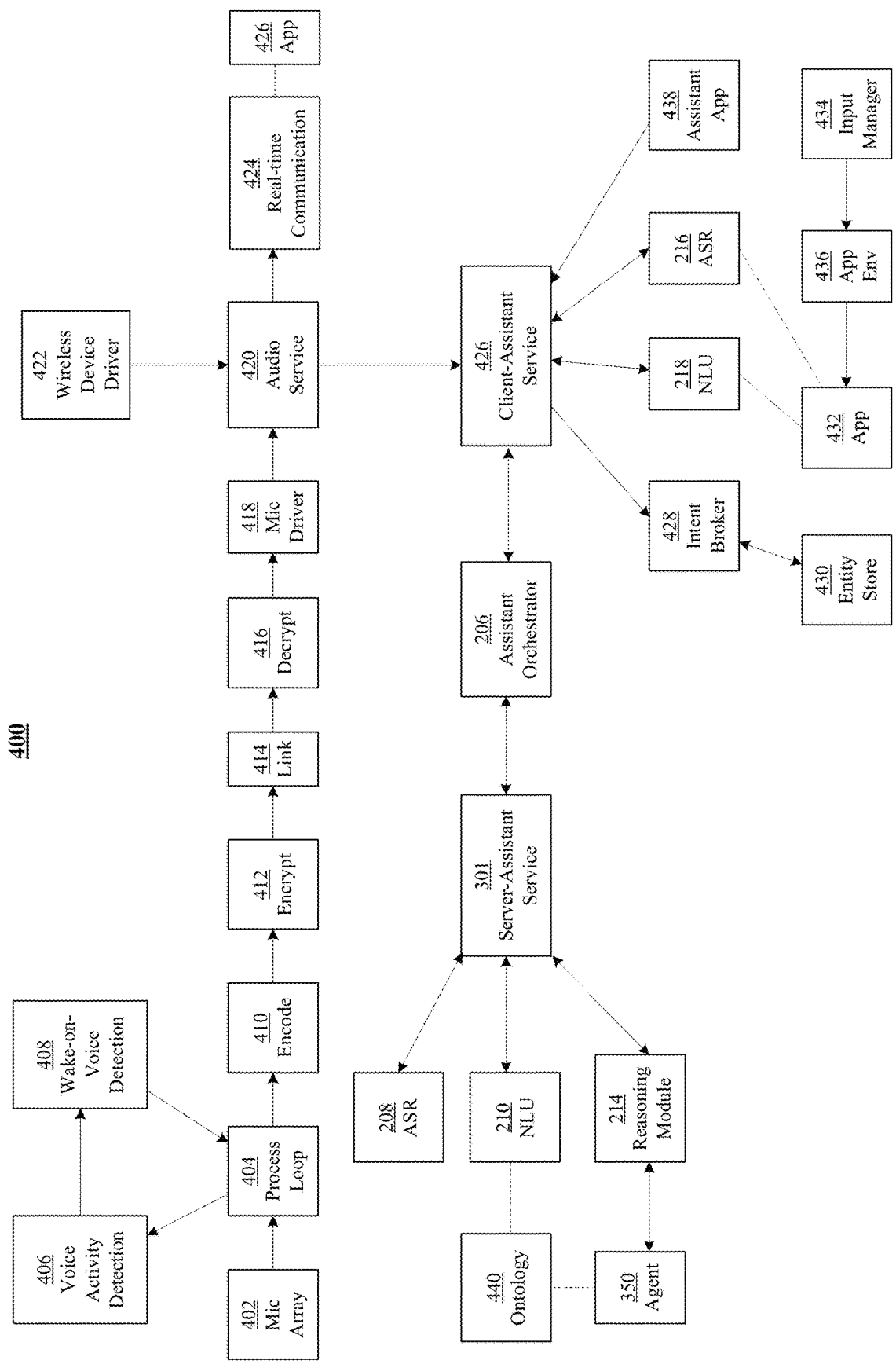
FIG. 4 illustrates an example flow diagram of processing a user input by the assistant system.

FIG. 4 illustrates an example flow diagram of processing a user input by the assistant system 140. As an example and not by way of limitation, the user input may be based on audio signals. In particular embodiments, a mic array 402 of the client system 130 may receive the audio signals (e.g., speech). The audio signals may be transmitted to a process loop 404 in a format of audio frames. In particular embodiments, the process loop 404 may send the audio frames for voice activity detection (VAD) 406 and wake-on-voice (WoV) detection 408. The detection results may be returned to the process loop 404. If the WoV detection 408 indicates the user wants to invoke the assistant system 140, the audio frames together with the VAD 406 result may be sent to an encode unit 410 to generate encoded audio data. After encoding, the encoded audio data may be sent to an encrypt unit 412 for privacy and security purpose, followed by a link unit 414 and decrypt unit 416. After decryption, the audio data may be sent to a mic driver 418, which may further transmit the audio data to an audio service module 420. In alternative embodiments, the user input may be received at a wireless device (e.g., Bluetooth device) paired with the client system 130. Correspondingly, the audio data may be sent from a wireless-device driver 422 (e.g., Bluetooth driver) to the audio service module 420. In particular embodiments, the audio service module 420 may determine that the user input can be fulfilled by an application executing on the client system 130. Accordingly, the audio service module 420 may send the user input to a real-time communication (RTC) module 424. The RTC module 424 may deliver audio packets to a video or audio communication system (e.g., VOIP or video call). The RTC module 424 may call a relevant application (App) 426 to execute tasks related to the user input.

In particular embodiments, the audio service module 420 may determine that the user is requesting assistance that needs the assistant system 140 to respond. Accordingly, the audio service module 420 may inform the client-assistant service module 426. In particular embodiments, the client-assistant service module 426 may communicate with the assistant orchestrator 206. The assistant orchestrator 206 may determine whether to use client-side processes or server-side processes to respond to the user input. In particular embodiments, the assistant orchestrator 206 may determine to use client-side processes and inform the client-assistant service module 426 about such decision. As a result, the client-assistant service module 426 may call relevant modules to respond to the user input.

In particular embodiments, the client-assistant service module 426 may use the local ASR module 216 to analyze the user input. The ASR module 216 may comprise a grapheme-to-phoneme (G2P) model, a pronunciation learning model, a personalized language model (PLM), an end-pointing model, and a personalized acoustic model. In particular embodiments, the client-assistant service module 426 may further use the local NLU module 218 to understand the user input. The NLU module 218 may comprise a named entity resolution (NER) component and a contextual session-based NLU component. In particular embodiments, the client-assistant service module 426 may use an intent broker 428 to analyze the user's intent. To be accurate about the user's intent, the intent broker 428 may access an entity store 430 comprising entities associated with the user and the world. In alternative embodiments, the user input may be submitted via an application 432 executing on the client system 130. In this case, an input manager 434 may receive the user input and analyze it by an application environment (App Env) module 436. The analysis result may be sent to the application 432 which may further send the analysis result to the ASR module 216 and NLU module 218. In alternative embodiments, the user input may be directly submitted to the client-assistant service module 426 via an assistant application 438 executing on the client system 130. Then the client-assistant service module 426 may perform similar procedures based on modules as aforementioned, i.e., the ASR module 216, the NLU module 218, and the intent broker 428.

In particular embodiments, the assistant orchestrator 206 may determine to user server-side process. Accordingly, the assistant orchestrator 206 may send the user input to one or more computing systems that host different modules of the assistant system 140. In particular embodiments, a server-assistant service module 301 may receive the user input from the assistant orchestrator 206. The server-assistant service module 301 may instruct the remote ASR module 208 to analyze the audio data of the user input. The ASR module 208 may comprise a grapheme-to-phoneme (G2P) model, a pronunciation learning model, a personalized language model (PLM), an end-pointing model, and a personalized acoustic model. In particular embodiments, the server-assistant service module 301 may further instruct the remote NLU module 210 to understand the user input. In particular embodiments, the server-assistant service module 301 may call the remote reasoning model 214 to process the output from the ASR module 208 and the NLU module 210. In particular embodiments, the reasoning model 214 may perform entity resolution and dialog optimization. In particular embodiments, the output of the reasoning model 314 may be sent to the agent 350 for executing one or more relevant tasks.

In particular embodiments, the agent 350 may access an ontology module 440 to accurately understand the result from entity resolution and dialog optimization so that it can execute relevant tasks accurately. The ontology module 440 may provide ontology data associated with a plurality of predefined domains, intents, and slots. The ontology data may also comprise the structural relationship between different slots and domains. The ontology data may further comprise information of how the slots may be grouped, related within a hierarchy where the higher level comprises the domain, and subdivided according to similarities and differences. The ontology data may also comprise information of how the slots may be grouped, related within a hierarchy where the higher level comprises the topic, and subdivided according to similarities and differences. Once the tasks are executed, the agent 350 may return the execution results together with a task completion indication to the reasoning module 214.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Multimodal Architecture

Figure 5:
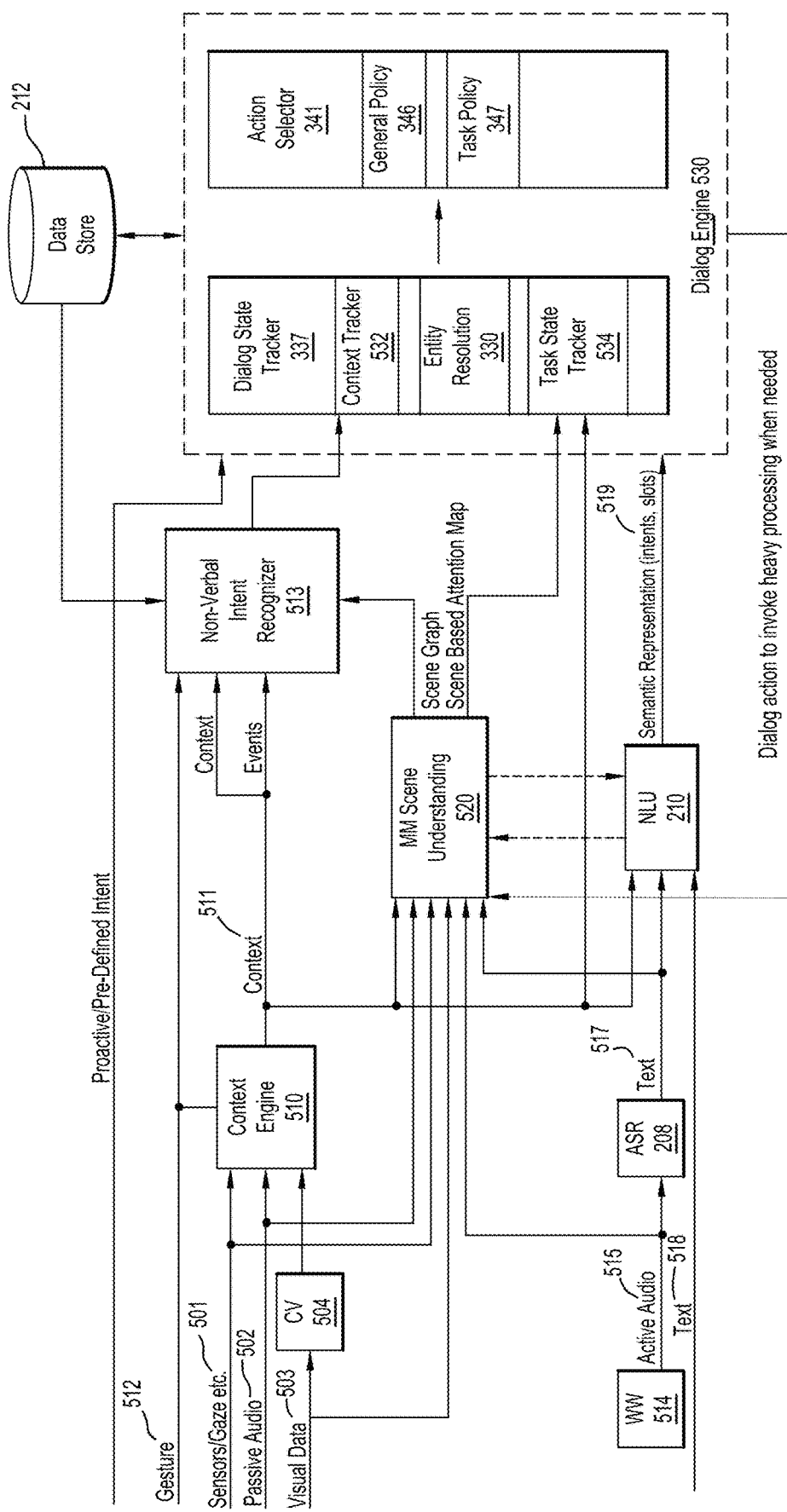
FIG. 5 illustrates an example multimodal architecture of the assistant system.

FIG. 5 illustrates an example multimodal architecture 500 of an assistant system 140. Featuring separate context and scene understanding engines 510 and 520, such a multimodal architecture 500 may enable continuous lightweight tagging of multimodal data as it is received while reserving a more resource-intensive process of analyzing the tagged data to be performed on an as-needed basis. This up-front and continuous lightweight tagging process may further enable the assistant system 140 to respond quickly even to user queries that require in-depth analysis of the multimodal data, as initial identification of entities to be analyzed has already been performed. As an example and not by way of limitation, a user may query the assistant system 140 about one or more entities in a scene. As visual data, such as a video comprising a plurality of videos, of the scene is received, objects portrayed within each image may be identified, and each image may be tagged with object identifiers of the objects (e.g., "dog", "car", "person", and "tree"). If the user queries the assistant system 140 about one or more of these entities, and the requested information necessitates deeper analysis of the entities (e.g., the user query may be about a detailed attribute of an entity or about a relationship between two entities), a separate scene understanding engine 520 may be used to perform this analysis. However, it has already been determined what the relevant entities are (for example, if the user query was "What breed is the dog?", the entity that is the "dog" has already been determined), and so the scene understanding engine 520 may generate a response to the user query quickly despite the amount of processing required. Usage of the scene understanding engine 520 may be limited to when the assistant system 140 needs to determine attribute or relational information about objects portrayed in an image, thus conserving processing power. Because users may be uninterested in the majority of captured multimodal data, this separation of object identification and analysis may result in significant conservation of processing resources.

The assistant system 140 may use this underlying multimodal architecture 500 with separate context and scene understanding engines 510 and 520 along with various sensors within a client system 130 hosting or communicating with the assistant system 140. Subject to privacy settings, these sensors may detect information and context of a scene surrounding the user. In particular embodiments, sensor/gaze information 501 of the user himself or herself may be detected (e.g., through eye-tracking). Passive audio 501, such as background audio picked up by a microphone on the client system 130, may also be gathered. In particular embodiments, subject to privacy settings, this passive audio may be recorded to a data store 212 to enable future user requests concerning this background audio (e.g., "What song was playing at the café?"). Visual data 503 may also be recorded. This visual data 503 may take may forms. As an example and not by way of limitation, the visual data 503 may comprise a single, static image captured at a particular point in time (e.g., via a user command or a manual user action to trigger the capture of the image). As another example and not by way of limitation, the visual data may be a video comprising a plurality of images. Such a video may either be captured at a particular point in time via a user command or action, or it may be a continuous recording of scenes surrounding the user while he or she is using the client system 130. As yet another example and not by way of limitation, the visual data 503 may comprise artificial reality content, such as virtual objects displayed to the user in an augmented-reality or virtual-reality environment. This visual data may be received at a computer vision (CV) module 504, where object detection and identification may be performed to identify objects within the visual data. The visual data 503 may be tagged with object identifiers of the identified objects, and a content vector comprising these object identifiers for each image may be output from the CV module 504. In particular embodiments, the CV module 504 may continuously analyze the visual data 503 of the scene in real time as the visual data of the scene is being captured. Finally, gestures 512 of the user (such as pointing gestures or hand or body movements) may further be detected.

These multiple modalities of sensor data may be input into context engine 510, which may combine them to generate context 511. In particular embodiments, the context engine 510 may always be on while sensor data, such as visual data, is being captured, gathering this multimodal intelligence for use later in the pipeline of the multimodal architecture 500 (subject to privacy settings). The context engine 510 may thus function as a sort of ambient mode of the assistant system 140, constantly monitoring the sensor data as well as the user himself or herself and capturing information that may be needed to respond to a future user request. As an example and not by way of limitation, the context engine 510 may continuously identify scene information such as particular objects within a field of view (e.g., via the object identifiers output as a context vector from CV module 504), locations, and activities within the scene.

In particular embodiments, context 511 may comprise a context engine output chart of information of a scene recorded by sensors of the assistant system 140. This chart may include various categories, such as social presence, user activity class, focal object recognition, user location, or significant events detection. The social presence category may include social information of people in the captured scene, allowing particular individuals to be recognized. User activity class may indicate current activity of a detected user, classified into a taxonomy of activity classes; and user location may indicate deeper knowledge information about the location of the user on a personal, group, or world-knowledge basis. As an example and not by way of limitation, the location may indicate a particular room within a larger building. As another example and not by way of limitation, the location may indicate the address of the building. Focal object recognition may indicate segmented, classified objects from a computer vision system or spatially indexed object database, together with gaze or gesture input to identify which object a viewing user is focusing on, or which is most salient to this particular user. Significant events detection may indicate what is happening around a user in the scene. As an example and not by way of limitation, public and private events may be detected or inferred based on the current activity, location, or context of a user. In particular embodiments, the context engine 510 may detect context changes and trigger a series of events in response to relevant changes in downstream components, which may be registered to particular events in order to effect particular actions. As examples and not by way of limitation, such context changes may be people entering or exiting the scene, detection of a new object, starting or ending a particular activity, or a user arriving or leaving a location. A sample context engine output chart is discussed below with respect to FIG. 11B.

The multimodal architecture 500 of assistant system 140 may further receive a wake-word 514. In particular embodiments, wake-word 514 (e.g., "hey assistant") may be detected from the passive audio 502. Once detected, the assistant system 140 may begin receiving active audio 515. In particular embodiments, active audio 515 may comprise user speech such as queries and commands received after the wake-word 514. Active audio 515 may then be input into ASR 208, which may generate text 517 from the input active audio. Text, such as text 518, may also be received directly from a user, such as when the user activates the assistant system 140 or inputs a user command using text rather than verbally or through gestures. Text 517 and/or text 518 may be input to NLU module 210, which may parse the text in order to determine a semantic representation 519 for the intents and slots corresponding to the user query. In particular embodiments, context 511 may also be input to the NLU 210 to generate intents and slots of sensor context as well.

In particular embodiments, the output of NLU 210 and the context 511 output from the context engine 510 may be input to the multimodal scene understanding engine 520. The sensor/gaze information 501, passive audio 502, and visual data 503, and/or active audio 515 may also be input directly to the scene understanding engine 520 when appropriate to integrate this information with a more specific understanding of a particular scene. Further, output of the scene understanding engine 520 may be fed back into the NLU when appropriate to generate further intents and slots for use in dialog engine 530. The scene understanding engine 520 may receive this sensor data and the context 511 (such as in the form of the context engine output chart generated by context engine 510) and determine attributes of and relationships among the various objects, locations, and/or activities determined by the context engine 510. In particular embodiments, the scene understanding engine 520 may generate a scene graph or knowledge graph of the scene, in which objects within the scene may be represented as nodes, and edges between the nodes may indicate relationships between their respective objects. As an example and not by way of limitation, in a scene in which a set of keys is placed on top of a counter and to the left of a cup, the scene understanding engine 520 may generate a scene graph with three nodes (e.g., the keys, the counter, and the cup). These three nodes may be connected to one another by edges indicating their relational information to one another. For instance, the keys may be connected to the cup by an edge with the label "left of"; similarly, the cup may be connected to the keys by an edge with the label of "right of". In particular embodiments, such relationship terms between each object may be represented by a set of synonyms. As an example and not by way of limitation, the relationship information "left of" and "right of" of the edges between the keys and the cup may be types of "near", "next to" or "with" relationships. Thus, a user request referencing one of these relationship types (e.g., "What is the object to the left of the cup?") may be answered just as well as a request referencing a synonym for that relationship information (e.g., "What is next to the cup?"). A sample scene understanding engine output chart (e.g., a scene/knowledge graph) is discussed below with respect to FIG. 11C.

In particular embodiments, while the context engine 510 may always be on, the scene understanding engine 520 may be awakened as needed. As an example and not by way of limitation, the scene understanding engine 520 may be invoked by passing object identifiers and their associated visual data to the scene understanding engine 520. As another example and not by way of limitation, output 511 from the context engine 510 and/or sensor data 501-504, 512, and 515-518 may be provided to the scene understanding engine 520 specifically in response to a user request, and the particular attributes and relational information generated at the scene understanding engine 520 may only be generated specifically in response to receiving this user request. Because determining such semantic information may be computationally expensive and users may be uninterested in the majority of captured multimodal data anyway, analyzing the captured scene more deeply to generate the attributes and relational information when requested rather than continuously may result in significant conservation of processing resources. As an example and not by way of limitation, if multimodal data, such as video, is being captured of an environment surrounding a user, the user may only be interested in information about a particular object of interest. Thus, generating attributes (such as color, size, material, etc.) and relational information of other objects (such as the position of each object in an image with respect to every other object in that image) may not be an efficient use of memory and computing resources. However, even in embodiments in which the scene understanding engine 520 is used only in response to a user request, the scene understanding engine 520 may be able to generate the information needed for a response relatively quickly using the specific information input from the context engine 510. As an example and not by way of limitation, with respect to the question "What color is the cup?", the context engine 510 has already identified which object is the cup. Thus, the scene understanding engine may simply analyze this particular object to generate a response indicating the requested attribute. Similarly, with respect to the question "What is the object to the left of the cup?", the context engine 510 has already identified which object is the cup and which is the set of keys. Thus, the scene understanding engine 520 may simply determine the spatial relationship between these two objects. Finally, in particular embodiments, processing resources may be further conserved by halting the provision of input to the scene understanding engine 520 after the requested attributes and/or relational information have been generated.

In particular embodiments, output of the scene understanding engine 520 (e.g., the scene graph) may be input to a non-verbal intent recognizer 513. Subject to privacy settings, context 511, including any context and events determined by the context engine 510, may also be input to the non-verbal intent recognizer 513, along with gesture information 512 and/or relevant data from data store 212, such as an assistant user memory. The non-verbal intent recognizer may combine this information to derive an intent or purpose of a user request, even if that intent is not provided explicitly via a user request. As an example and not by way of limitation, if sensor data such as gaze information 501 indicates that a user is looking repeatedly at a clock, and user data from data store 212 indicates that one or more tasks are scheduled on the user's calendar, the non-verbal intent recognizer may determine that detected gaze as an implicit user request, with an intent of requesting information about an upcoming task.

In particular embodiments, output of each of the non-verbal intent recognizer 513 (e.g., the determined intent), the multimodal scene understanding engine 520 (e.g., a scene-based attention map), and the NLU 210 (e.g., the semantic representation 519 of intents and slots) may each be input to dialog engine 530. In particular embodiments, dialog engine 530 may encompass reasoning module 214, dialog arbitrator 216, and action execution 226. Proactive or pre-defined intent, as well as relevant data from data store 212 and context 511, may further be input into dialog engine 530. As an example and not by way of limitation, the output of the non-verbal intent recognizer 513 may be input to the multimodal dialog state tracker 337 for use in a broader dialog. As another example and not by way of limitation, the scene-based attention map output by the scene understanding engine 520 and the context 511 output from the context engine 510 may be input to a task state tracker 534 for use in tracking the state of a particular current task. Context tracker 532 may track a current context of the user, and the entity resolution module 330 may resolve various objects recorded from a scene to particular entities. As an example and not by way of limitation, an object with an object identifier of "mural" may be resolved to a particular entity that specifies the title of that mural, as well as optional additional information such as artist, date of creation, etc. In particular embodiments, output of these four modules (the multimodal dialog state tracker 337, context tracker 532, entity resolution module 330, and task state tracker 534) may be input to a pipeline comprising the action selector 341, the general policy 346, and the task policy 347. Thus, the assistant system 140 may select an appropriate action to perform based on the dialog intent, the context of a current dialog session, the states of a particular task and dialog, and the relevant entities of the user request. Finally, if necessary, the output of the dialog engine 530 may be sent back to the multimodal scene understanding engine 520 to invoke heavy processing, for example, when a request that requires an understanding of the scene is received, particularly in situations in which a user request did not initially necessitate use of the scene understanding engine 520, and thus a necessary scene graph was not initially generated.

In particular embodiments, the multimodal architecture 500 may be implemented as a client-side process, a server-side process, or a hybrid architecture built upon both client-side processes and server-side processes. In particular embodiments, the client-side processes and the server-side processes may be two parallel workflows for processing a user request. As an example and not by way of limitation, the client-side processes may be performed locally on the client system 130. By contrast, the server-side processes may be performed remotely on one or more computing systems. In particular embodiments, sensor information 501-503 and 512, as well as wake-word 514, active audio 515, and text 518 may be received client-side. Likewise, CV module 504, ASR module 208, and context engine 510 may be implemented on the client system 130. In particular embodiments, remaining modules and processes, such as multimodal scene understanding engine 520, NLU 210, non-verbal intent recognizer 513, and dialog engine 530 may be implemented server-side. By offloading these more computationally expensive elements to a remote computing system and thus leveraging both client-side and server-side processes, the assistant system 140 may effectively assist the user with optimal usage of computing resources, by balancing the limited resources of the client system 130 and the faster response time for results generated at the client system 130 with the greater resources of the remote computing system and increased response transmission time for responses generated remotely.

Multimodal State Tracking Via Scene Graphs

In particular embodiments, the assistant system 140 may provide multimodal dialog state tracking via scene graphs generated and stored based on user dialog rather than automatically from incoming data, such as visual data 503, from a scene surrounding a user. Storing all data received from a client system 130 and continuously analyzing it to recognize and track objects/entities may often be undesirably resource intensive, and may further require an impractical amount of memory. Accordingly, the assistant system 140 may rely on the user to indicate objects of interest from this data so that such resources may be utilized more efficiently. Identified objects of interest may be stored, and a scene graph of relevant data to be stored may be incrementally generated based on the user's interactions with the assistant system 140 concerning the objects of interest. Nodes representing the objects of interest that the user has referenced in a dialog may be added to this scene graph, connected by edges indicating attributes of and/or relationships between relevant objects. Initially, as data of a scene surrounding the user is first received, it may be lightly tagged, and a rough scene graph may be initialized and seeded with this tagged data if needed in order to allow the assistant system 140 to understand and respond to user requests. Such creation and seeding of the scene graph may occur when the user asks an initial question about an entity in the detected in the data. Subsequently, data relevant to this user query may be added to the scene graph and stored in the multimodal dialog state. Although this disclosure describes detecting and analyzing data and generating corresponding scene graphs in a particular manner, this disclosure contemplates detecting and analyzing data and generating corresponding scene graphs in any suitable manner.

In particular embodiments, sensor data representing a scene surrounding the user may be received and organized to represent entities within the scene at the assistant system 140. As an example and not by way of limitation, visual data 503, such as one or more images, may portray one or more objects having various attributes and interconnected by relationships to other objects within the scene. As another example and not by way of limitation, passive audio 502 may represent various pieces of audio information detected from the scene, subject to privacy settings. Such audio 502 may include speech or music. Detected information may be entered into a graphical representation of the scene, such as a scene graph, in which nodes represent objects and are connected to other nodes via edges representing relationships between the respective objects. As an example and not by way of limitation, objects portrayed within visual data 503 may each be represented by a node in a scene graph. As another example and not by way of limitation, a song detected in passive audio 502 may be entered as a node in the scene graph. In particular embodiments, nodes for an object may be represented by a set of synonyms (for example, a node corresponding to "hamburger" may also correspond to "burger"). Similarly, edges indicating relationships between nodes may also be represented by a set of synonyms (for example, a relationship value of "left of" may also correspond to "next to", "near", or "with"). Although this disclosure describes particular types of scene graphs, this disclosure contemplates any suitable type of scene graphs.

Figure 6:
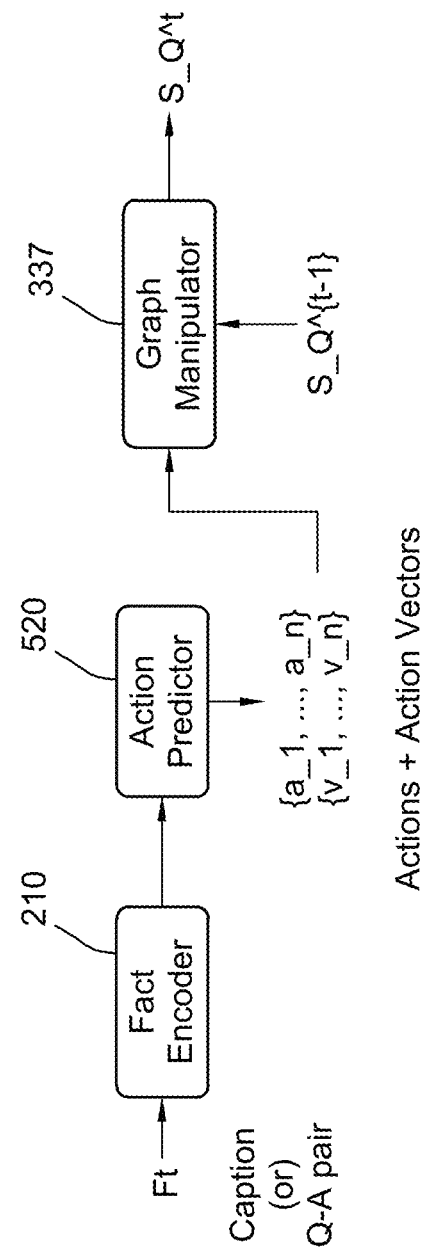
FIG. 6 illustrates a simplified scene graph generator.

FIG. 6 illustrates a simplified scene graph generator 600. In a scene graph containing a set of nodes (e.g., objects) and edges (e.g., relations), each node may be denoted with a stateful recurrent neural network (RNN) and an edge with an edge vector. In particular embodiments, the states of node RNNs may contain object attribute information in a distributed manner while the edge vectors may contain the relation and terminal nodes (start and end node) information. Thus, a scene graph of a scene surrounding a user may be incrementally generated using a model process 600 with three components: an NLU 210 (e.g., a fact encoder), a multimodal scene understanding unit 520 (e.g., an action predictor), and a dialog state tracker 337 (e.g., a graph manipulator). In particular embodiments, the fact encoder 210 may receive a "fact" about a piece of sensor data, such as an image. As examples and not by way of limitation, such facts may include a caption in a pre-analyzed image in a training phase, text converted from user speech at the ASR 208, or a response to a user query about some property of an object (such as the color or price of an object of interest). The fact $F_t$ may be encoded via an RNN to produce a fact embedding $f_t$ used in subsequent stages of the scene generator 600. This fact, which provides the assistant system 140 with initial information about an image or other piece of sensor data, may be input to the fact encoder 210, which may generate an output feature vector representing the input fact.

In particular embodiments, the fact embedding output from the fact encoder may then be fed into the action predictor 520, which may generate instructions for how a scene graph should be created or modified based on this fact. As an example and not by way of limitation, if a user indicates an a new object of interest (such as a dress in a shopping mall), the action predictor 520 may determine that the resulting action should be to add a new node to the scene graph representing this dress. As another example and not by way of limitation, if the user subsequently asks about attributes of the dress (e.g., price, fabric, etc.), the responses to these queries (e.g., $50, cotton, etc.) may be facts input into the fact encoder 210, with the resulting output feature vectors/fact embeddings input into the action predictor 520, which may in turn determine that the appropriate action to take is to store these attributes in association with the "dress" node. As yet another example and not by way of limitation, if the user query concerns relational information between the dress and another object visible in the image, this relational information may be determined and then input as the fact, and the action predictor 520 may determine that the appropriate actions are to generate a new node in the scene graph for this other object, and then to generate an edge between these two nodes indicating the relational information. Thus, the action predictor 520 may consume the fact embedding and decode a series of actions along with an action vector for each action. These actions and their vectors together may constitute scene graph updates for the current fact, and the output may be used to dynamically update the scene graph as rounds of dialog progress. As an example and not by way of limitation, Table 1 below illustrates several actions that may be performed.

TABLE 1

| Action | Description | Action Vector (v) Manipulation |
| --- | --- | --- |
| _ADD_NODE | Adds a new node | A new node RNN with state v is added to the set of existing RNNs |
| _ADD_EDGE | Adds a new edge between existing nodes graph | A new edge with edge vector v is added to set of existing edge vectors |

TABLE 1-continued

| Action | Description | Action Vector (v) Manipulation |
| --- | --- | --- |
| _UPDATE_NODE | Updates an existing node | All node RNNs receive the input v and are rolled forward by a time step |
| _NONE | Do nothing | Do nothing |

Finally, in particular embodiments, these determined actions may be input, along with a current scene graph, to the graph manipulator 337, which may perform the actual process of executing the actions and updating the scene graph with the new nodes/edges/attributes. Such updating of the scene graph may include modifying or adding new records to a visual dialog state, and the output of the graph manipulator 337 may be an updated scene graph at a time t. As an example and not by way of limitation, given the set of actions and their action vectors, the graph manipulator 337 may perform the operations shown in the last column of the Table 1, thereby infusing the information from the current fact and transforming a partial scene graph from a previous round $S_q^{t-1}$ of dialog to an updated scene graph that also contains the information of the current round $S_q^t$ of dialog. This updated scene graph may then be stored in the multimodal dialog state. Although this disclosure describes generating scene graphs in a particular manner, this disclosure contemplates generating scene graphs in any suitable manner.

FIG. 7 illustrates an example dialog 700 concerning a training image with a caption. In particular embodiments, a scene graph with various nodes, attributes, and relationships between the nodes may be generated for an image of a girl eating, with each node representing an object portrayed in the image. The image may further include a caption, such as "A girl holding a burger in her hand." Thereafter, a question-answer conversation with multiple rounds of dialog may be conducted based on the scene graph of the image, with answers to the questions determined by consulting the scene graph. As an example and not by way of limitation, the questions may be straightforward (e.g., "What does the burger contain?"), and the respective response (e.g., "Lettuce.") may be determined by detecting a node in the scene graph corresponding to "hamburger" or a synonym of it (such as "burger"), and then detecting edges between the "hamburger" node and nodes for other objects having a relationship of, for example, "contains", "in", "on", or a similar synonym with that "hamburger" node. If the node for "hamburger" has a relationship edge of "contains" with a node for "lettuce", the returned response may be the name of the object corresponding to that node (e.g., "Lettuce."). As another example and not by way of limitation, questions may involve multiple layers of attributes and relationships (e.g., "What color is the food on the red object left of the small girl that is holding a hamburger, yellow or brown?"). The respective response may be determined by navigating through the nodes, attributes, and relationships of the scene graphs to determine each piece of information in the question (e.g., the node of an object whose type is "food", whose relationship with the node of an object having an attribute of "red" is "on", which in turn has a relationship of "left of" of the node corresponding to "girl" and having an attribute of "small", etc.). Finally, the requested attribute (e.g., the color attribute of the selected food-type node ("fries")) may be returned as a response to the question. Although this disclosure describes conducting dialog grounded on scene graphs in a particular manner, this disclosure contemplates conducting dialog grounded on scene graphs in any suitable manner.

Figure 8A:
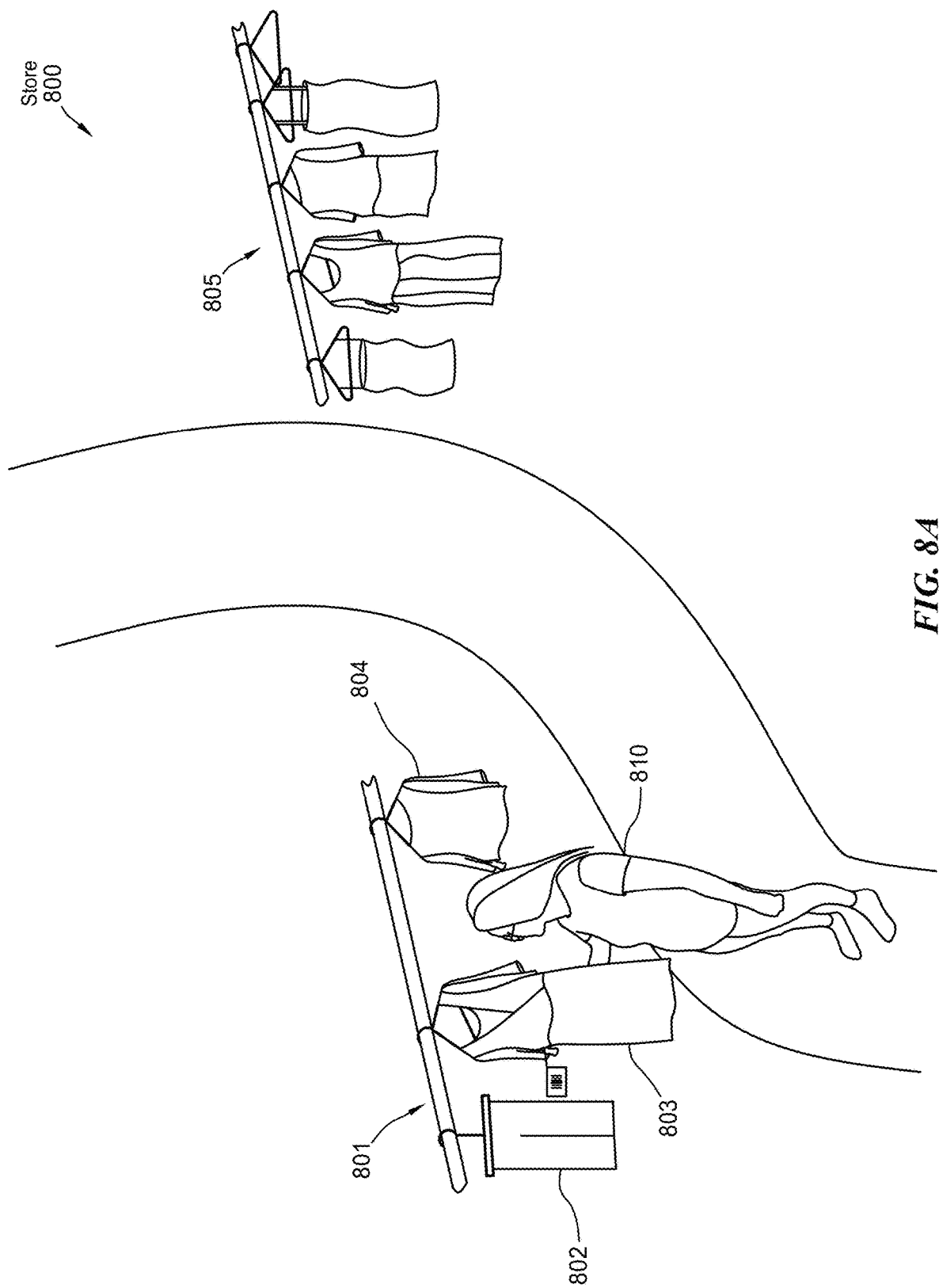
FIG. 8A illustrates an example image of a shopping scene captured by the camera of a client system.

FIG. 8A illustrates an example image of a shopping scene 800 captured by the camera of a client system 130. In the scene 800 of a store, a user 810 wearing smart glasses is surrounded by multiple objects. The user 810 examines a blue dress 803 on a rack 801 containing other clothing items, such as pants 802 and a shirt 804. Scene 800 further includes various other objects, such as another set of blue dresses on rack 805. A camera of the smart glasses worn by the user 810 may capture data, such as visual data, of this scene 800, and the assistant system 140 may access this visual data to respond to user requests.

In particular embodiments, the assistant system 140 may receive, from the client system 130 associated with the user, a first user request comprising a reference to a target object and one or more of an attribute or a relationship of the target object. The target object may refer to a particular object portrayed in the visual data of the scene 800 captured by the camera of the client system 130, such as the blue dress 803. In particular embodiments, the user 810 may see the blue dress 803 while shopping, and she may ask the assistant system 140 for information about it (e.g, "What is the price of this blue dress?"). The user request may take multiple forms, and may involve multiple modalities simultaneously. As an example and not by way of limitation, the request may be a spoken request, and the reference may comprise either an unambiguous reference to the target object 803 (e.g., "What is the price of this blue dress?"), a more ambiguous reference, such as a pronoun (e.g., "What is the price of that?"), or an ambiguous description of the target object 803 (e.g., "the blue thing" or "the middle one"). As another example and not by way of limitation, the user request may be gaze or gesture information of the user 810 (such as a pointing gesture), with or without an accompanying spoken request. Although this disclosure describes receiving a user request in a particular manner, this disclosure contemplates receiving a user request in any suitable manner.

In particular embodiments, the assistant system 140 may access the visual data 503 comprising one or more images portraying the target object 803. As an example and not by way of limitation, the visual data 503 may be a single, static image, which may further have a particular object, such as the target object 803, focused and/or roughly centered in it. As another example and not by way of limitation, the visual data 503 may include a video composed of a stream of images, each image portraying one or more objects. In particular embodiments, the accessed visual data 503 may be visual data that has been captured at a previous time and stored in the multimodal dialog state. In further particular embodiments, the visual data 503 may be incoming real-time visual data of the scene 800 currently viewed by the user 810. As the visual data 503 is received, the assistant system 140 may continuously perform lightweight tagging of objects portrayed within it. As an example and not by way of limitation, the assistant system 140 may receive, from the client system 130, the visual data 503, wherein the visual data 503 is captured by one or more cameras of the client system 130. The assistant system 140 may then analyze, by the CV module 504, the visual data 503 to identify one or more objects portrayed in the one or more images and assign respective object identifiers to one or more of these identified objects (e.g., "rack", "shirt", "dress", etc.). Although this disclosure describes accessing visual data in a particular manner, this disclosure contemplates accessing visual data in any suitable manner.

In particular embodiments, the assistant system 140 may resolve the reference to the target object portrayed in the one or more images. In particular embodiments, if the first user request is unambiguous, the assistant system 140 may resolve the reference to the target object 803 based on input received from the user 810. As an example and not by way of limitation, the first user request may be unambiguous if there is only one blue dress visible in the visual data 503 at the time of the user request, or if multiple modalities can be used to pinpoint the object being referenced (for example, pointing or other gesture information may enable the assistant system 140 to determine which of several blue dresses is being referenced). As another example and not by way of limitation, the first user query may also be unambiguous if it specifies particular, unambiguous relational information (e.g., "What is the price of the blue dress to the leftmost of the rack?"). Thus, in particular embodiments, the assistant system 140 may select, from among the respective object identifiers of the one or more identified objects, a target object identifier (e.g., "dress") corresponding to the target object 803. By contrast, in particular embodiments, if the first user request is ambiguous, the assistant system 140 may disambiguate the user request, perhaps by explicitly asking the user 810 which blue dress she is referring to (e.g., "I see five blue dresses. Which one are you referring to?").

In embodiments in which the first user request references a target object using relational information (e.g., "What is the price of the blue dress to the leftmost of the rack?"), the assistant system 140 may invoke the scene understanding engine 520 to construct a rough scene graph of scene 800 to determine this relational information. In particular embodiments, the assistant system 140 may activate the scene understanding engine 520 by passing the visual data 503 and the respective object identifiers of the one or more objects identified in the visual data 503 to the scene understanding engine 520. The assistant system 140 may then generate, by the scene understanding engine 520, an initial scene graph comprising the target object and one or more additional objects portrayed in the one or more images, and may then resolve the reference to the target object based on this initial scene graph. As an example and not by way of limitation, if the user 810 was currently viewing the multiple blue dresses of rack 805 and queried "What is the price of the blue dress to the leftmost of the rack?", the scene understanding engine 520 may generate a scene graph showing spatial relationships between the rack 805 being viewed by the user 810 and the multiple blue dresses on it. From these spatial relationships, the assistant system 140 may determine which dress is the "leftmost" dress, and resolve that reference containing relational information to this particular dress as the target object. Although this disclosure describes resolving a reference to a target object in a particular manner, this disclosure contemplates resolving a reference to a target object in any suitable manner.

In particular embodiments, the assistant system 140 may determine object information of the target object 803 corresponding to the referenced attribute or relationship of the first user request based on a visual analysis of the one or more images of the visual data 503. In particular embodiments, once a definite target object 803 has been determined, the assistant system 140 may, in response to receiving the first user request, provide the visual data 503 and the target object identifier of the target object 803 to the scene understanding engine 520, which may generate the object information based on the input target object identifier. The identification of the target object 803 should be unambiguous in order to trigger a deeper analysis and/or construction of a scene graph by the scene understanding engine 520. As an example and not by way of limitation, if the first user request was "What fabric is this blue dress made of?", the scene understanding engine 520 may perform a visual analysis of the target object 803 portrayed in the visual data 503 to determine the requested attribute (e.g., cotton).

In particular embodiments, the scene understanding engine 520 of the assistant system 140 may determine the requested attribute through direct analysis, as described above with respect to the determination by the assistant system 140 that the dress 803 was made of cotton via a visual analysis of the dress itself. Additionally or alternatively, in particular embodiments, the assistant system 140 may first determine, by the scene understanding engine 520, one or more properties of the target object 803 based on the visual analysis of the one or more images, and then resolve the target object 803 to a specific entity based on the one or more properties. As an example and not by way of limitation, the scene understanding engine 520 may analyze the visual data 503 to determine particular properties of the target object 803 (e.g., the color and shape of the blue dress 803). These determined attributes may then be passed to the reasoning module 214, which may use these visual attributes to determine a higher-level attribute, such as an SKU number for the dress 803. Accordingly, the target object 803 may first be resolved to the entity of the specific dress corresponding to the determined SKU number. In particular embodiments, the assistant system 140 may then access a knowledge graph based on the specific entity and retrieve the object information from the knowledge graph. As an example and not by way of limitation, the SKU number may be used to query a shopping agent to retrieve the requested attribute (e.g., the fabric of the dress). The SKU number may even be used to retrieve an entire product listing for the dress (e.g., including the price, sizes available, colors available, designer, etc.), that may be used to respond to multiple user requests concerning various attributes of the target object (blue dress 803).

Certain technical challenges exist for analyzing and storing data received at the assistant system 140 from the client system 130 in order to determine and maintain information of objects of interest to a user. One such technical challenge may include the amount of resources and memory required to process all the incoming data. The solution presented by the embodiments disclosed herein to address this challenge may be to rely on the user 810 to indicate objects of interest from within this data. Rather than analyzing all incoming data, the assistant system 140 may simply begin analysis of the data in response to receiving an initial first user request from the user 810 about the scene 800. In response to this user request, the assistant system 140 may create an initial scene graph and seed it with data of the scene 800 in order to determine a particular object of interest referenced by the user. Subsequently, the assistant system 140 may further analyze the object of interest (e.g., the target object 803) to determine the requested information of that object of interest. Additionally, rather than performing a complete analysis of the object of interest and determining as much information up-front as possible, the assistant system 140 may further conserve resources by relying on the user 810 to indicate attribute(s) of interest of the target object, and may simply analyze the target object to the extent required to determine those specific attributes of interest.

Thus, in particular embodiments, the assistant system 140 may analyze the visual data 503 in response to the first user request to determine the specific attribute requested, rather than determining a plurality of detectable attributes up-front. Further, rather than determining attributes and generating relational information for every entity in the scene portrayed in the visual data 503, the scene understanding engine 520 may simply generate attribute and/or relational information concerning the target object 803. As an example and not by way of limitation, if the user request is "What color is this dress?", the assistant system 140 may analyze the visual data 503 portraying the target object 803 and determine that the color is "navy blue". Subsequently, in particular embodiments, the assistant system 140 may receive an additional user request concerning another attribute of the target object 803, and may again analyze the visual data 503 in order to determine this specific other attribute. As an example and not by way of limitation, if the additional user request is "What fabric is it made of?", the assistant system 140 may analyze the visual data 503 portraying the target object 803 and determine that the fabric is "cotton".

Finally, in particular embodiments, the assistant system 140 may, in response to the generation of the object information, halt provision of the visual data 503 to the scene understanding engine 520, thus deactivating the scene understanding engine 520. As an example and not by way of limitation, the assistant system 140 may halt provision of the visual data 503 to the scene understanding engine 520 after each user request, once the object information corresponding to that particular request has been determined, and resume provision of the visual data 503 to the scene understanding engine 520 as each new user request is received. As another example and not by way of limitation, the assistant system 140 may continue providing the visual data 503 to the scene understanding engine as long as the dialog between the user 810 and the assistant system 140 indicates that the scene 800 is still being discussed, and then halt provision of the visual data 503 at the end of this dialog. Although this disclosure describes determining object information of an object in a particular manner, this disclosure contemplates determining object information of an object in any suitable manner.

In particular embodiments, the assistant system 140 may store, responsive to receiving the first user request, the object information of the target object 803 in a multimodal dialog state. After the scene understanding engine 520 has generated the requested object information, it may generate or modify a scene graph of relevant visual data based on this object information, with the scene graph being incrementally generated at each turn of dialog between the user 810 and the assistant system 140. Thus, the determined object information is stored as a scene graph in the multimodal dialog state, and scene graphs may be generated and stored based on user dialog rather than automatically from visual data. Storing a scene graph with simply the requested information that the user 810 has expressly indicated an interest in may result in a significant conservation of memory. This conservation of memory may in turn enable a greater amount of relevant data to be stored and for longer periods of time, and may further aid the assistant system 140 in disambiguating user queries. In particular embodiments, the scene graph may be stored for a pre-determined period of time (e.g., one day, one week, one month, or longer), subject to the user's privacy settings, after which time it may be cleared. Finally, in particular embodiments, the assistant system 140 may further send, to the client system 130, instructions for presenting a response to the first user request, wherein the response comprises the object information. Although this disclosure describes storing object information of an object in a particular manner, this disclosure contemplates storing object information of an object in any suitable manner.

Figure 8C:
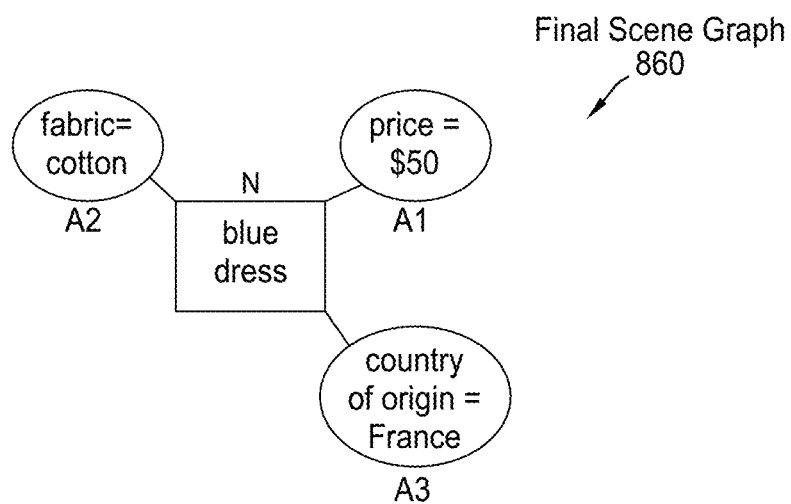

FIGS. 8B-8C illustrate the incremental generation of a scene graph during dialog concerning the scene of FIG. 8A. In particular embodiments, the assistant system 140 may generate, by a dialog engine 530, a partial scene graph consisting of the target object identifier and the object information of the target object. Storing the object information of the target object 803 may thus comprise storing this partial scene graph in the multimodal dialog state. As an example and not by way of limitation, as illustrated in FIG. 8B, a partial scene graph may be generated and incrementally added on to at each round of a dialog 850 between the user 810 and an assistant system 820, such as assistant system 140. At a first turn of the dialog 850, the first user request may be "What is the price of this blue dress?". The assistant system 820 may accordingly determine, via a visual analysis of the visual data 503 by the scene understanding engine 520, that the price of the blue dress 803 is fifty dollars, and may return this object information as a response to the user. The assistant system 820 may further generate a partial scene graph based specifically on the target object 803 identified by the user 810, and the attribute information requested by the user 810. Thus, rather than generating a scene graph of the entire scene 800, with multiple nodes for each viewed object in the scene 800 and multiple attributes determined for each object, the assistant system 820 may simply generate a partial scene graph having a single node N corresponding to the target object (e.g., blue dress 803) identified by the user 810. At the first turn of the dialog 850, this partial scene graph may further include only the single attribute A1 (e.g., price) requested by the user 810.

The user 810 may then continue to ask questions concerning this target object 803 either directly or using coreferences, and the assistant system 820 may further analyze the target object 803 portrayed in the visual data 503 in order to respond to the user's queries. In particular embodiments, the assistant system 820 may receive, from the client system 130, a second user request comprising a reference to the target object 803 and one or more of an additional attribute or an additional relationship of the target object 803. The assistant system 820 may then determine additional object information of the target object 803 corresponding to the referenced additional attribute or relationship of the second user request based on a subsequent visual analysis of the one or more images and then store, responsive to receiving the second user request, the second object information of the target object 803 in the multimodal dialog state. As an example and not by way of limitation, at a second turn of the dialog 850, the user request may be "What fabric is it made of?". The scene understanding engine 520 may accordingly re-analyze the visual data 503 in order to determine this second requested attribute (e.g., "cotton"), and may update the partial scene graph to include the second attribute A2. Similarly, in response to a user request concerning where the dress was made in the third round of the dialog 850, the assistant system 820 may return a response with the requested object information (e.g., "It was made in France."), and may again update the partial scene graph to include this third attribute A3.

FIG. 8C illustrates a final scene graph 860 including the node N corresponding to the blue dress 803 and the three attributes A1-A3 discussed in the dialog 850 that has been incrementally generated by the end of the dialog 850. This final scene graph 860, containing the particular information that that the user 810 has explicitly demonstrated an interest in, may be stored in the multimodal dialog state. The final scene graph 860 may further be stored to a longer-term user memory, such as data store 212. A technical challenge for storing data received at the assistant system 140 from the client system 130 may include the amount of memory required to store all the incoming data from the client system 130. Thus, the solution presented by the embodiments disclosed herein to address this challenge may be to incrementally generate a scene graph 860 including the objects and attributes of interest as indicated by the user 810, and simply store the resulting scene graph 860 that has the incrementally added information rather than storing all information detected in a scene. In addition to reducing the amount of required memory, storage of such targeted information may further enable the storage of more data relevant to the user for longer periods of time. Often, assistant systems clear their dialog state tracking, including object information of the target object of interest, after a given amount of time or turns of dialogue (e.g., after a day, after a task is complete, or after 5 turns of dialogue between a user and the assistant system 140), so a user may not be able to make user requests about a target object at a later time. By contrast, the present assistant system 820 may focus on storing information known to be relevant to the user (e.g., because the user directly asked about it), thus reducing the total amount of data that is stored. In turn, because there is less data stored, the assistant system 820 may store it for a longer period of time. Subsequently, if the user 810 issues a command to the assistant system 820 at a later time (e.g., a week later) such as "I think I'm going to buy that blue dress. Order it online for me."), the assistant system 820 may be able to determine what blue dress is being referenced, and accordingly execute the command.

A technical advantage of this storage of particular data of interest may include enabling an assistant system 140 to disambiguate user requests concerning the target object 803 from other, similar objects, both at the time of capturing data of these objects and in future user references to the target object 803, due to the targeted storage of the target object of interest rather than all similar objects appearing in the captured visual data 503. As an example and not by way of limitation, the assistant system 140 may receive additional visual data, the additional visual data comprising one or more additional images portraying a second object sharing an attribute or relationship with the target object. For instance, after conducting the dialog 850 concerning the blue dress 803, the user 810 may turn and view a set of blue dresses on rack 805, thus capturing, via a camera of the client system 130, additional visual data that portrays four second objects (the four additional dresses on rack 805) that share an attribute (e.g., their blue color) with the target object 803. In a typical brute force approach, an assistant system might record and analyze all this visual data 503, including that of the additional blue dresses, and store it for a period of time in the multimodal dialog state, and so this presence of multiple blue dresses in storage may cause the assistant system to be unable to determine what blue dress the user 810 is referencing in future queries. By contrast, the present assistant system 140 may not analyze these other blue dresses or include them in the final scene graph 860 stored in the multimodal dialog state if the user 810 does not explicitly query the assistant system 140 about them.

Thus, in particular embodiments, the assistant system 140 may determine whether a second user request referencing the second object (e.g., one or more of the additional blue dresses on rack 805) has been received. Responsive to determining whether the second user request referencing the second object has been received, the assistant system 140 may, if the second user request has been received, store, responsive to receiving the second user request, second object information of the second object in the multimodal dialog state. On the other hand, if the second user request has not been received, the assistant system 140 may store the additional visual data without storing the second object in the multimodal dialog state. As an example and not by way of limitation, if the user 810 asks about one of the blue dresses on rack 805 (e.g., "What is the price of this other blue dress?", perhaps accompanied by a pointing gesture to the particular additional blue dress), the assistant system 140 may analyze, via the scene understanding engine 520, the visual data 503 portraying this new target object to determine a response to the user query (e.g., "It is $40.00."). This new target object and the requested attribute may then be added to the partial scene graph generated during the dialog 850 and stored in the multimodal dialog state. By contrast, if the user 810 merely looks at the additional blue dresses on rack 805 but does not make a user query about them, the captured visual data 503 portraying these additional blue dresses may not be passed to the scene understanding engine 520, and thus, though the visual data 503 itself may be stored for some period of time (subject to privacy settings), information about the additional blue dresses may not be determined or added to the partial scene graph, or stored in the multimodal dialog state.

Accordingly, in particular embodiments, this partial scene graph may be used to disambiguate referenced objects in future user requests. As an example and not by way of limitation, the assistant system 140 may receive, from the client system 130, a second user request, wherein the second user request comprises a reference to the shared attribute or relationship and may determine, based on the object information stored in the multimodal dialog state, that the second user request is associated with the target object 803. For instance, at a later time (e.g., a week later), the user 810 may issue a user request referencing the target object 803 by its shared attribute (e.g., "I think I'm going to buy that blue dress. Order it online for me."). Because the assistant system 140 has only stored the single blue dress 803 that the user 810 expressed an interest in, the assistant system 140 may determine that the user request referencing the "color" attribute is referring to the target object 803, since that is the only blue dress stored in the multimodal dialog state. In particular embodiments, the partial scene graph may additionally enable the assistant system 140 to disambiguate user queries on an even shorter timescale. As an example and not by way of limitation, if the user 810 sees the additional blue dresses on rack 805 and issues a second user request asking the assistant system 140 "What was the price of that blue dress again?", the assistant system 140 may be able to determine that the user 810 is referring to the original blue dress 803, as the assistant system 140 has merely analyzed and stored this particular object of interest 803, and not the multiple other blue dresses in the incoming visual data 503. Thus, in particular embodiments, the assistant system 140 may send, to the client system 130 and in response to the second user request, instructions for presenting a response to the second user request, wherein the response comprises the object information of the target object. As an example and not by way of limitation, the assistant system 140 may return the price of the target blue dress 803 rather than the price of any of the other blue dresses on rack 805, without first asking the user 810 to specify which blue dress she is referring to.

By contrast, in an embodiment in which the user 810 did ask about one of the other blue dresses on rack 805 and this other blue dress was also entered into the partial scene graph and saved in the final scene graph 860, a future user request referencing the shared attribute may now be ambiguous. As an example and not by way of limitation, the user 810 may issue a command at a later time, such as a week later, (e.g., "I think I'm going to buy that blue dress. Order it online for me."). This command may now be ambiguous, since there are two blue dresses stored in the multimodal dialog state, and so the assistant system 140 may need to disambiguate this command. In particular embodiments, the assistant system 140 may make this disambiguation by explicitly asking the user 810 which blue dress she is referring to.

In particular embodiments, the scene graph 860 may further be updated to store data from multiple modalities, if the user 810 indicates the data as being of interest. As an example and not by way of limitation, the user 810 may hear music playing in the store, and then ask "Hey Assistant, what song is that?". In response, because the user 810 has expressed interest in this data, the assistant system 820 may update the final scene graph 860 to add audio data of the music as a node in the scene graph 860, and may analyze the audio data to generate a response to the user request (e.g., "This song is 'Imagine'."). In particular embodiments, this updated final scene graph 860, containing the original node N and attributes A1-A3 of the blue dress as well as a new node for the song, may be stored in the multimodal dialog state, and may further be stored to a longer-term user memory, such as data store 212. Thus, similar to the node N, this updated final scene graph may be used to resolve user queries concerning that song in the future, even though they might otherwise be ambiguous queries. For example, if the user later asks "Hey Assistant, find that song online.", the assistant system 820 may determine that "that song" refers to the audio data that has been stored in the updated final scene graph 860 and thus may execute the user request accordingly.

Figure 9A:
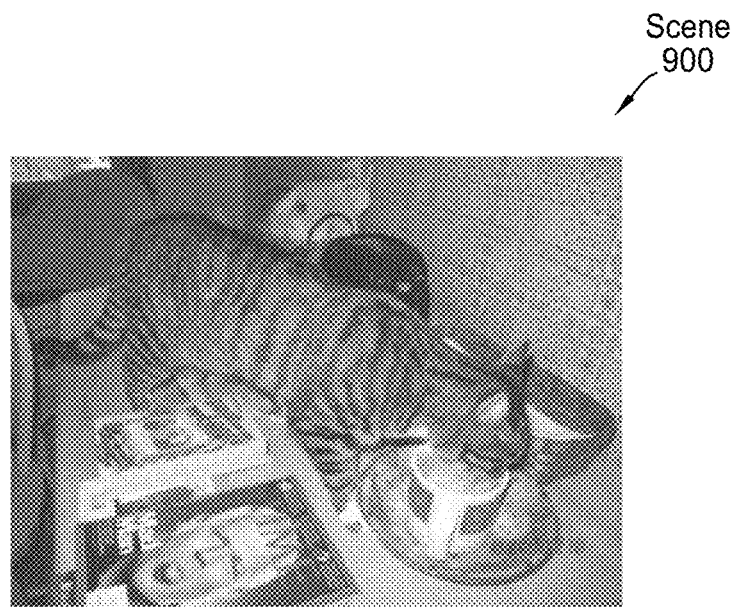
FIG. 9A illustrates an example image of a kitchen scene captured by a camera of a client system.
Figure 9B:
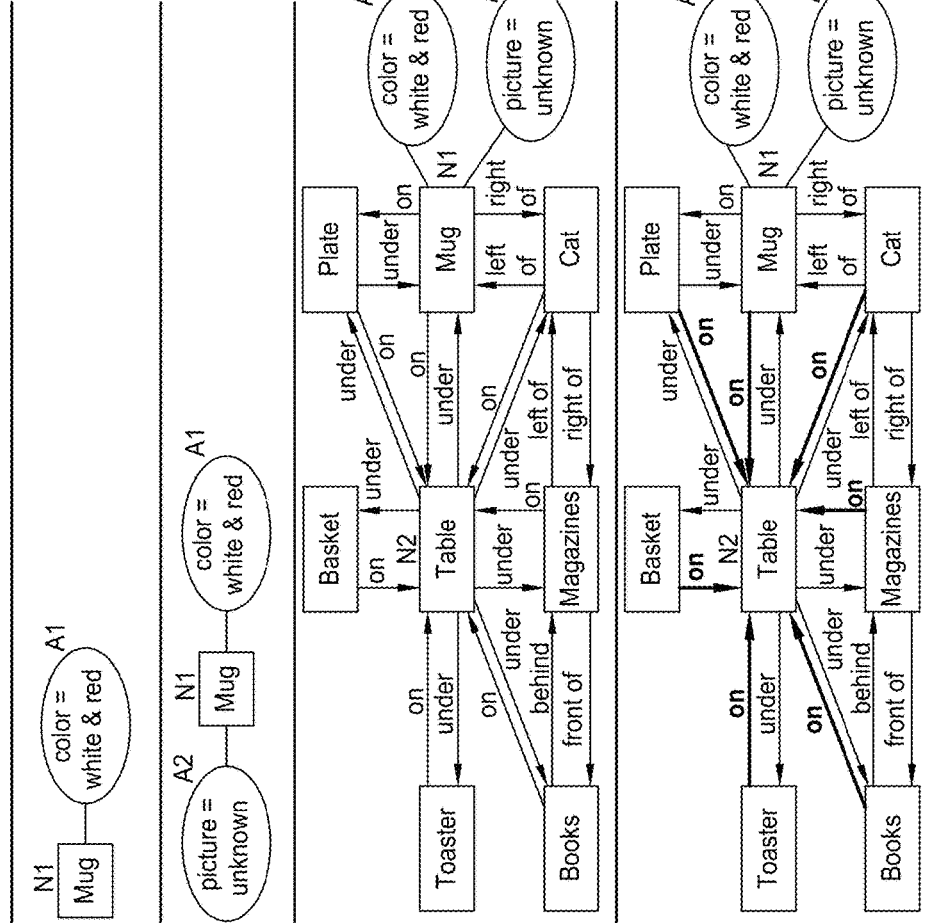
FIGS. 9B-9C illustrate the incremental generation of a scene graph during a dialog concerning the scene of FIG. 9A.
Figure 9C:
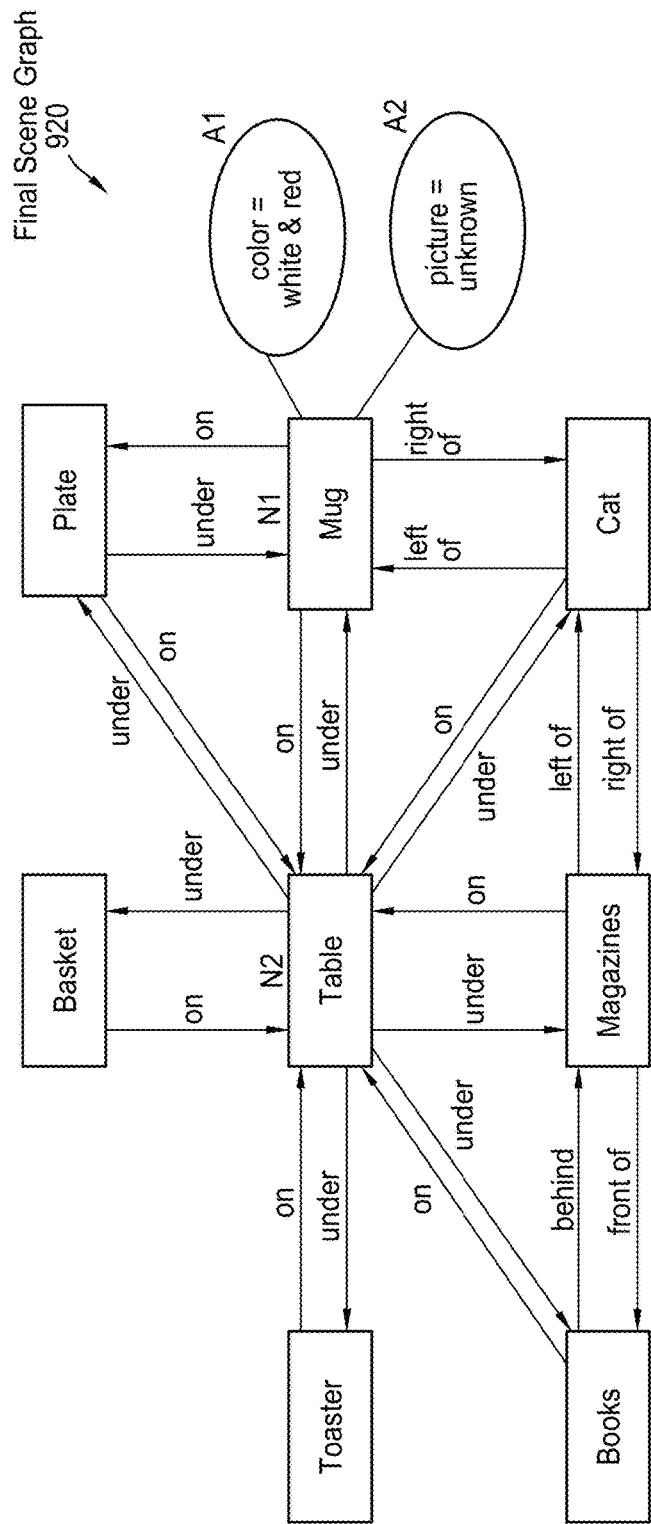

FIG. 9A illustrates an example image of a kitchen scene 900 captured by a camera of a client system 130. The image of scene 900 portrays a plurality of objects having various spatial relationships with one another within the scene of a kitchen. FIGS. 9B-9C illustrate the incremental generation of a scene graph during a dialog 910 concerning the scene 900 of FIG. 9A. In particular embodiments, similar to the dialog 850 concerning the scene 800 of FIG. 8A and as illustrated in FIG. 9B, a user 911 may conduct a multi-turn dialog 910 grounded in visual content (e.g., the image 503) with an assistant system 912. As an example and not by way of limitation, at the first turn of the dialog 910, the user 911 may ask "What color is the mug?". The assistant system 912 may then analyze, via the scene understanding engine 520, the specific object having an object identifier of "mug" in the image 503 to generate a response (e.g., "White and red."), and may further generate a partial scene graph with a single node N1 corresponding to the mug and a single attribute A1 corresponding to the "color" attribute of the mug. At the second turn of the dialog 910, the user 911 may ask "Are there any pictures on it?". The assistant system 912 may again analyze, via the scene understanding engine 520, the mug portrayed in image 503. However, though this visual analysis may reveal that there is something pictured on the mug, the assistant system 912 may not be able to determine what exactly the picture is, for example, due to the quality of the image 503 or the angle at which the image 503 was captured. Accordingly, in particular embodiments, the assistant system 912 may return a response indicating this undetermined attribute (e.g., "Something is there, but I can't tell what it is."). The assistant system 912 may further update the partial scene graph to include the second attribute A2 corresponding to the "picture" attribute of the mug. However, the value of this attribute A2 may be null or "unknown".

At the third round of the dialog 910, the user 911 may make a user request referencing and depending upon relational information within the scene 900 (e.g., "Are the mug and cat on the table?"). In order to generate a response to this user request, the assistant system 912 may forward the visual data 503 to the scene understanding engine 520, along with object identifiers of objects detected by CV module 504, to generate relational information among the objects in the image 503 and determine whether a relationship of "on" exists between the cat and mug and various objects within the scene 900. Accordingly, the scene understanding engine 520 may generate a large scene graph of nodes corresponding to various objects portrayed within the image 503 and edges indicating the relational information among the various objects. The scene understanding engine 520 may then check to see whether the relational edges between the mug and the table and between the cat and the table have a value of "on", and may return a response indicating these relationships to the user 911 ("Yes."). At a fourth round of the dialog 910, the user may ask another question concerning relational information among objects portrayed in the image 503 (e.g., "Are there other items on the table?"). The scene understanding engine 520 may then process the scene graph generated in the third round of the dialog 910 to detect objects having an edge to the node N2 corresponding to the table with a value of "on". Accordingly, the assistant system 912 may return the five objects determined to have this "on" relationship with the table to the user 911 as a response (e.g., "Yes, magazines, books, a toaster, a basket, and a plate.").

FIG. 9C illustrates a final scene graph 920, including the nodes corresponding to the various objects portrayed in the image 503 of the scene 900 and the two attributes A1 and A2 discussed in the dialog 910, that has been incrementally generated by the end of the dialog 910. This final scene graph 920, containing the particular information that that the user 911 has explicitly demonstrated an interest in, may be stored in the multimodal dialog state. The final scene graph 920 may further be stored to a longer-term user memory, such as data store 212.

Figure 10A:
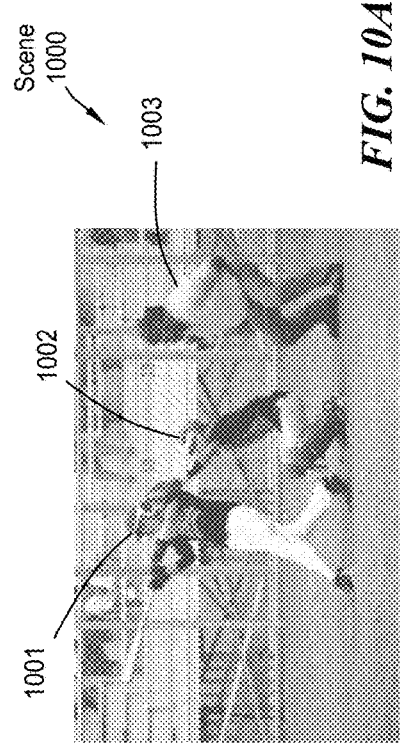
FIG. 10A illustrates an example image of a sporting scene captured by a camera of a client system.
Figure 10C:
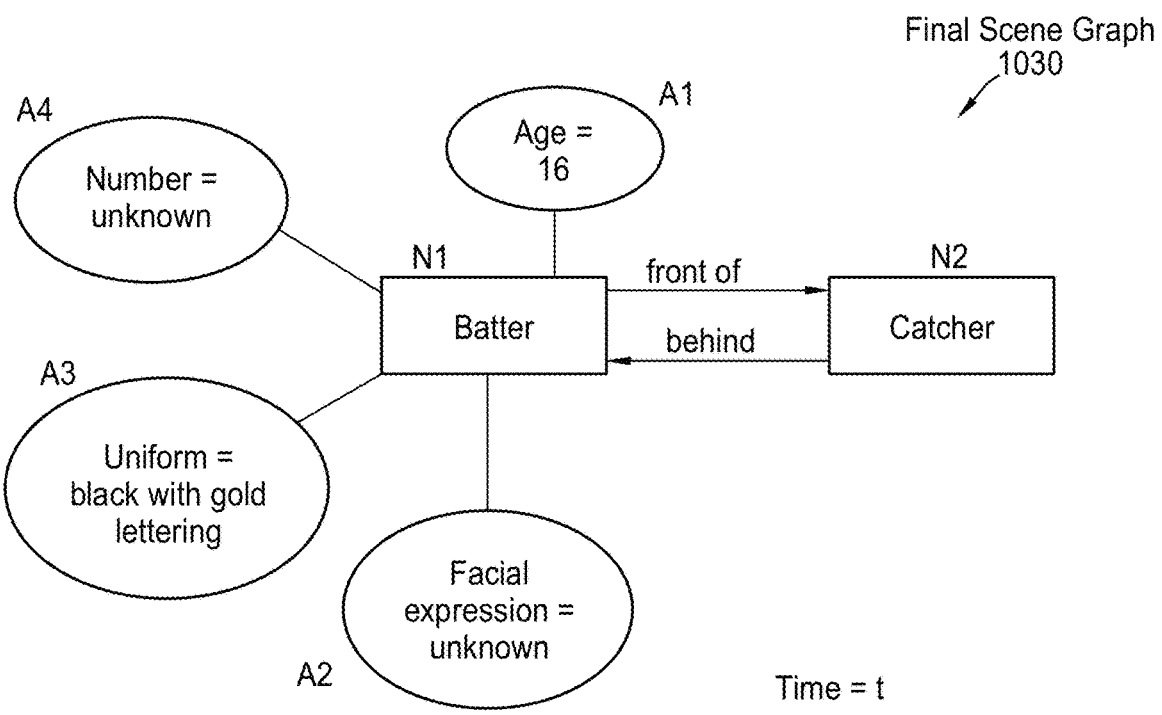
Figure 10D:
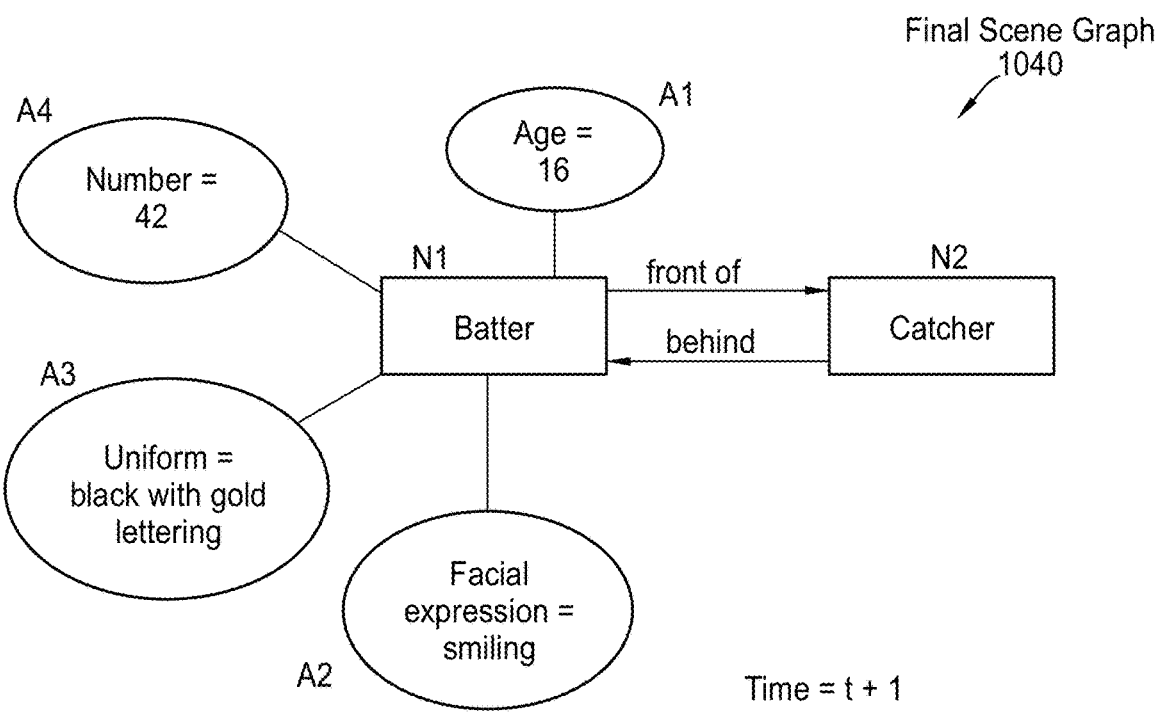

In particular embodiments, a scene graph may be updated dynamically over time as additional data concerning object (s) of interest is received. FIG. 10A illustrates an example image of a sporting scene 1000 captured by a camera of a client system 130. The image of the scene 1000 portrays a batter 1001, a catcher 1002, and a coach 1003 having various relationships with objects and spatial relationships with one another. FIGS. 10B-10D illustrate the incremental generation of scene graphs concerning the scene of FIG. 10A over time. In particular embodiments, as illustrated in FIG. 10B, a user 1010 may conduct a multi-turn dialog with assistant system 1020. As an example and not by way of limitation, at the first turn of the dialog, the user 1010 may ask "About how old does the batter look?". The assistant system 1020 may then analyze, via the scene understanding engine 520, data of the image 503 concerning this specific target object (e.g., the batter 1001 referenced in the user request) to generate a response (e.g., "16."), without analyzing the ages of the other players 1002 and 1003. The assistant system 1020 may further generate a partial scene graph with a single node N1 corresponding to the batter and a single attribute A1 corresponding to the "age" attribute of the batter 1001. At the second turn of the dialog 910, the user 911 may ask "What is his facial expression?". The assistant system 1020 may again analyze, via the scene understanding engine 520, the image 503. However, this visual analysis may not be able to determine what the facial expression of the batter 1001, for example, due to the angle at which the image 503 was captured or due to something (such as the batter's arm) occluding the face of the batter 1001. Accordingly, in particular embodiments, the assistant system 1020 may return a response indicating this undetermined attribute (e.g., "I can't tell."). The assistant system 1020 may further update the partial scene graph to include the second attribute A2 corresponding to the "facial expression" attribute of the batter 1001. However, the value of this attribute A2 may be null or "unknown". As the dialog progresses, nodes N representing objects of interest may be added or deleted, or edges and attributes A of nodes may be updated as new information is determined in response to each user request, with attributes having either the determined object information or an "unknown" value, as appropriate.

At the fifth round of dialog, the user 1010 may ask the assistant system 1020 a question involving relational information (e.g., "Who is behind him?"). In particular embodiments, in order to determine a response to this query, the scene understanding engine 520 may add additional nodes for the catcher 1002 and the coach 1003, and may generate edges indicating relational information between these three players in order to determine which one(s) are "behind" the batter 1001. The assistant system 1020 may then select the node(s) having a "behind" relationship with the node corresponding to the batter 1001 and return this object information to the user 1010 (e.g., "The catcher.").

Finally, in particular embodiments, the assistant system 1020 may generate a final scene graph of objects and object information that was specifically relevant to the dialog between the user 1010 and the assistant system 1020. This final scene may simply contain the particular information that that the user 1010 has explicitly demonstrated an interest in. FIG. 10C illustrates such an example final scene graph 1030 at time t. As an example and not by way of limitation, the final scene graph 1030 may include the node N1 corresponding to the batter 1001, as well as the various attributes A1-A4 and their respective values that were incrementally generated over the course of the dialog. The final scene 1030 graph may further contain a node N2 corresponding to the catcher 1002, since the user 1010 explicitly asked about this player. However, the final scene graph 1030 may omit the node corresponding to the coach, as this node was generated simply for the purpose of determining a response to a user query expressing interest in a different node through relational information. Because users are often not interested in the majority of captured visual data, and the user 1010 has not indicated an interest in this player 1003, the rest of the information generated may be discarded, thus reducing the amount of memory required to store the final scene graph 1030. In particular embodiments, this final scene graph 1030 may be stored in the multimodal dialog state, and may further be stored to a longer-term user memory, such as data store 212.

In particular embodiments, the stored final scene graph 1030 may be updated dynamically as information on the attributes A2 and A4 that were assigned values of "unknown" become available at a later time t+1. FIG. 10D illustrates an example final scene graph 1040 derived from final scene graph 1030 at time t+1. As an example and not by way of limitation, if the values of attributes A2 and A4 were unknown due to occlusion of the batter 1001, or due to the angle at which the image of batter 1001 was captured, changes in the occlusion or angle may enable the assistant system 1020 to determine these previously unknown values. Accordingly, the assistant system 1020 may update these values (e.g., the value of the "facial expression" attribute A2 may be updated to "smiling"), thus creating a final scene graph 1040 having these updated values. In particular embodiments, such a dynamic updating of a scene graph may occur in response to a new user request at a later time at which the requested information can be determined (e.g., by asking "What is his facial expression now?" after the batter 1001 has moved so that his face can be seen). In further particular embodiments, the dynamic updating of the scene graph may occur automatically and repeatedly over a period of time. As an example and not by way of limitation, the "facial expression" attribute A2 of the batter 1001 may be updated each time the batter 1001 moves in a way that his facial expression can be seen. Thus, as the game progresses and this facial expression continues to change, this attribute A2 may be continually updated. In particular embodiments, iterations of final scene graph 1040 may be stored in the multimodal dialog state, and may further be stored to a longer-term user memory, such as data store 212. As an example and not by way of limitation, each iteration may be stored as a separate final scene graph such that a plurality of final scene graphs of sporting scene 1000 exist in memory, enabling the user 1010 and the assistant system 1020 to track and discuss various attributes and relationships stored in the final scene graphs as they change over time. As another example and not by way of limitation, each iteration may be used to overwrite the previous iteration of the final scene graph stored in memory, thus conserving memory by keeping merely a single final scene graph as stored at the final point in time at which it was modified.

In particular embodiments, a user may make user requests to the assistant system 140 that involve attribute information of objects within a scene, thus necessitating visual analysis of visual data 503 to resolve these descriptive coreferences to particular objects. As an example and not by way of limitation, FIG. 11A illustrates an example image of a colored grid 1100. Grid 1100 contains sixteen boxes, each box having a respective background color and a digit, where the digits also have a respective color. For example, the four boxes of row one of grid 1100 may have background colors of salmon, salmon, white, and white, respectively. The digits of row one of grid 1100 may be 2, 1, 9, and 9, respectively. The colors of the digits of row one of grid 1100 may be red, violet, red, and blue, respectively.

Figure 11D:
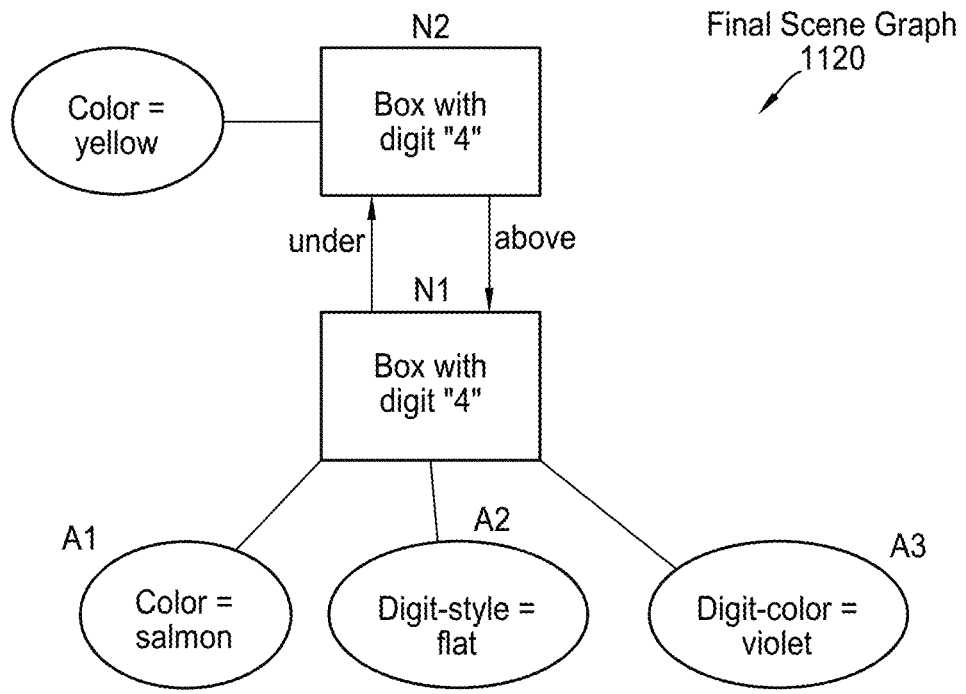

In particular embodiments, the assistant system 140 may analyze, by the CV module 504, the image of the grid 1100 to identify the objects (e.g., boxes of the grid 1100) portrayed in the image and assign respective object identifiers to these identified objects. As an example and not by way of limitation, the object 1101 may be assigned an object identifier of "<object>=box with digit '2'". FIGS. 11B-11D illustrate the incremental generation of a scene graph during a dialog concerning the colored grid of FIG. 11A. As illustrated in FIG. 11B, during a dialog 1110a, a CV module output chart listing the object identifiers of each box in the grid 1100 may be provided for use in answering user queries. As shown in FIG. 11C, this CV module output chart may be used to incrementally generate a partial scene graph over the course of the dialog 1110*b* between a user 1111 and an assistant system 1112, such as assistant system 140.

As an example and not by way of limitation, in the first round of the dialog 1110*b*, the user 1111 may ask "Are there any digits in a salmon background?", using an attribute, such as the description of the background color, to query about an object. The assistant system 1112 may accordingly provide as input the CV module output chart to the scene understanding engine 520 and determine, via a visual analysis of the image portraying grid 1100 by the scene understanding engine 520, a color attribute for each box in the grid 1100. The scene understanding engine 520 may then select the objects 1101, 1102, and 1104 having a background color of "salmon", and generate a response indicating the number of determined objects (e.g., "Three."). In a second round of the dialog 1110*b*, the user 1111 may ask "How many fours are among them?"). The assistant system 1112 may then select the objects 1101, 1102, and 1104 determined to have salmon backgrounds, select the object(s) 1104 having a digit of "4" in the object identifier, and send a response indicating the number of selected objects (e.g., "One."). In particular embodiments, this second response may not require the scene understanding engine to perform a second visual analysis of the grid 1100, as the required information has already been generated and input to the dialog engine 530.

In a third round of the dialog 1110*b*, the user may ask "What is the style of the four?". In particular embodiments, because the assistant system 1112 has already identified the specific object 1104 being referenced by the user, the scene understanding engine 520 may perform a second visual analysis of the grid 1100 focused specifically on the object 1104 and may determine the requested attribute (e.g., digit style) of object 1104 without analyzing the remaining objects in the grid 1100 or determining their respective digit styles. The scene understanding engine 520 may further create and update a partial scene graph having a node N1 corresponding to object 1104 and attributes A1 and A2 corresponding to the "color" and "digit-style" attributes of interest of object of interest 1104.

In particular embodiments, in a fifth round of the dialog 1100*b*, the user 1111 may make a user request involving both attribute information and relational information (e.g., "What is the background color of the digit above it?"). The assistant system 1112 may again forward the image 503 of the grid to the scene understanding engine 520, which may perform a new visual analysis in order to resolve the newly referenced object ("the digit above it") and the attribute information (color) of this object. In particular embodiments, the scene understanding engine 520 may generate a scene graph centered on object 1104 and determine edges indicating the relational information between object 1104 and the objects surrounding it. The scene understanding engine 520 may further determine the background color of each of these objects. Finally, the scene understanding engine 520 may then process the scene graph generated in the fifth round of the dialog 1110*b* to detect object(s) having an edge to the node N1 corresponding to object 1104 with a value of "above". Accordingly, the assistant system 1112 may determine that a node N2 corresponding to the object 1103 is the object with a relationship of "above" with the object 1104, and may return the requested attribute (e.g., the background color) of this object 1103 to the user 1111 as a response (e.g., "Yellow.").

Finally, in particular embodiments, the assistant system 1112 may generate a final scene graph of objects and object information that were specifically relevant to the dialog 1110*a* and 1110*b* between the user 1111 and the assistant system 1112. This final scene graph 1120 may simply contain particular information that that the user 1111 has explicitly demonstrated an interest in. FIG. 11D illustrates such an example final scene graph 1120. As an example and not by way of limitation, the final scene graph 1120 may include the node N1 corresponding to the object 1104, as well as the various attributes A1-A3 and their respective values that were incrementally generated over the course of the dialog 1110*b*. The final scene graph 1120 may further contain a node N2 corresponding to the object 1103, since the user 1111 explicitly asked about this object, and the "color" attribute of this object 1103. However, the final scene graph 1120 may discard the nodes corresponding to the left and right of the object 1104 in the grid 1100, as these nodes and their respective attributes were generated simply for the purpose of determining a response to a user query expressing interest in a different node through relational information. In particular embodiments, this final scene graph 1120 may be stored in the multimodal dialog state, and may further be stored to a longer-term user memory, such as data store 212.

Figure 12A:
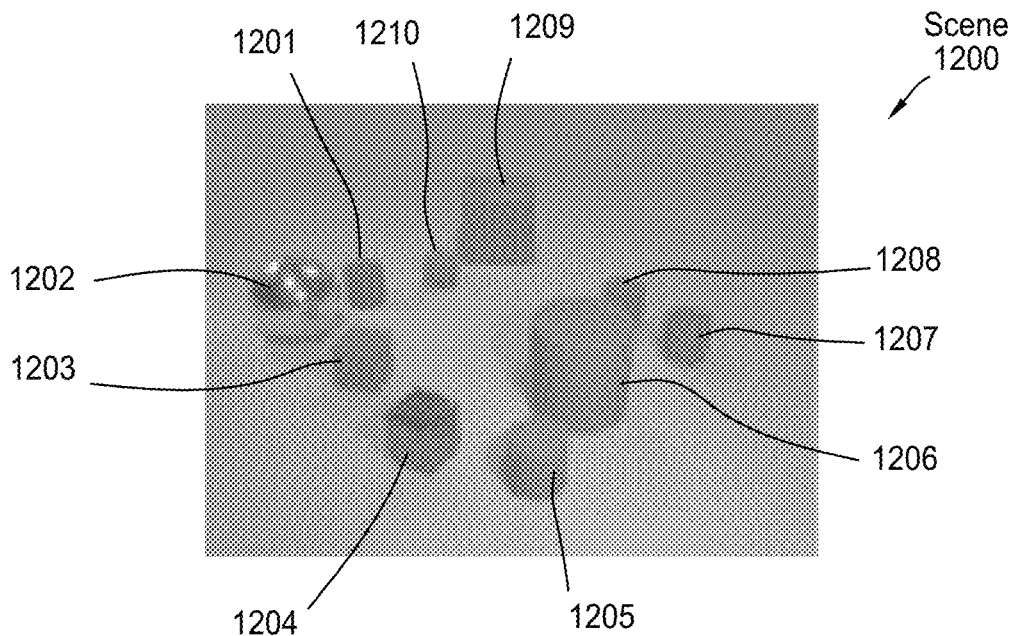
FIG. 12A illustrates a scene portraying a plurality of geometric objects.

In particular embodiments, a user may make user requests to the assistant system 140 that involve relational information, thus necessitating the generation of a large initial scene graph to resolve relational coreferences to particular objects. Accordingly, in such an embodiment, resolving a reference to a target object in a user request may comprise generating, by the dialog engine 530, an initial scene graph comprising the target object and one or more additional objects portrayed in one or more images and then resolving the reference to the target object based on the initial scene graph. As an example and not by way of limitation, FIG. 12A illustrates an image of a scene 1200 portraying a plurality of geometric objects of various colors, shapes, and sizes. As an example and not by way of limitation, object 1201 may be a small red cylinder; object 1202 may be a large yellow sphere; object 1203 may be a small brown cube; object 1204 may be a small green cube; object 1205 may be a small green cylinder; object 1206 may be a large gray cylinder; object 1207 may be a small blue cylinder; object 1208 may be another small green cylinder; object 1209 may be a large green cube; and object 1210 may be a small gray sphere. These geometric objects 1201-1209 may have various spatial relationships with one another (e.g., behind, next to, right of, etc.) and properties (e.g., color, size, material, reflectiveness, etc.). A user may conduct a dialog with the assistant system 140 about these geometric objects, and the assistant system 140 may access the image of scene 1200 in order to respond to user requests.

Figure 12B:
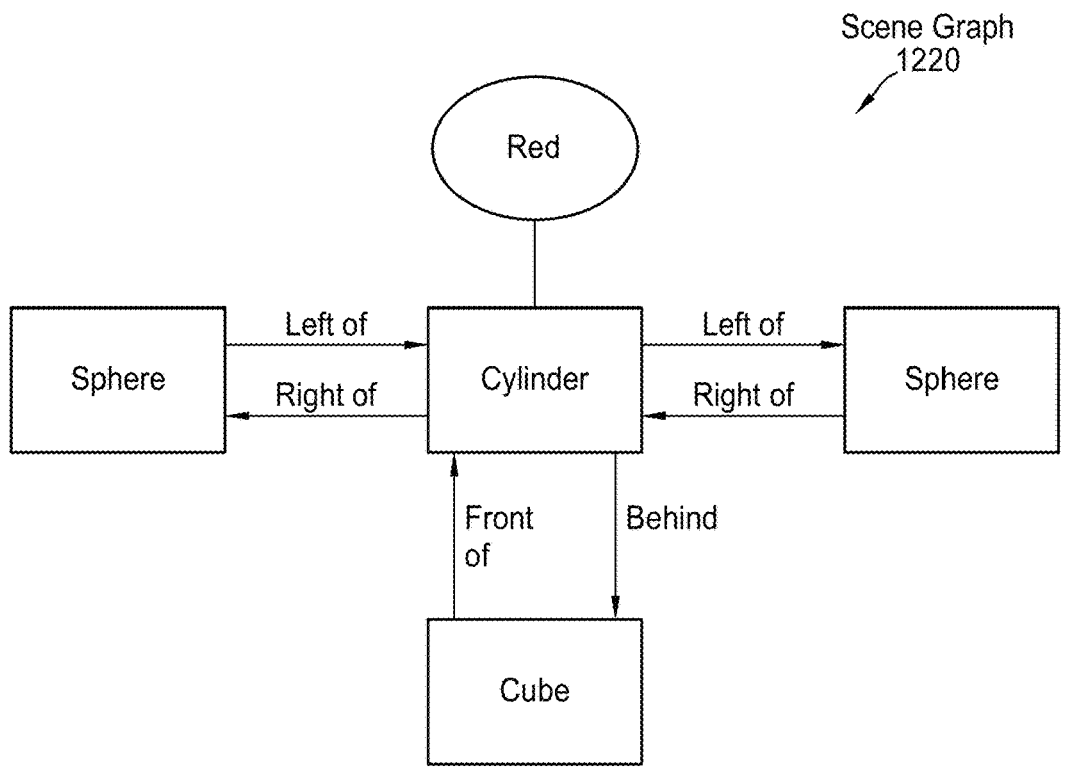
FIGS. 12B-12D illustrate the incremental generation of a scene graph during a dialog concerning the scene of FIG. 12A.
Figure 12C:
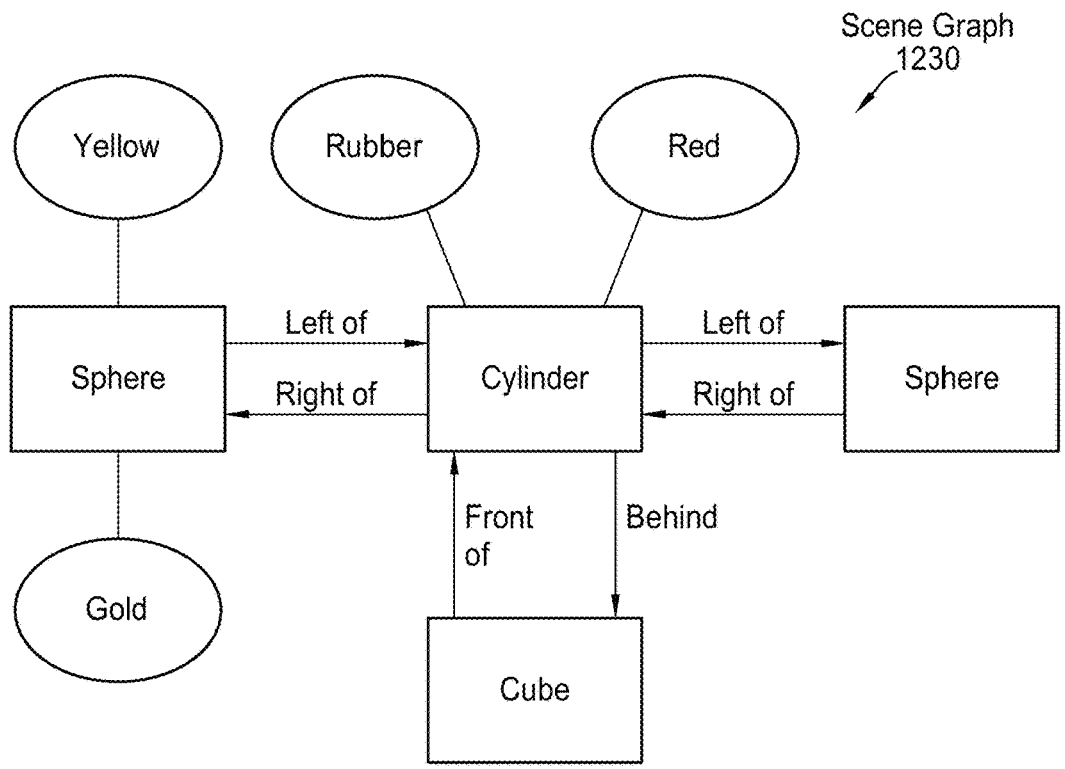
Figure 12D:
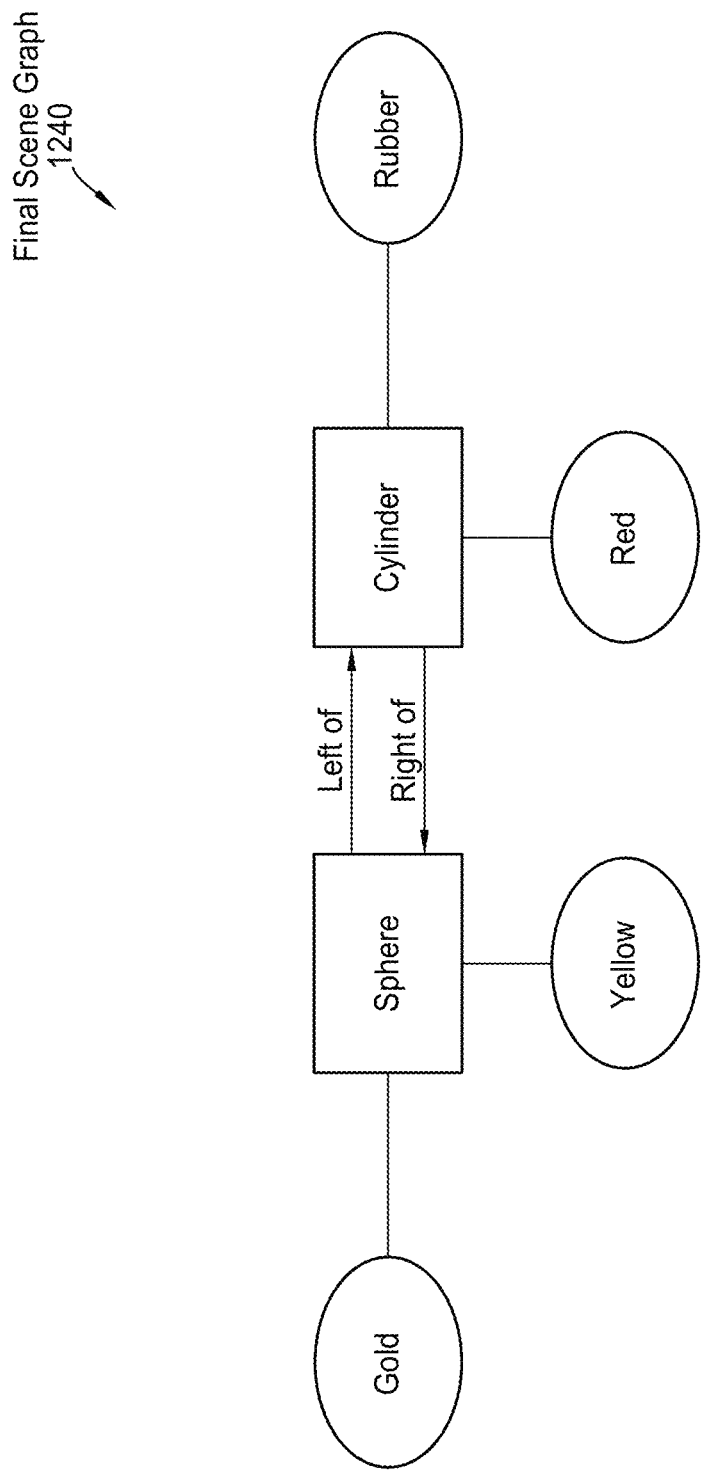

FIGS. 12B-12D illustrate the incremental generation of a scene graph during a dialog concerning the scene of FIG. 12A. During a dialog between the user and the assistant system 140, a CV module output chart listing the object identifiers of each geometric object in the scene 1200 may be provided for use in answering user queries (e.g., "sphere", "cylinder", "sphere", etc.). This CV module output chart may be input to a scene understanding engine 520 in response to a user request in order to generate an initial scene graph and then incrementally update it over the course of the dialog.

As an example and not by way of limitation, at a first round of dialog, a user may ask "What is the object to the left of the red cylinder?". In particular embodiments, to determine a response to this request, the assistant system 140 may provide the visual data 503 (e.g., the image of the scene 1200) and CV module output chart (e.g., the respective object identifiers of the geometric objects) to the scene understanding engine 520. The scene understanding engine 520 may then perform a visual analysis of the image of the objects having the identifiers of "cylinder" in the CV module output chart in order to determine their respective colors. As an example and not by way of limitation, the scene understanding engine 520 may determine that cylinder 1201 is red; cylinder 1205 is green; cylinder 1206 is gray; cylinder 1207 is blue; and cylinder 1208 is green. The scene understanding engine 520 may then select object 1201 as the "red cylinder" of the request, and generate an initial scene graph of spatial relationships between the object 1201 and one or more other objects portrayed in the image of the scene 1200 to resolve the reference to a target object "left of" the red cylinder based on this initial scene graph. In particular embodiments, the scene understanding engine 520 may generate an initial scene graph showing the relational information between all objects portrayed in the image. However, as illustrated in FIG. 12B, in particular embodiments, the scene understanding engine 520 may simply generate an initial scene graph 1220 of objects within a threshold distance of the target object 1201. As an example and not by way of limitation, the scene understanding engine 520 may select objects within a patch of an arbitrary size of the image and generate the initial scene graph 1220 of relational information among these selected objects. Thus, the scene understanding engine may generate the initial scene graph 1220 with a node and attribute for the red cylinder 1201, and nodes and relational information for sphere 1202, cube 1203, and sphere 1210 surrounding cylinder 1201. Upon determining that the object with a relationship of "left of" the red cylinder 1201 is a node corresponding to the sphere 1202, the assistant system 140 may return a response to the user request (e.g., "It is a sphere."). Because the user has expressed interest in this information and it is thus likely that she may want to revisit it in the future, this dialog may then be stored in the multimodal dialog state, so that the user may continue to make further queries about this object (e.g., the sphere) using pronouns or other coreferences. In particular embodiments, the assistant system 140 may then halt the provision of the visual data 503 and the CV module output information to the scene understanding engine 520.

At a second round of dialog, the user may ask the assistant system 140 "What color is it?". The assistant system 140 may determine that the coreference "it" is still referring to the sphere in the first round of dialog, and may again begin provision of the visual data 503 and the CV module output to the scene understanding engine 520, which may consult the initial scene graph 1220 generated in the first round of dialog, select the appropriate node (e.g., the node corresponding to the left sphere 1202), and re-analyze the visual data of this sphere 1202 to determine its color. As illustrated in FIG. 12C, the determined color attribute (e.g., "yellow") may be added to an updated scene graph 1230, and a corresponding response may be sent to the user. In a third round of dialog, the user may ask "What material is it made of?". Upon determining that "it" is still referring to the sphere 1202, the scene understanding engine 520 may again analyze the sphere 1202 portrayed within the image 503 to determine its material. As further illustrated in FIG. 12C, the determined material attribute (e.g., "gold") may be added to the updated scene graph 1230, and a corresponding response may be sent to the user (e.g., "It appears to be made of gold."). Finally, in a fourth round of dialog, the user may ask about the material of the original cylinder 1201 (e.g., "And what is the material of that cylinder?"). The scene understanding engine 520 may again analyze the visual data 503, this time focusing on the cylinder 1201, to return a response to the user (e.g., "Rubber.") and to update the scene graph 1230 with this attribute.

Finally, the assistant system 140 may generate a final scene graph of objects and object information that were specifically discussed in the dialog between the user and the assistant system 140. In particular embodiments, the assistant system 140 may select a portion of the initial scene graph comprising the target object and the object information of the target object from among a plurality of portions of the initial scene graph, wherein remaining portions of the initial scene graph do not comprise the target object and the object information. As an example and not by way of limitation, as illustrated in FIG. 12D, the selected portion of the scene graph 1230 may include the nodes of the target objects 1201 and 1202 that were discussed during the dialog between the user and the assistant system 140, as well as the attributes and relationship information that were discussed during the dialog. In particular embodiments, the assistant system 140 may store the selected portion of the initial scene graph in the multimodal dialog state, and delete the remaining portions of the initial scene graph. Thus, the final scene graph 1240 may simply contain the particular information that that the user has explicitly demonstrated an interest in. As an example and not by way of limitation, in the final scene graph 1240, the nodes and edges corresponding to the sphere 1210 and the cube 1203 may be discarded, as these nodes and edges were generated simply for the purpose of determining a response to a user query expressing interest in a different node through relational information. In particular embodiments, this final scene graph 1240 may be stored in the multimodal dialog state, and may further be stored to a longer-term user memory, such as data store 212.

Figure 13:
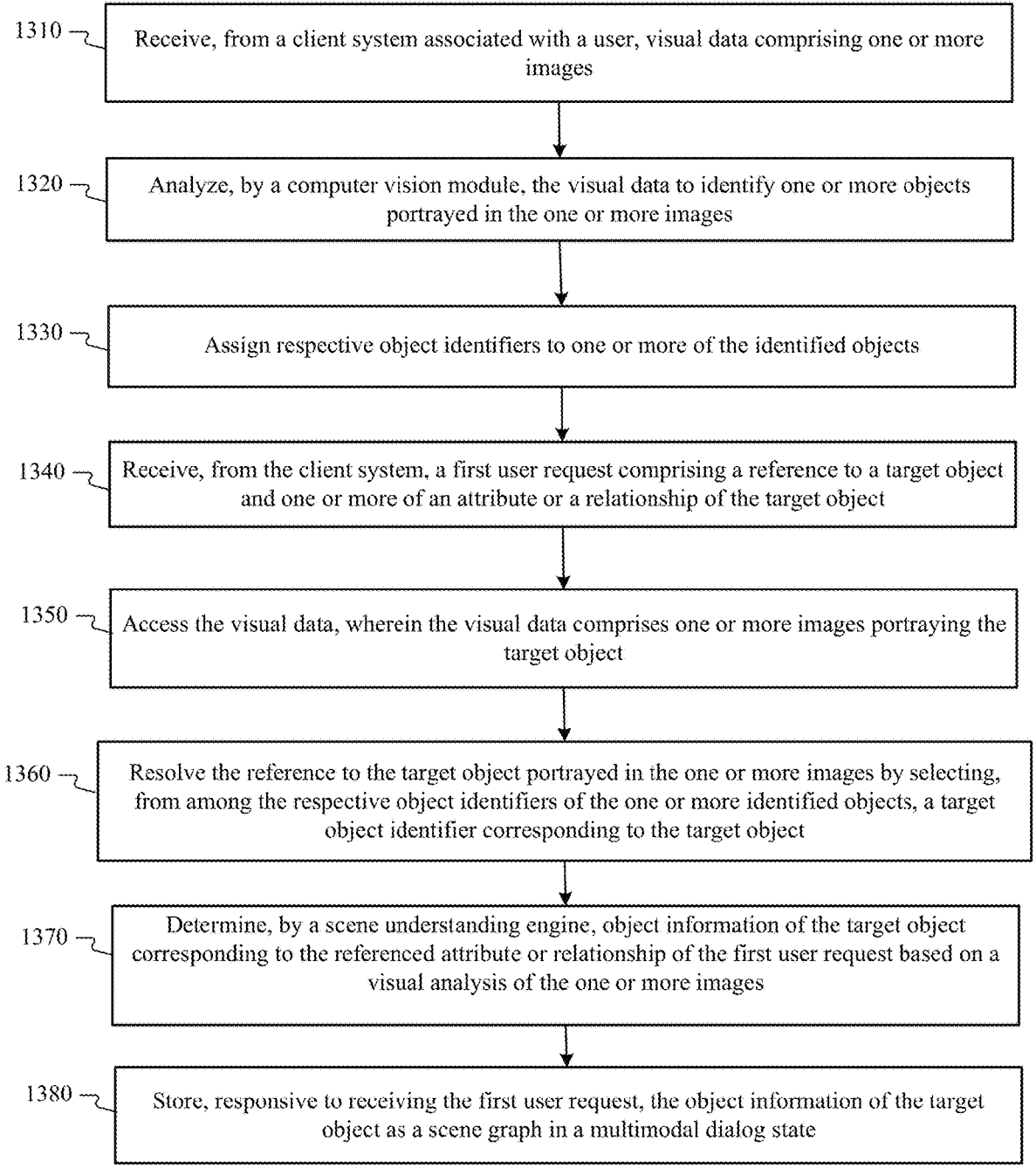
FIG. 13 illustrates an example method for determining and storing object information of a target object as a scene graph responsive to a user request.

FIG. 13 illustrates an example method 1300 for determining and storing object information of a target object as a scene graph responsive to a user request. In particular embodiments, the information generated and stored in the scene graph may be selected based on user dialog rather than all relevant incoming data. The method may begin at step 1310, where the assistant system 140 may receive, from a client system 130 associated with a user, visual data 503 comprising one or more images. At step 1320, the assistant system 140 may analyze, by a computer vision module 504, the visual data 503 to identify one or more objects portrayed in the one or more images, and at step 1330, the assistant system 140 may assign respective object identifiers to one or more of the identified objects. At step 1340, the assistant system 140 may receive, from the client system 130, a first user request comprising a reference to a target object and one or more of an attribute or a relationship of the target object. At step 1350, the assistant system 140 may access the visual data, wherein the visual data comprises one or more images portraying the target object, and at step 1360, the assistant system 140 may resolve the reference to the target object portrayed in the one or more images by selecting, from among the respective object identifiers of the one or more identified objects, a target object identifier corresponding to the target object. At step 1370, the assistant system 140 may determine, by a scene understanding engine 520, object information of the target object corresponding to the referenced attribute or relationship of the first user request based on a visual analysis of the one or more images. Finally, at step 1380, the assistant system 140 may store, responsive to receiving the first user request, the object information of the target object as a scene graph in a multimodal dialog state. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for generating and storing information in a scene graph including the particular steps of the method of FIG. 13, this disclosure contemplates any suitable method for generating and storing information in a scene graph including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Social Graphs

Figure 14:
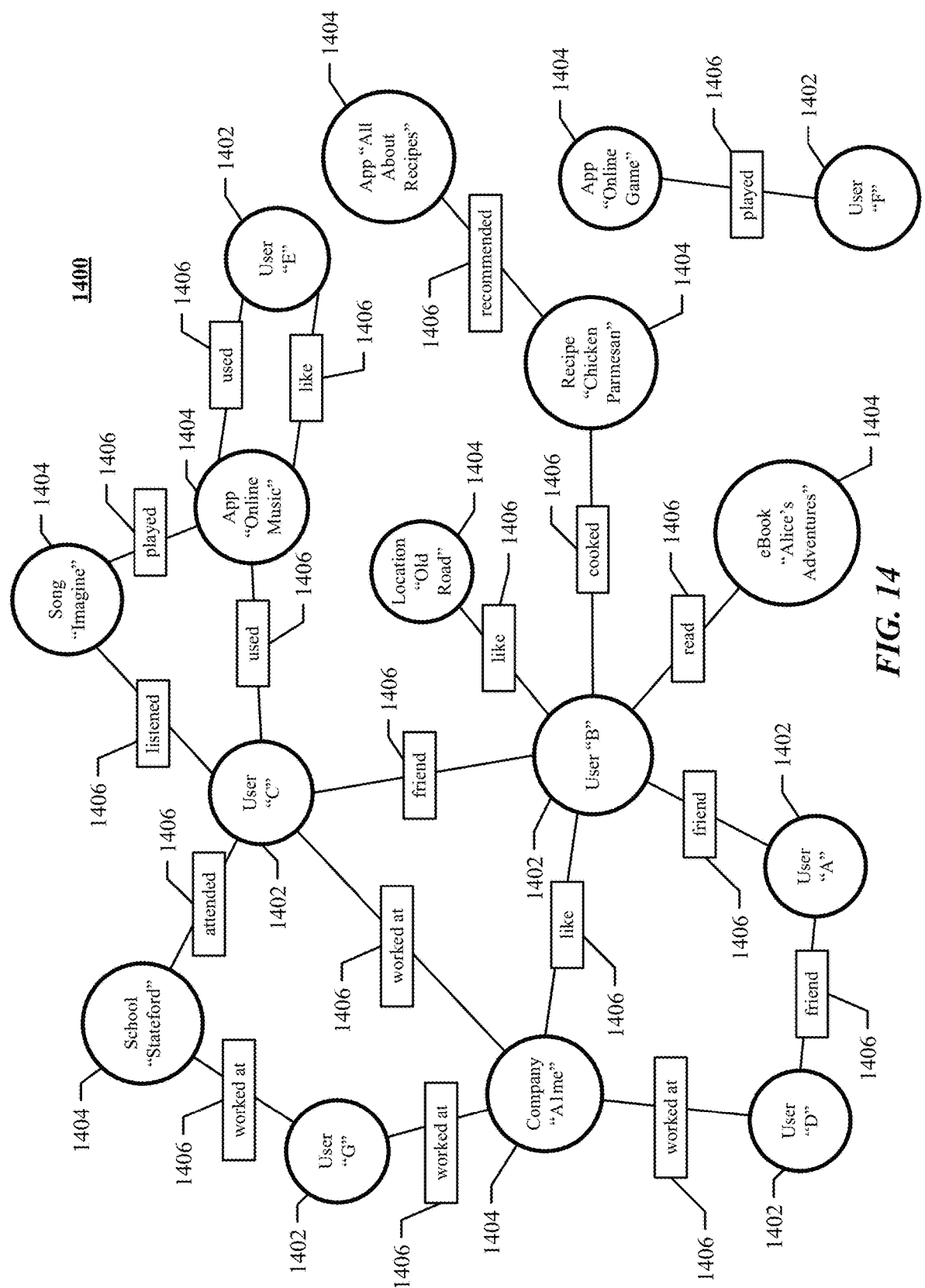
FIG. 14 illustrates an example social graph.

FIG. 14 illustrates an example social graph 1400. In particular embodiments, the social-networking system 160 may store one or more social graphs 1400 in one or more data stores. In particular embodiments, the social graph 1400 may include multiple nodes-which may include multiple user nodes 1402 or multiple concept nodes 1404—and multiple edges 1406 connecting the nodes. Each node may be associated with a unique entity (i.e., user or concept), each of which may have a unique identifier (ID), such as a unique number or username. The example social graph 1400 illustrated in FIG. 14 is shown, for didactic purposes, in a two-dimensional visual map representation. In particular embodiments, a social-networking system 160, a client system 130, an assistant system 140, or a third-party system 170 may access the social graph 1400 and related social-graph information for suitable applications. The nodes and edges of the social graph 1400 may be stored as data objects, for example, in a data store (such as a social-graph database). Such a data store may include one or more searchable or queryable indexes of nodes or edges of the social graph 1400.

In particular embodiments, a user node 1402 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1402 corresponding to the user, and store the user node 1402 in one or more data stores. Users and user nodes 1402 described herein may, where appropriate, refer to registered users and user nodes 1402 associated with registered users. In addition or as an alternative, users and user nodes 1402 described herein may, where appropriate, refer to users that have not registered with the social-networking system 160. In particular embodiments, a user node 1402 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1402 may be associated with one or more data objects corresponding to information associated with a user. In particular embodiments, a user node 1402 may correspond to one or more web interfaces.

In particular embodiments, a concept node 1404 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1404 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1404 may be associated with one or more data objects corresponding to information associated with concept node 1404. In particular embodiments, a concept node 1404 may correspond to one or more web interfaces.

In particular embodiments, a node in the social graph 1400 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1404. Profile interfaces may be viewable by all or a selected subset of other users. As an example and not by way of limitation, a user node 1402 may have a corresponding user-profile interface in which the corresponding user may add content, make declarations, or otherwise express himself or herself. As another example and not by way of limitation, a concept node 1404 may have a corresponding concept-profile interface in which one or more users may add content, make declarations, or express themselves, particularly in relation to the concept corresponding to concept node 1404.

In particular embodiments, a concept node 1404 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1402 corresponding to the user and a concept node 1404 corresponding to the third-party web interface or resource and store edge 1406 in one or more data stores.

In particular embodiments, a pair of nodes in the social graph 1400 may be connected to each other by one or more edges 1406. An edge 1406 connecting a pair of nodes may represent a relationship between the pair of nodes. In particular embodiments, an edge 1406 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1406 connecting the first user's user node 1402 to the second user's user node 1402 in the social graph 1400 and store edge 1406 as social-graph information in one or more of data stores 164. In the example of FIG. 14, the social graph 1400 includes an edge 1406 indicating a friend relation between user nodes 1402 of user "A" and user "B" and an edge indicating a friend relation between user nodes 1402 of user "C" and user "B." Although this disclosure describes or illustrates particular edges 1406 with particular attributes connecting particular user nodes 1402, this disclosure contemplates any suitable edges 1406 with any suitable attributes connecting user nodes 1402. As an example and not by way of limitation, an edge 1406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1400 by one or more edges 1406. The degree of separation between two objects represented by two nodes, respectively, is a count of edges in a shortest path connecting the two nodes in the social graph 1400. As an example and not by way of limitation, in the social graph 1400, the user node 1402 of user "C" is connected to the user node 1402 of user "A" via multiple paths including, for example, a first path directly passing through the user node 1402 of user "B," a second path passing through the concept node 1404 of company "A1me" and the user node 1402 of user "D," and a third path passing through the user nodes 1402 and concept nodes 1404 representing school "Stateford," user "G," company "A1me," and user "D." User "C" and user "A" have a degree of separation of two because the shortest path connecting their corresponding nodes (i.e., the first path) includes two edges 1406.

In particular embodiments, an edge 1406 between a user node 1402 and a concept node 1404 may represent a particular action or activity performed by a user associated with user node 1402 toward a concept associated with a concept node 1404. As an example and not by way of limitation, as illustrated in FIG. 14, a user may "like," "attended," "played," "listened," "cooked," "worked at," or "read" a concept, each of which may correspond to an edge type or subtype. A concept-profile interface corresponding to a concept node 1404 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (a third-party online music application). In this case, the social-networking system 160 may create a "listened" edge 1406 and a "used" edge (as illustrated in FIG. 14) between user nodes 1402 corresponding to the user and concept nodes 1404 corresponding to the song and application to indicate that the user listened to the song and used the application. Moreover, the social-networking system 160 may create a "played" edge 1406 (as illustrated in FIG. 14) between concept nodes 1404 corresponding to the song and the application to indicate that the particular song was played by the particular application. In this case, "played" edge 1406 corresponds to an action performed by an external application (the third-party online music application) on an external audio file (the song "Imagine"). Although this disclosure describes particular edges 1406 with particular attributes connecting user nodes 1402 and concept nodes 1404, this disclosure contemplates any suitable edges 1406 with any suitable attributes connecting user nodes 1402 and concept nodes 1404. Moreover, although this disclosure describes edges between a user node 1402 and a concept node 1404 representing a single relationship, this disclosure contemplates edges between a user node 1402 and a concept node 1404 representing one or more relationships. As an example and not by way of limitation, an edge 1406 may represent both that a user likes and has used at a particular concept. Alternatively, another edge 1406 may represent each type of relationship (or multiples of a single relationship) between a user node 1402 and a concept node 1404 (as illustrated in FIG. 14 between user node 1402 for user "E" and concept node 1404 for "online music application").

In particular embodiments, the social-networking system 160 may create an edge 1406 between a user node 1402 and a concept node 1404 in the social graph 1400. As an example and not by way of limitation, a user viewing a concept-profile interface (such as, for example, by using a web browser or a special-purpose application hosted by the user's client system 130) may indicate that he or she likes the concept represented by the concept node 1404 by clicking or selecting a "Like" icon, which may cause the user's client system 130 to send to the social-networking system 160 a message indicating the user's liking of the concept associated with the concept-profile interface. In response to the message, the social-networking system 160 may create an edge 1406 between user node 1402 associated with the user and concept node 1404, as illustrated by "like" edge 1406 between the user and concept node 1404. In particular embodiments, the social-networking system 160 may store an edge 1406 in one or more data stores. In particular embodiments, an edge 1406 may be automatically formed by the social-networking system 160 in response to a particular user action. As an example and not by way of limitation, if a first user uploads a picture, reads a book, watches a movie, or listens to a song, an edge 1406 may be formed between user node 1402 corresponding to the first user and concept nodes 1404 corresponding to those concepts. Although this disclosure describes forming particular edges 1406 in particular manners, this disclosure contemplates forming any suitable edges 1406 in any suitable manner.

Vector Spaces and Embeddings

Figure 15:
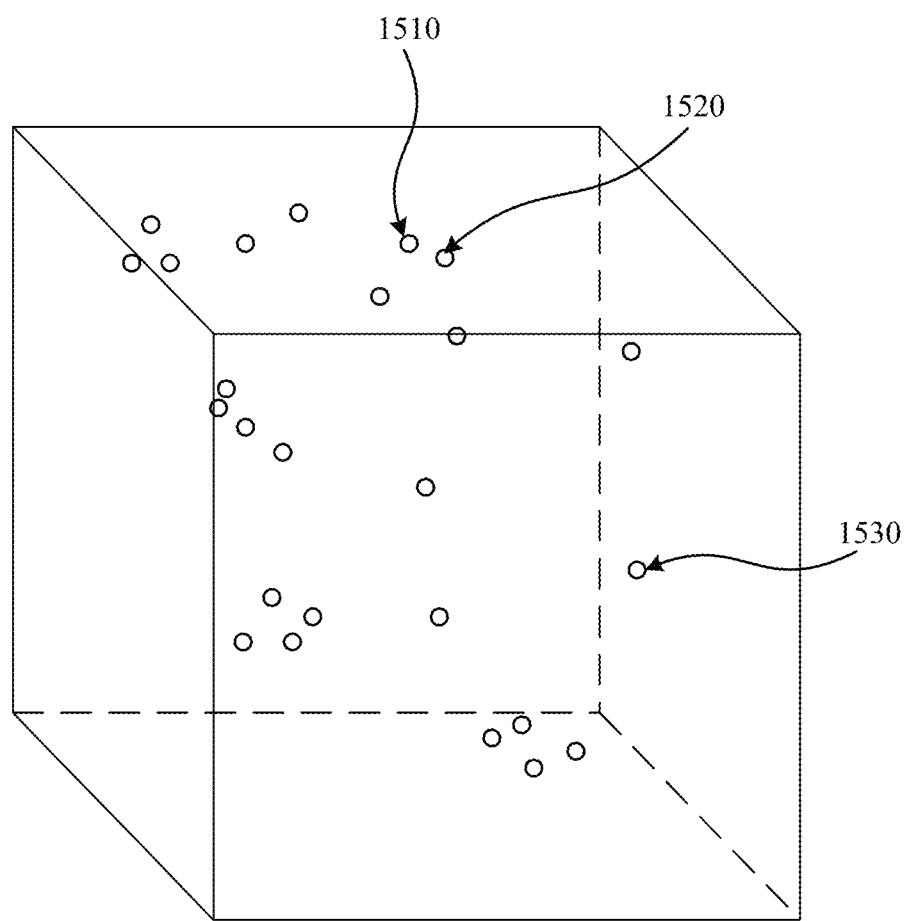
FIG. 15 illustrates an example view of an embedding space.

FIG. 15 illustrates an example view of a vector space 1500. In particular embodiments, an object or an n-gram may be represented in a d-dimensional vector space, where d denotes any suitable number of dimensions. Although the vector space 1500 is illustrated as a three-dimensional space, this is for illustrative purposes only, as the vector space 1500 may be of any suitable dimension. In particular embodiments, an n-gram may be represented in the vector space 1500 as a vector referred to as a term embedding. Each vector may comprise coordinates corresponding to a particular point in the vector space 1500 (i.e., the terminal point of the vector). As an example and not by way of limitation, vectors 1510, 1520, and 1530 may be represented as points in the vector space 1500, as illustrated in FIG. 15. An n-gram may be mapped to a respective vector representation. As an example and not by way of limitation, n-grams $t_1$ and $t_2$ may be mapped to vectors $\vec{v_1}$ and $\vec{v_2}$ in the vector space 1500, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 1500. In particular embodiments, an n-gram may be mapped to a vector representation in the vector space 1500 by using a machine leaning model (e.g., a neural network). The machine learning model may have been trained using a sequence of training data (e.g., a corpus of objects each comprising n-grams).

In particular embodiments, an object may be represented in the vector space 1500 as a vector referred to as a feature vector or an object embedding. As an example and not by way of limitation, objects $e_1$ and $e_2$ may be mapped to vectors $\vec{v_1}$ and $\vec{v_2}$ in the vector space 1500, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1500. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 1500. As an example and not by way of limitation, vector 1510 and vector 1520 may correspond to objects that are more similar to one another than the objects corresponding to vector 1510 and vector 1530, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 16:
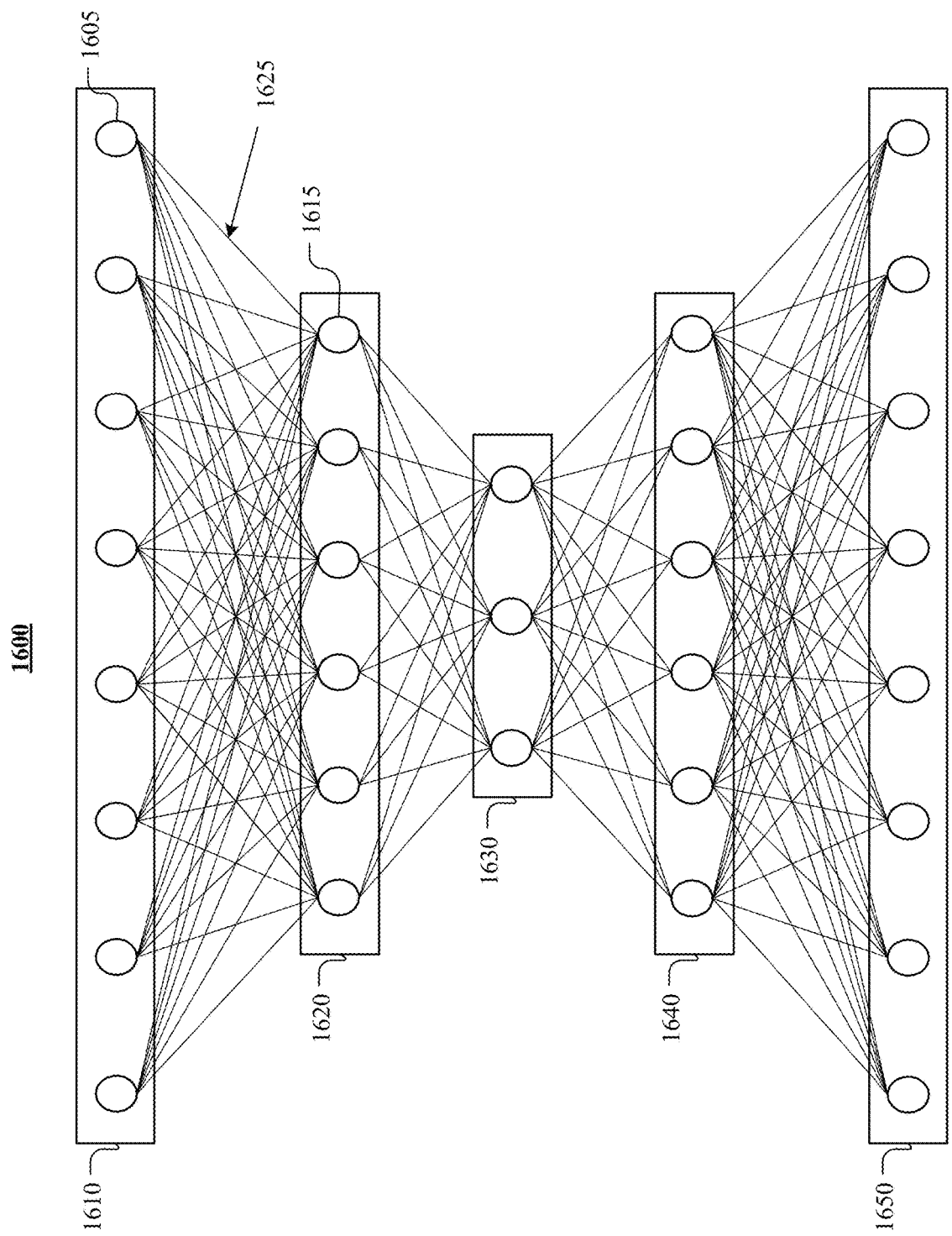
FIG. 16 illustrates an example artificial neural network.

FIG. 16 illustrates an example artificial neural network ("ANN") 1600. In particular embodiments, an ANN may refer to a computational model comprising one or more nodes. Example ANN 1600 may comprise an input layer 1610, hidden layers 1620, 1630, 1640, and an output layer 1650. Each layer of the ANN 1600 may comprise one or more nodes, such as a node 1605 or a node 1615. In particular embodiments, each node of an ANN may be connected to another node of the ANN. As an example and not by way of limitation, each node of the input layer 1610 may be connected to one or more nodes of the hidden layer 1620. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 16 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 16 depicts a connection between each node of the input layer 1610 and each node of the hidden layer 1620, one or more nodes of the input layer 1610 may not be connected to one or more nodes of the hidden layer 1620.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1620 may comprise the output of one or more nodes of the input layer 1610. As another example and not by way of limitation, the input to each node of the output layer 1650 may comprise the output of one or more nodes of the hidden layer 1640. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1625 between the node 1605 and the node 1615 may have a weighting coefficient of 0.4, which may indicate that 0.4 multiplied by the output of the node 1605 is used as an input to the node 1615. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1600 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1404 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1400. A privacy setting may be specified for one or more edges 1406 or edge-types of the social graph 1400, or with respect to one or more nodes 1402, 1404 or node-types of the social graph 1400. The privacy settings applied to a particular edge 1406 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1404 connected to a user node 1402 of the first user by an edge 1406. The first user may specify privacy settings that apply to a particular edge 1406 connecting to the concept node 1404 of the object, or may specify privacy settings that apply to all edges 1406 connecting to the concept node 1404. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list.

If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 17:
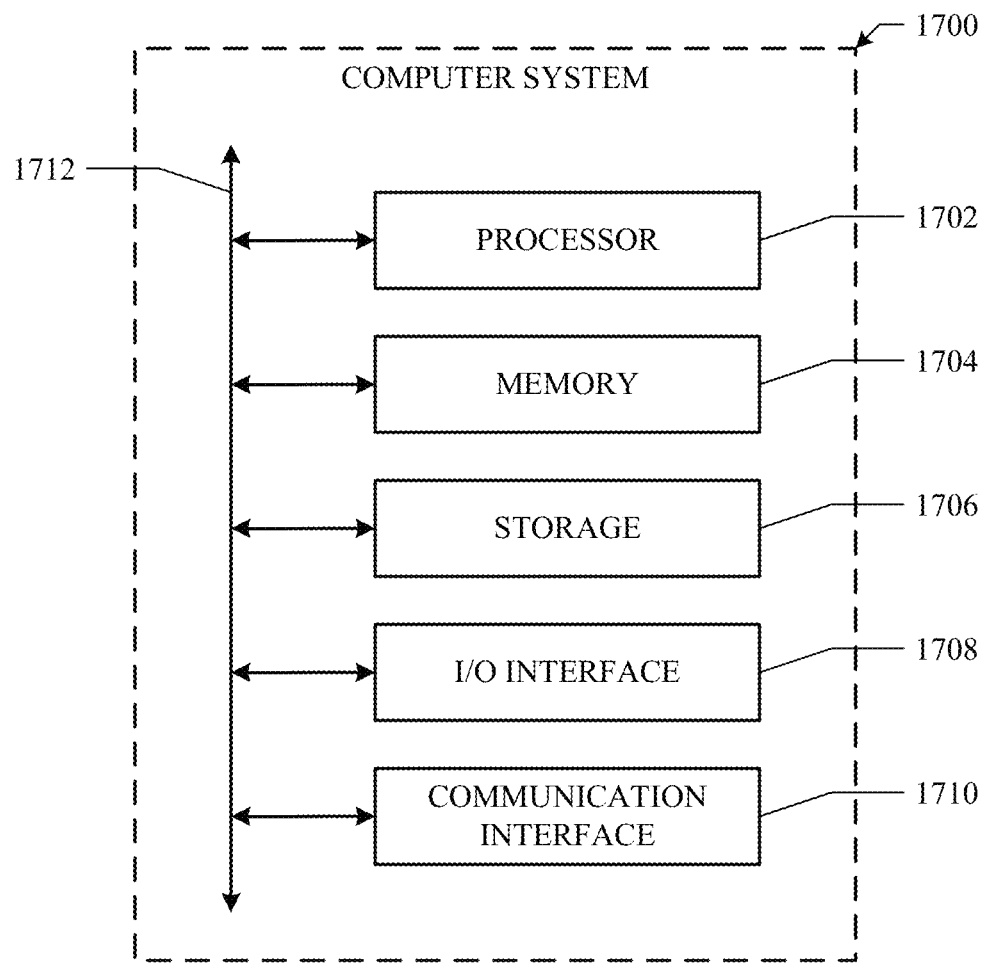
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    receiving, from a client system associated with a user, a first user request comprising a reference to a target object and one or more of an attribute or a relationship of the target object;
    accessing, from the client system, visual data captured by one or more cameras of the client system, wherein the visual data comprises images portraying the target object;
    resolving, based on a multimodal dialog state, the reference to the target object portrayed in the images captured by the one or more cameras of the client system;
    determining that first object information, corresponding to the attribute or the relationship, is not already stored in the multimodal dialog state;
    responsive to resolving the reference to the target object and the first object information not being stored in the multimodal dialog state,
        executing a first visual analysis by retrieving one or more of the images, and identifying the first object information from the one or more of the images based on an identification of the target object in the one or more of the images and by analyzing the one or more of the images, and
        halting provisioning of other images of the images in response to the first object information being identified from the one or more of the images; and
    storing, responsive to receiving the first user request, the first object information of the target object as an incremental update in the multimodal dialog state.

2. The method of claim 1, further comprising:
    sending, to the client system, instructions for presenting a response to the first user request, wherein the response comprises the first object information.

3. The method of claim 1, wherein the first object information is stored as a scene graph in the multimodal dialog state.

4. The method of claim 1, further comprising:
    receiving, from the client system, the visual data;
    analyzing, by a computer vision module, the visual data to identify one or more objects portrayed in the one or more images captured by the one or more cameras of the client system; and
    assigning respective object identifiers to one or more of the identified one or more objects.

5. The method of claim 4, wherein resolving the reference to the target object comprises:
    selecting, from among the respective object identifiers of the one or more identified objects, a target object identifier corresponding to the target object.

6. The method of claim 5, wherein determining the first object information of the target object comprises:
    providing, in response to receiving the first user request, the visual data and the target object identifier of the target object to a scene understanding engine; and
    generating, by the scene understanding engine, the first object information based on the target object identifier.

7. The method of claim 6, further comprising:
    generating, by a dialog engine, a partial scene graph consisting of the target object identifier and the first object information of the target object;
    receiving, from the client system, a second user request comprising another reference to the target object;
    resolving, based on the multimodal dialog state, the another reference to the target object, wherein a second object information about the target object is not already stored in the multimodal dialog state; and
    responsive to resolving the another reference to the target object, executing a second visual analysis of the one or more of the images to determine the second object information, and storing the second object information as an incremental update to the partial scene graph,
    wherein storing the first object information of the target object comprises storing the partial scene graph in the multimodal dialog state.

8. The method of claim 6, further comprising:
    in response to the generation of the first object information, halting provision of the visual data to the scene understanding engine.

9. The method of claim 1, wherein resolving the reference to the target object comprises:
    generating, by a dialog engine, an initial scene graph comprising the target object and one or more additional objects portrayed in the one or more images captured by the one or more cameras of the client system; and
    resolving the reference to the target object based on the initial scene graph.

10. The method of claim 9, further comprising:
    selecting a portion of the initial scene graph comprising the target object and the first object information of the target object from among a plurality of portions of the initial scene graph, wherein remaining portions of the initial scene graph do not comprise the target object and the first object information.

11. The method of claim 10, wherein storing the first object information of the target object comprises:
storing the selected portion of the initial scene graph in the multimodal dialog state; and
deleting the remaining portions of the initial scene graph.

12. The method of claim 1, further comprising:
determining, by a scene understanding engine, one or more properties of the target object based on the first visual analysis of the one or more images captured by the one or more cameras of the client system; and
resolving the target object to a specific entity based on the one or more properties.

13. The method of claim 12, further comprising:
accessing a knowledge graph based on the specific entity; and
retrieving the first object information from the knowledge graph.

14. The method of claim 1, further comprising:
receiving, from the client system, a second user request comprising a reference to the target object and one or more of an additional attribute or an additional relationship of the target object;
determining a second object information of the target object corresponding to the referenced additional attribute or relationship of the second user request based on a subsequent visual analysis of the one or more images captured by the one or more cameras of the client system; and
storing, responsive to receiving the second user request, the second object information of the target object in the multimodal dialog state.

15. The method of claim 1, further comprising:
receiving additional visual data, the additional visual data comprising one or more additional images captured by the one or more cameras of the client system portraying a second object sharing an attribute or relationship with the target object.

16. The method of claim 15, further comprising:
determining whether a second user request referencing the second object has been received; and
responsive to determining whether the second user request referencing the second object has been received:
if the second user request has been received, storing, responsive to receiving the second user request, a second object information of the second object in the multimodal dialog state; and
if the second user request has not been received, storing the additional visual data without storing the second object information of the second object in the multimodal dialog state.

17. The method of claim 15, further comprising:
receiving, from the client system, a second user request, wherein the second user request comprises a reference to the shared attribute or relationship; and
determining, based on second object information of the second object stored in the multimodal dialog state, that the second user request is associated with the target object.

18. The method of claim 17, further comprising:
sending, to the client system and in response to the second user request, instructions for presenting a response to the second user request, wherein the response comprises the second object information of the target object.

19. The method of claim 1, wherein the first user request is received during a current dialog session between the user and an assistant system associated with the client system, and wherein the first object information of the target object is stored during the current dialog session.

20. One or more computer-readable non-transitory storage media embodying software that is operable when executed to:
receive, from a client system associated with a user, a first user request comprising a reference to a target object and one or more of an attribute or a relationship of the target object;
access, from the client system, visual data captured by one or more cameras of the client system, wherein the visual data comprises images portraying the target object;
resolve, based on a multimodal dialog state, the reference to the target object portrayed in the images captured by the one or more cameras of the client system;
determining that first object information, corresponding to the attribute or the relationship, is not already stored in the multimodal dialog state;
responsive to resolving the reference to the target object and the first object information not being stored in the multimodal dialog state,
executing a visual analysis by retrieving one or more of the images, and identifying the first object information from the one or more of the images based on an identification of the target object in the one or more of the images and by analyzing the one or more of the images, and
halting provisioning of other images of the images in response to the first object information being identified from the one or more of the images; and
store, responsive to receiving the first user request, the first object information of the target object as an incremental update in the multimodal dialog state.

21. A system comprising:
one or more processors; and
a non-transitory memory coupled to the processors comprising instructions executable by the processors, the processors operable when executing the instructions to:
receive, from a client system associated with a user, a first user request comprising a reference to a target object and one or more of an attribute or a relationship of the target object;
access, from the client system, visual data captured by one or more cameras of the client system, wherein the visual data comprises images portraying the target object;
resolve, based on a multimodal dialog state, the reference to the target object portrayed in the images captured by the one or more cameras of the client system;
determining that first object information, corresponding to the attribute or the relationship, is not already stored in the multimodal dialog state;
responsive to resolving the reference to the target object and the first object information not being stored in the multimodal dialog state,
executing a visual analysis by retrieving one or more of the images, and identifying the first object information from the one or more of the images based on an identification of the target object in the one or more of the images and by analyzing the one or more of the images, and halting provisioning of other images of the images in response to the first object information being identified from the one or more of the images; and store, responsive to receiving the first user request, the first object information of the target object as an incremental update in the multimodal dialog state.

* * * * *